US012689602B2

(12) United States Patent
Yoshino et al.

(10) Patent No.: US 12,689,602 B2
(45) Date of Patent: Jul. 21, 2026

(54) INFORMATION PROCESSING SYSTEM, CONTROL METHOD, AND SERVER DEVICE

(71) Applicant: GREE, INC., Tokyo (JP)

(72) Inventors: Shinichi Yoshino, Saitama (JP); Yoshiki Kudo, Tokyo (JP)

(73) Assignee: GREE HOLDINGS, INC., Tokyo (JP)

( * ) Notice: Subject to any disclaimer, the term of this patent is extended or adjusted under 35 U.S.C. 154(b) by 180 days.

(21) Appl. No.: 18/373,835

(22) Filed: Sep. 27, 2023

(65) Prior Publication Data

US 2024/0106778 A1     Mar. 28, 2024

(30) Foreign Application Priority Data

Sep. 27, 2022    (JP) ................................. 2022-153763
Sep. 30, 2022    (JP) ................................. 2022-158120
Sep. 30, 2022    (JP) ................................. 2022-158666
Aug. 9, 2023    (JP) ................................. 2023-129811

(51) Int. Cl.
  *G06F 3/0481* (2022.01)
  *G06F 3/04842* (2022.01)
  *H04L 51/04* (2022.01)
  *H04L 51/10* (2022.01)
(52) U.S. Cl.
  CPC ............ *H04L 51/10* (2013.01); *G06F 3/0481* (2013.01); *G06F 3/04842* (2013.01); *H04L 51/04* (2013.01)
(58) Field of Classification Search
  None
  See application file for complete search history.

(56) References Cited

U.S. PATENT DOCUMENTS

| | | | | |
|---|---|---|---|---|
| 10,873,558 B2 * | 12/2020 | Peiris | ..................... | H04L 65/403 |
| 11,082,467 B1 * | 8/2021 | Hartnett | ................ | H04L 65/403 |
| 11,990,219 B1 * | 5/2024 | Watson | ................... | G06F 16/78 |
| 11,997,368 B2 * | 5/2024 | Kurabuchi | .............. | G06F 13/00 |

(Continued)

FOREIGN PATENT DOCUMENTS

| | | |
|---|---|---|
| JP | 2019-125211 A | 7/2019 |
| JP | 2021-009693 A | 1/2021 |
| JP | 2022-040894 A | 3/2022 |

OTHER PUBLICATIONS

Jul. 11, 2023 Office Action issued in Japanese Patent Application No. 2022-158120.

(Continued)

*Primary Examiner* — Tuyetlien T Tran
(74) *Attorney, Agent, or Firm* — Oliff PLC

(57) ABSTRACT

One or more processors provided in an information processing system transmit information regarding display of a video including a first object representing a first user to a terminal device of a second user different from the first user; set a user group including the first user and at least one other user including the second user; and transmit information regarding display of a related image selected by the first user from an image group including a plurality of related images relating to the first object, to the terminal device of each other user included in the user group. The one or more processors include in the image group a new related image including the first object representing the first user and a second object representing at least one of the other users, in response to an instruction from the first user.

6 Claims, 32 Drawing Sheets

(56) References Cited

U.S. PATENT DOCUMENTS

| | | | | |
|---|---|---|---|---|
| 2011/0312376 | A1* | 12/2011 | Woo | G06V 20/30 455/556.1 |
| 2014/0143682 | A1* | 5/2014 | Druck | G06Q 30/0241 715/752 |
| 2016/0192009 | A1* | 6/2016 | Sugio | G06V 10/255 725/32 |
| 2017/0024108 | A1* | 1/2017 | Suzuki | H04L 51/10 |
| 2018/0198743 | A1* | 7/2018 | Blackstock | G06Q 30/02 |
| 2019/0124400 | A1* | 4/2019 | Wang | H04N 21/2187 |
| 2019/0147635 | A1* | 5/2019 | Inagawa | H04L 51/52 382/100 |
| 2019/0266807 | A1* | 8/2019 | Lee | G06T 11/001 |
| 2019/0349636 | A1* | 11/2019 | Watanabe | G06T 7/73 |
| 2019/0392483 | A1* | 12/2019 | Franklin | G06Q 30/0269 |
| 2020/0034025 | A1* | 1/2020 | Brady | G09B 19/00 |
| 2020/0077157 | A1* | 3/2020 | Kurabuchi | H04N 21/47815 |
| 2020/0234483 | A1* | 7/2020 | Mashrabov | H04L 51/10 |
| 2021/0174544 | A1* | 6/2021 | Kawakami | H04N 5/272 |
| 2022/0004575 | A1* | 1/2022 | Mashrabov | G06F 40/247 |
| 2022/0021947 | A1* | 1/2022 | Ohno | G09G 5/36 |
| 2022/0060800 | A1* | 2/2022 | Kurabuchi | G06F 13/00 |
| 2022/0103873 | A1* | 3/2022 | Yoshida | H04N 21/242 |
| 2022/0167044 | A1* | 5/2022 | Kurabuchi | H04N 21/2743 |
| 2022/0191157 | A1* | 6/2022 | Lee | H04L 51/063 |
| 2022/0263781 | A1 | 8/2022 | Lee | |
| 2023/0026096 | A1* | 1/2023 | Zheng | H04N 21/47815 |
| 2023/0254448 | A1* | 8/2023 | Binder | G10L 15/25 348/14.08 |
| 2024/0005579 | A1* | 1/2024 | Gonzalez Franco | G06V 20/41 |
| 2024/0040085 | A1* | 2/2024 | Krol | G06F 3/04815 |
| 2024/0175717 | A1* | 5/2024 | Ishii | A61B 5/6823 |

OTHER PUBLICATIONS

Jul. 11, 2023 Office Action issued in Japanese Patent Application No. 2022-153763.
Apr. 21, 2026 Office Action issued in Japanese Patent Application No. 2023-129811.

* cited by examiner

FIG. 1
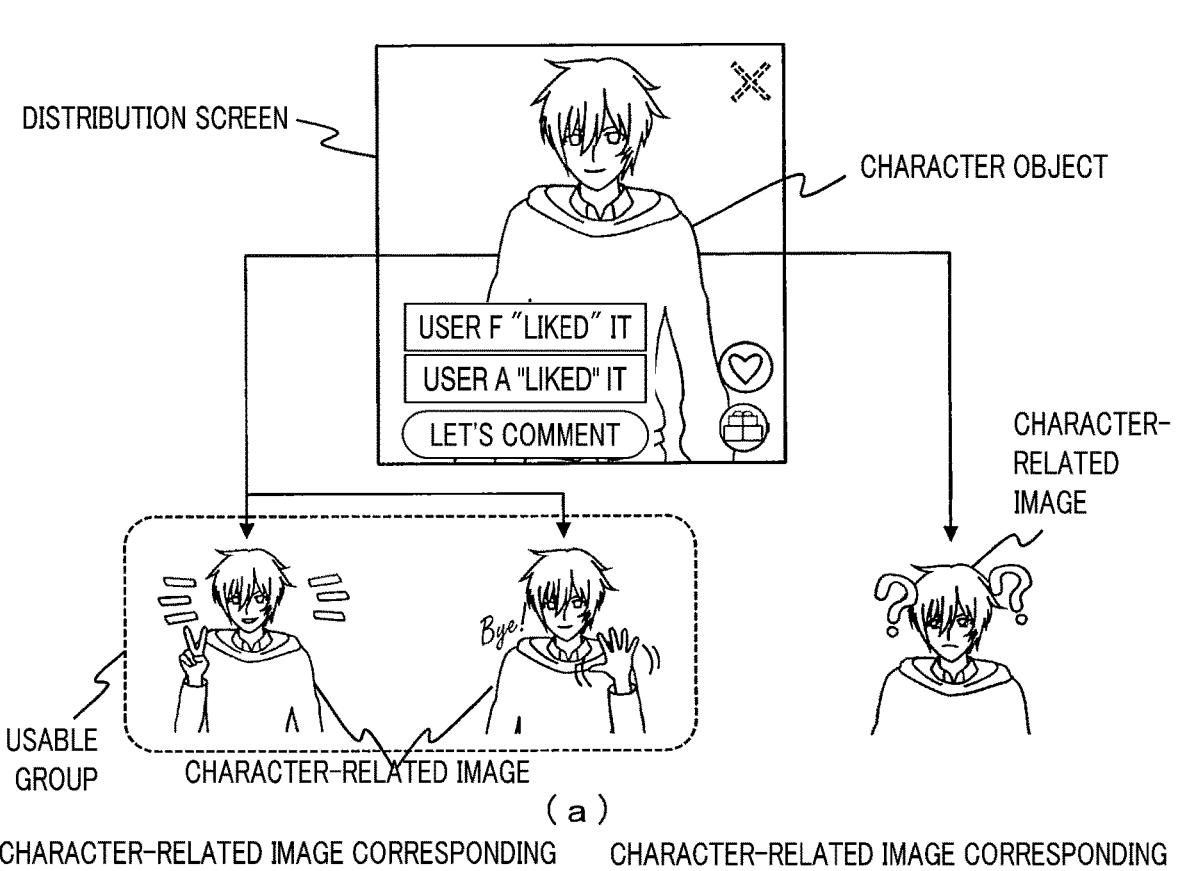
(a)
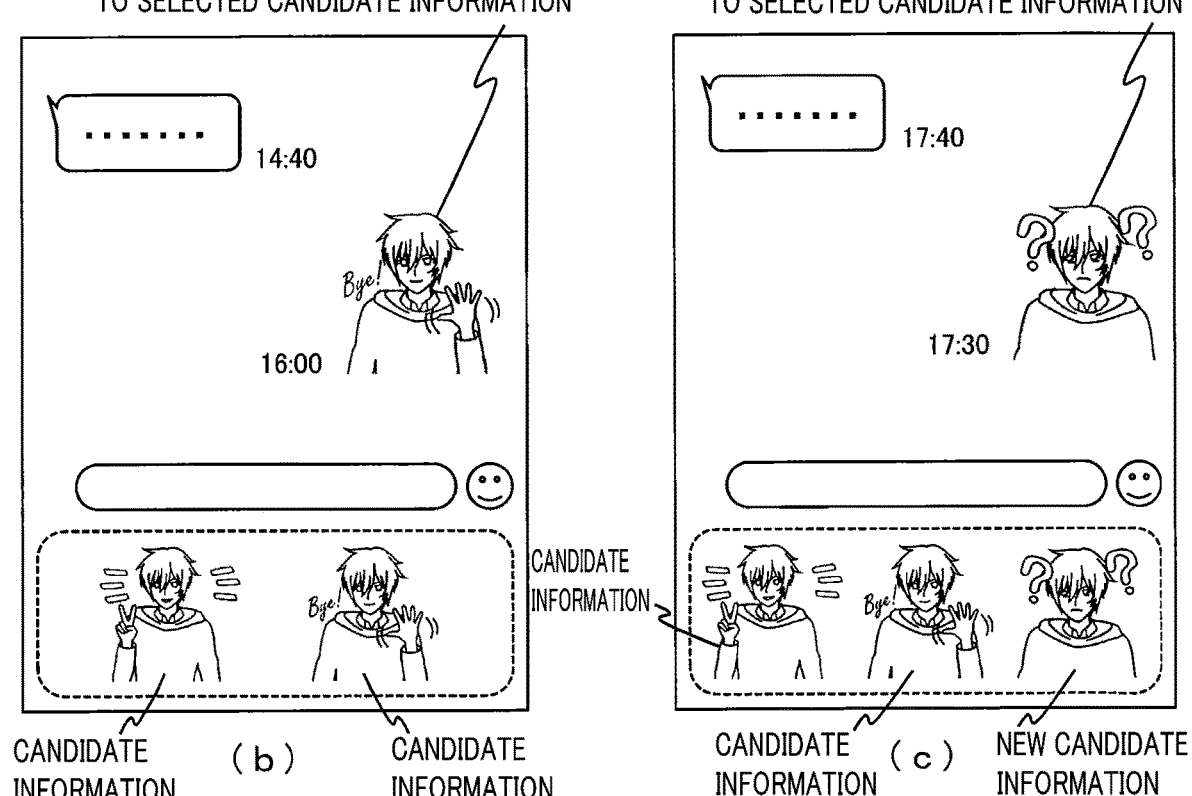

| USER ID | NAME | CHARACTER OBJECT | OWNED OBJECT | USED OBJECT | · · · |
|---|---|---|---|---|---|
| U-00000001 | USER A | C-00000001 | Obj-0004, Obj-0028, · · · | Obj-0123, Obj-0338, · · · | · · · |
| U-00000002 | USER B | C-00000002 | Obj-0021, Obj-0055, · · · | Obj-0152, Obj-0311, · · · | · · · |
| · · · | · · · | · · · | · · · | · · · | · · · |

( a )

T2

| OBJECT ID | NAME | IMAGE INFORMATION | RARITY | PLACEMENT LOCATION | · · · |
|---|---|---|---|---|---|
| Obj-0001 | MR. BEAR | 0001.pmg | SR | SPACE | · · · |
| Obj-0002 | CAT EARS | 0002.pmg | R | HEAD | · · · |
| · · · | · · · | · · · | · · · | · · · | · · · |

( b )

T3

| GROUP ID | NAME | BELONGING USERS | · · · |
|---|---|---|---|
| G-0013 | GROUP Ga | U-00000001, U-00000012, U-00000025, · · · | · · · |
| G-0052 | GROUP Gb | U-00000001, U-00000004, U-00000047, · · · | · · · |
| · · · | · · · | · · · | · · · |

( c )

FIG. 6
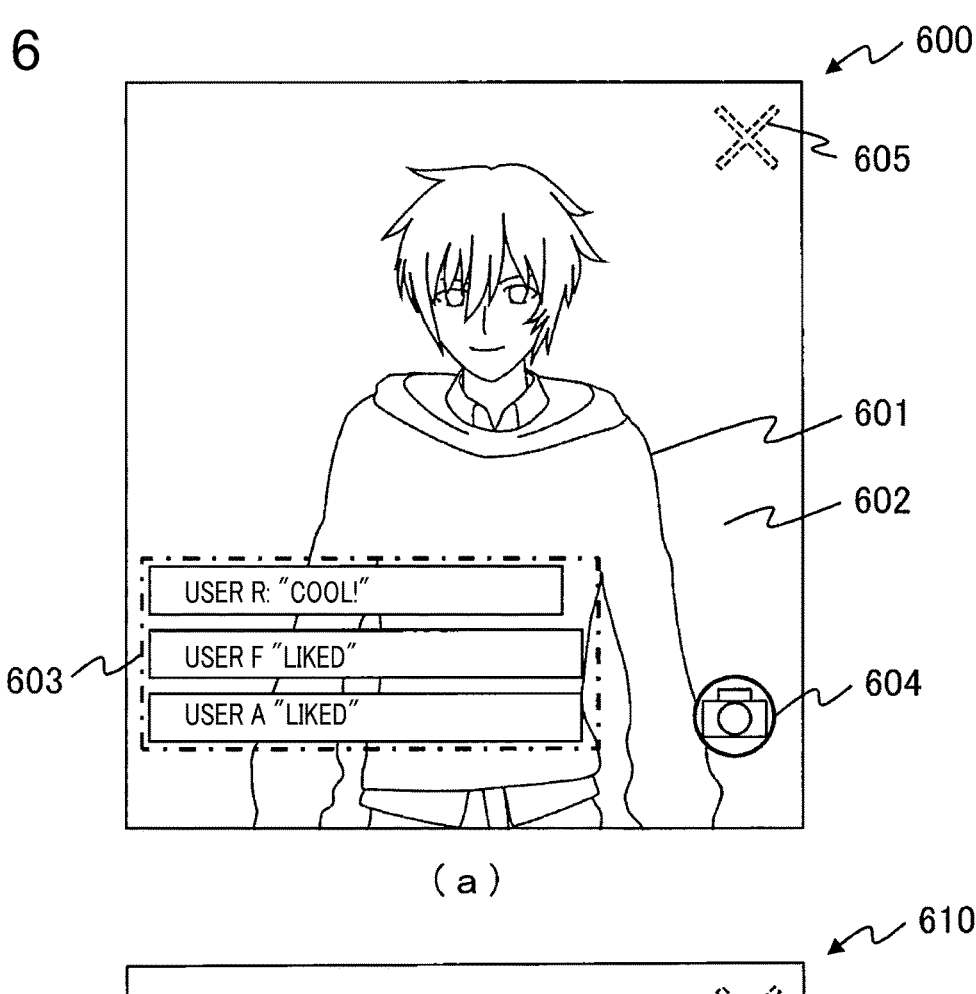
( a )
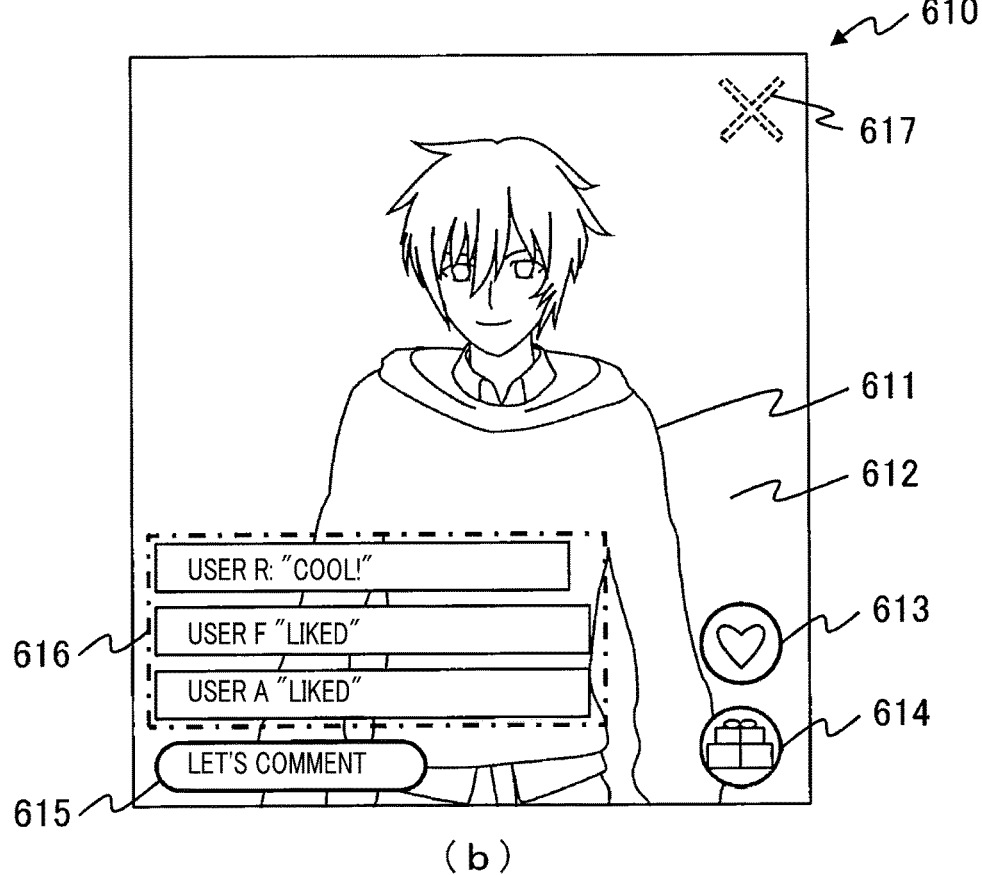
( b )

(a)

(b)

(a)

(b)

FIG. 9
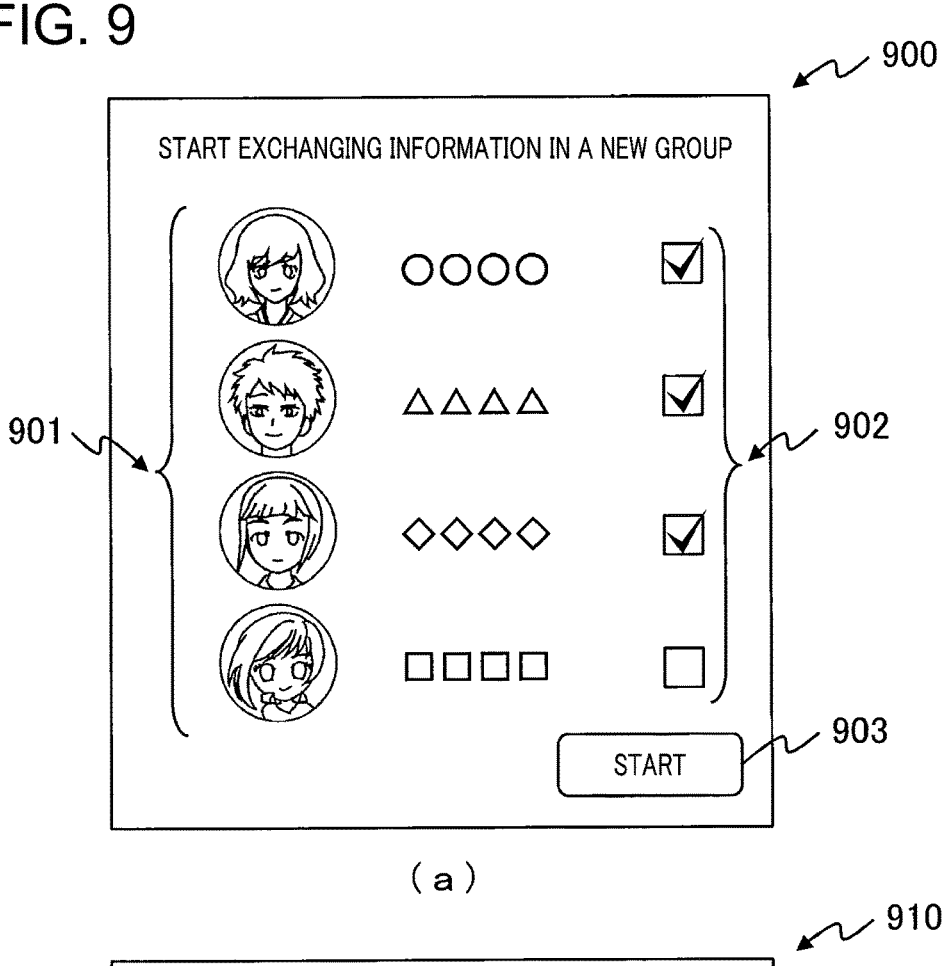
(a)
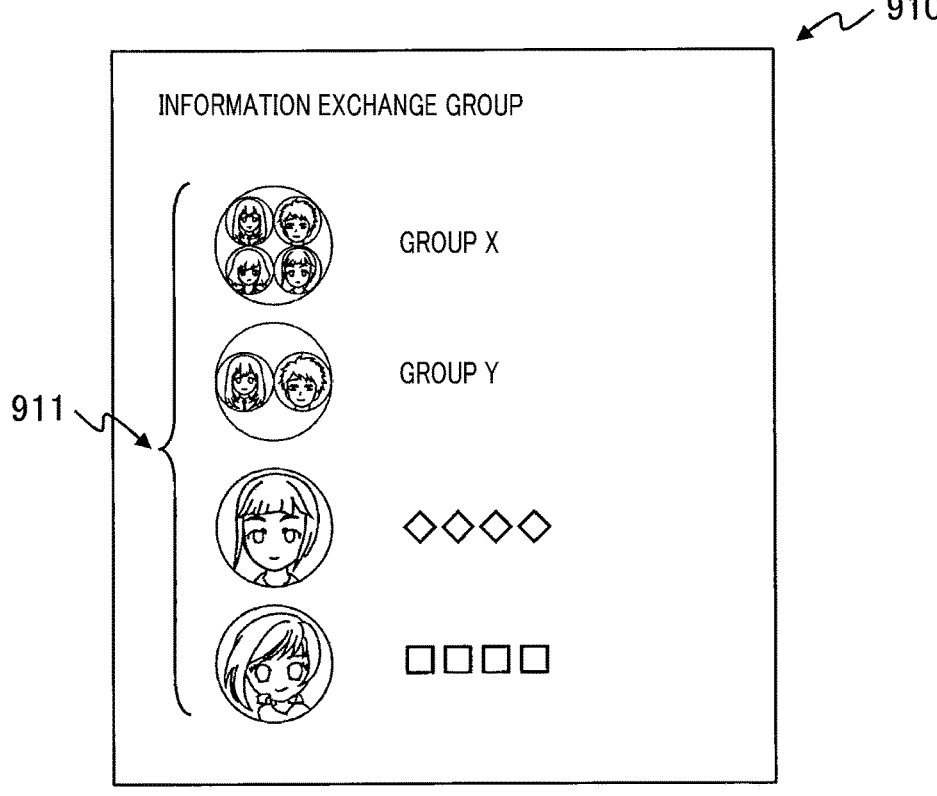
(b)

Figure 10:
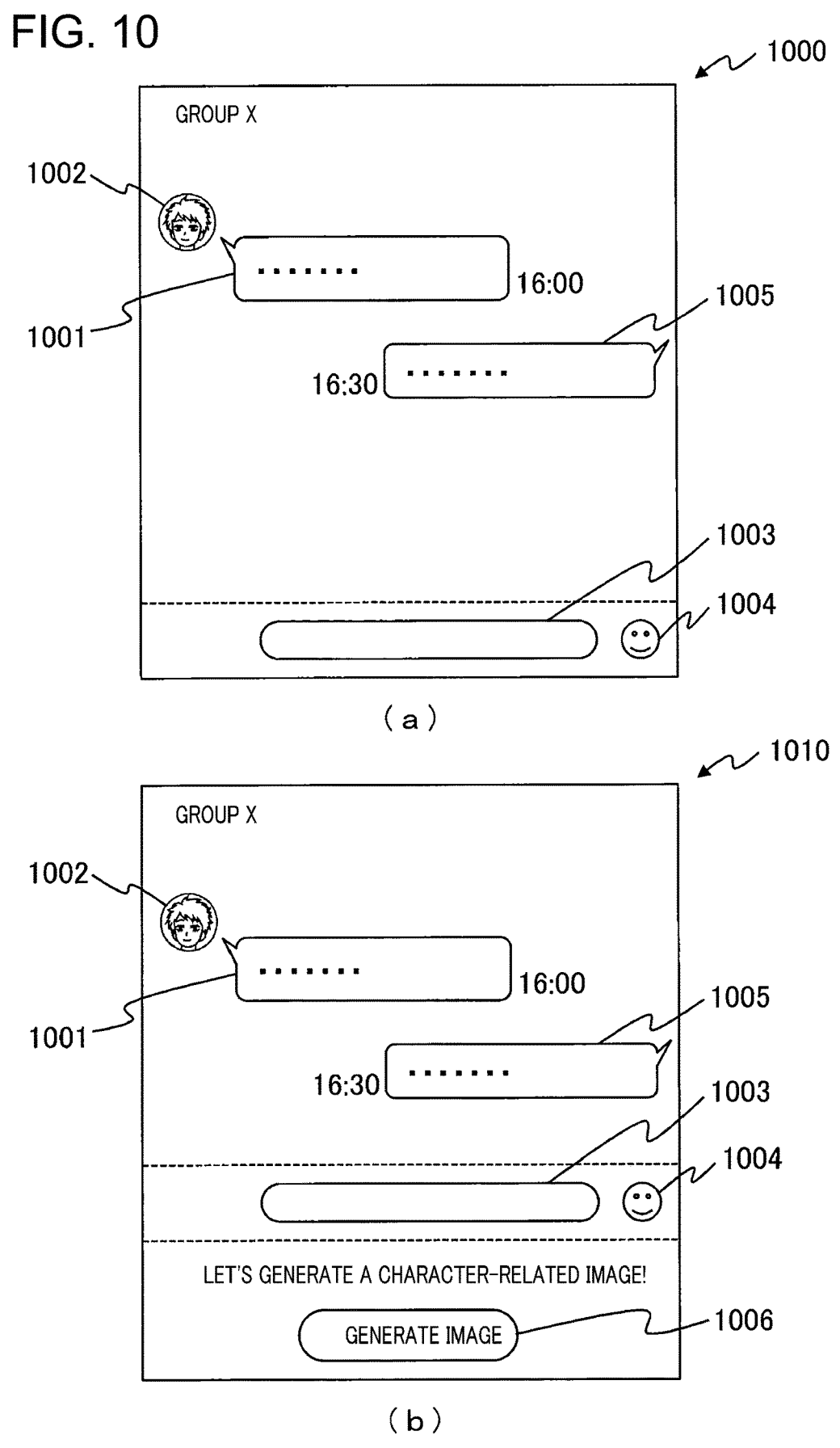

GROUP X

1002

1001

· · · · · · ·

16:00

1005

16:30

· · · · · · ·

1003

1004

☺

( a )

1010

GROUP X

1002

1001

· · · · · · ·

16:00

1005

16:30

· · · · · · ·

1003

1004

☺

LET'S GENERATE A CHARACTER-RELATED IMAGE!

GENERATE IMAGE

1006

( b )

(a)

(b)

FIG. 12
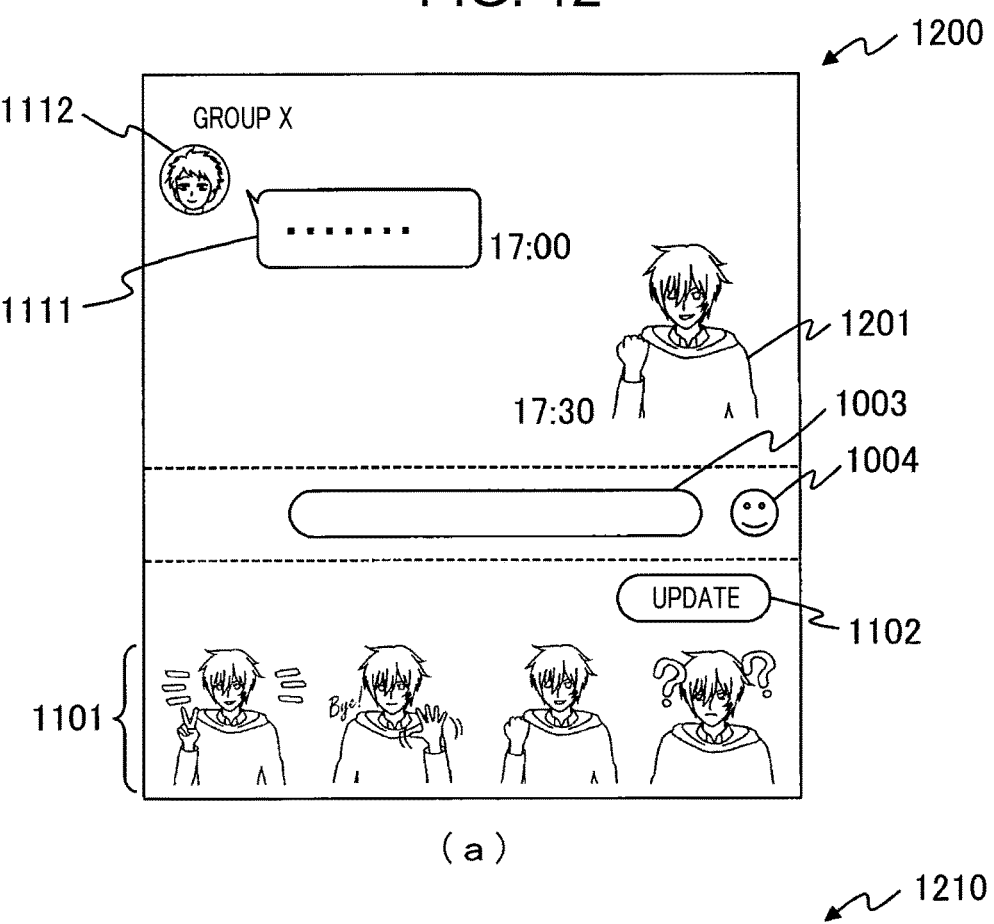
( a )
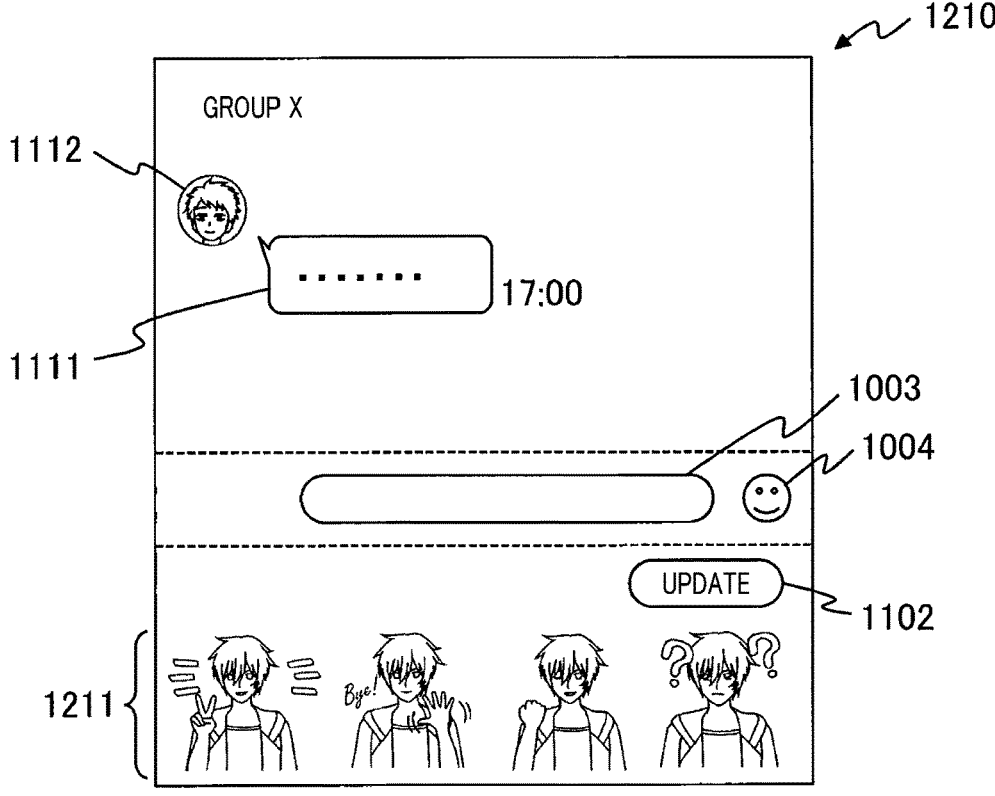
( b )

( a )

( b )

| REFERENCE INFORMATION ID | REFERENCE INFORMATION | DATE AND TIME | ... |
|---|---|---|---|
| R-00000001 | R-000001.pmg | 2022/04/01 18:23 | ... |
| R-00000002 | Obj-0001 | 2022/04/01 20:45 | ... |
| R-00000003 | Obj-0138 | 2022/04/02 08:10 | ... |
| ... | ... | ... | ... |

FIG. 23
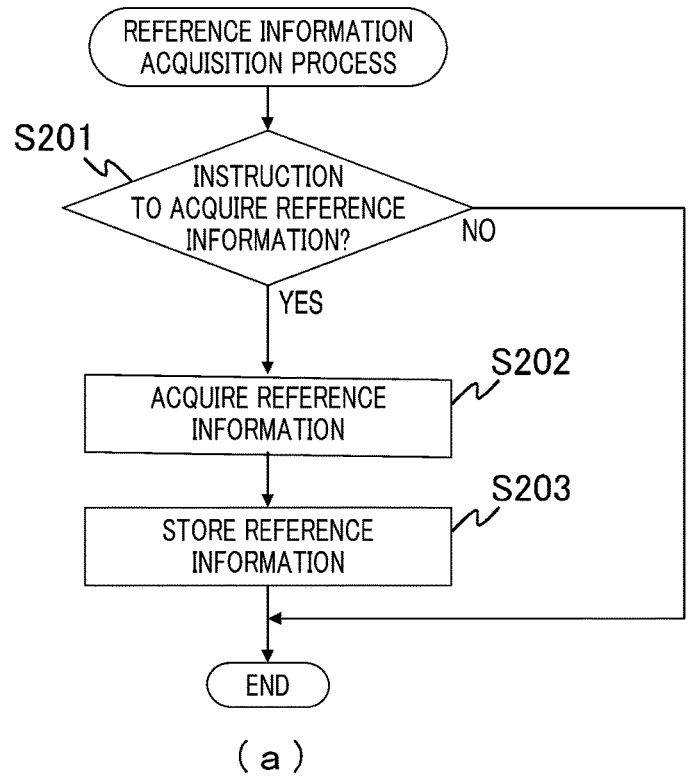
( a )
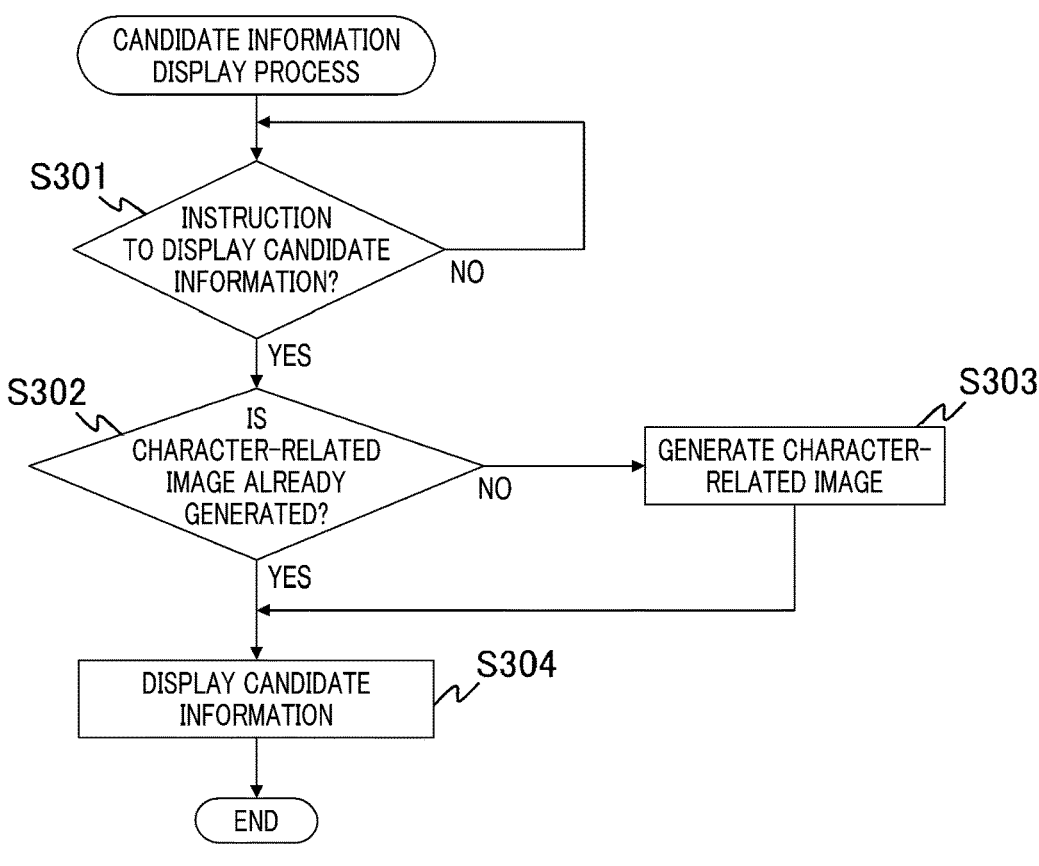
( b )

FIG. 25
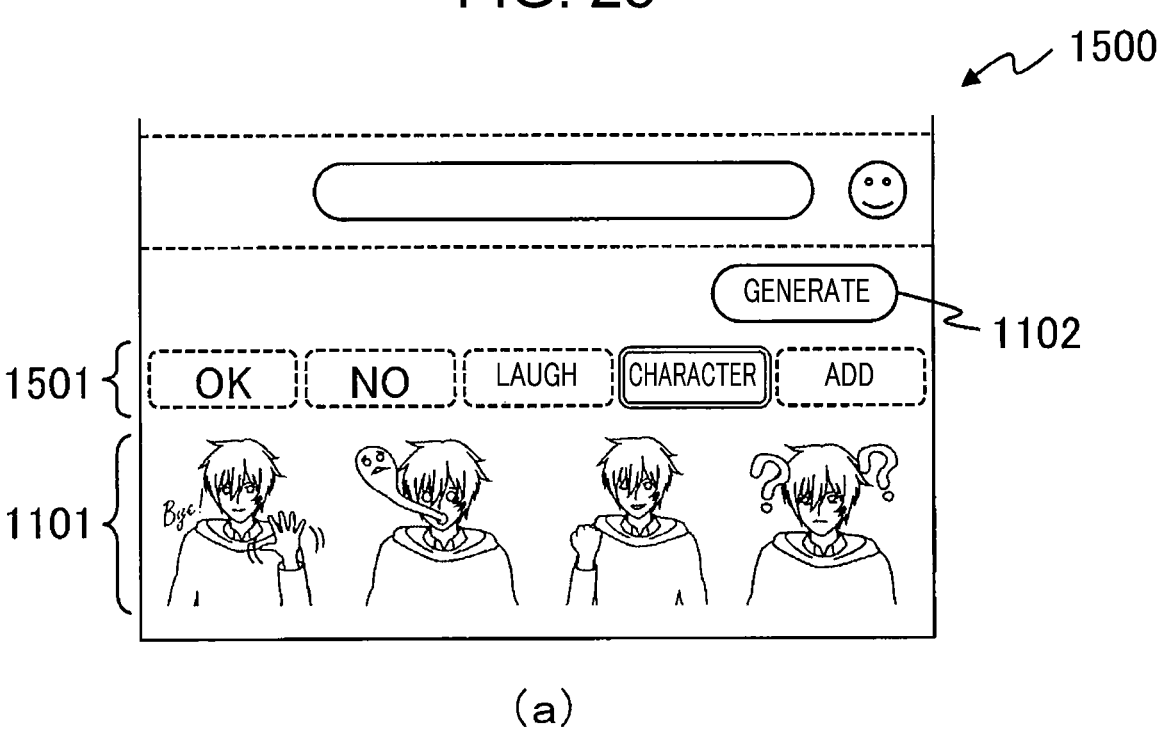
(a)
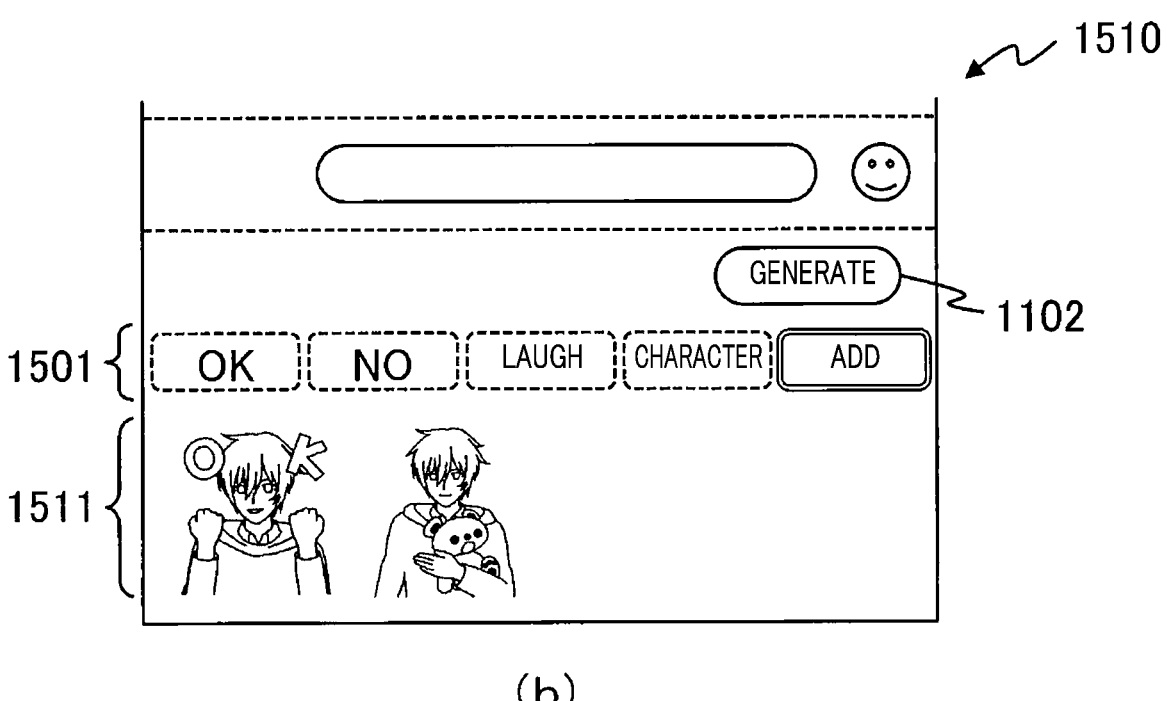
(b)

FIG. 28

INFORMATION PROCESSING SYSTEM, CONTROL METHOD, AND SERVER DEVICE

This application claims the benefit of priority from Japanese Patent Application Nos. 2022-153763 filed on Sep. 27, 2022, 2022-158120 filed on Sep. 30, 2022, 2022-158666 filed on Sep. 30, 2022, and 2023-129811 filed on Aug. 9, 2023, the entire contents of the prior applications being incorporated herein by reference.

TECHNICAL FIELD

This disclosure relates to an information processing system, a control method, and a server device.

BACKGROUND TECHNOLOGY

Conventionally, an instant messenger has been known that realizes a function of transmitting input information such as text information or image information input by an operation of a user of a terminal device, to a terminal device of another user. In recent instant messengers, image information using a character object such as an avatar corresponding to a user can be transmitted as input information from a terminal device of the user to a terminal device of another user.

For example, a related information processing system that uses an avatar stamp as an example of image information that can be transmitted from the terminal device of the user to the terminal device of other users. In the related information processing system, the user can use image information (such as a self-made avatar stamp) corresponding to an object such as an avatar created and registered by the user. Thus, in the related information processing system, the user communicates with other users using an image corresponding to an object representing the user, and can thereby appeal to other users with the object corresponding to the user.

SUMMARY

Problems to be Solved

In the related information processing system, it is necessary for the user to perform a complicated operation of generating information in order to provide abundant information candidates corresponding to the user, creating the problem that it became impossible to encourage users to use the information processing system. In addition, in the related information processing system, when there are many candidates for information corresponding to a user, the operation of selecting information to be provided to other users becomes complicated for the user, creating the problem that it became impossible to encourage users to use the information processing system.

The information processing system, the control method, and the server device disclosed in this specification can improve the user interface for determining information to be provided to other users, without requiring the user to perform complicated operations.

Means for Solving the Problems

The disclosed information processing system is an information processing system comprising one or more computer processors, wherein the one or more computer processors: (i) transmits information related to a display of a first image including a first object indicating a first user to a second terminal device of a second user; (ii) transmits to the second terminal device information related to a display of a second image selected by the first user from a group of a plurality of second images that each include an image related to the first object; (iii) determines whether or not a predetermined condition related to the first user is satisfied; and (iv) when it is determined that the predetermined condition is satisfied, adds to the group a new second image including an image related to the first object.

In addition, in the disclosed information processing system, preferably the one or more computer processors: (i) transmits to the second terminal device information related to a display of first input information, when the first input information is input by the first user; and (ii) displays the first input information input by the first user in order of transmission; and the second image that was selected is one item of the first input information displayed in the order of transmission.

In addition, in the disclosed information processing system, preferably when information related to a display of second input information input by the second user is received, the one or more computer processors displays the first input information input by the first user and the second input information that was received in order of transmission.

In addition, in the disclosed information processing system, preferably the one or more computer processors: changes at least a portion of the first object included in the first image when a change instruction for the first object is input by the first user; and changes at least a portion of each of the first objects of the plurality of the second images belonging to the group when at least a portion of the first object is changed.

In addition, in the disclosed information processing system, preferably an addition to the group of the second images and/or a change to at least a portion of the first object is executed by a predetermined operation being performed by the first user.

In addition, in the disclosed information processing system, preferably the predetermined condition is that the number of items of the first input information displayed in the order of transmission exceeds a first predetermined number.

In addition, in the disclosed information processing system, preferably when information related to a display of an object transmitted from the second terminal device is received while the first image is being displayed, the one or more computer processors displays the object; and the predetermined condition is a condition related to the object.

In addition, in the disclosed information processing system, preferably when information related to a display of a specific object transmitted from the second terminal device is received while the first image is being displayed, the one or more computer processors displays the specific object; the predetermined condition is a condition related to the specific object; and the new second image added when the condition related to the specific object is satisfied includes information related to the specific object.

In addition, in the disclosed information processing system, preferably the predetermined condition is that a number of the second users having a predetermined relationship with the first user is at least a second predetermined number.

In addition, in the disclosed information processing system, preferably the predetermined condition is that a number of days on which information related to a display of the first image is transmitted is at least a predetermined number of days.

In addition, in the disclosed information processing system, preferably the predetermined condition is a condition related to a day on which the first object was generated.

In addition, in the disclosed information processing system, preferably the new second image is an image corresponding to an event in which the first user participates.

In addition, in the disclosed information processing system, preferably the new second image is an image usable only during a predetermined period of time, and the predetermined period of time is a time interval corresponding to a consideration paid by the first user.

The disclosed control method is a control method for an information processing system provided with one or more computer processors, and includes having the one or more computer processors: (i) transmits information related to a display of a first image including a first object indicating a first user to a second terminal device of a second user; (ii) transmits to the second terminal device information related to a display of a second image selected by the first user from a group of a plurality of second images that each include an image related to the first object; (iii) determines whether or not a predetermined condition related to the first user is satisfied; and (iv) when it is determined that the predetermined condition is satisfied, adds to the group a new second image including an image related to the first object.

The disclosed server device is a server device that communicates with a first terminal device of a first user and a second terminal device of a second user, wherein the server device comprises a processor that: (i) receives information related to a display of a first image including a first object indicating the first user, transmitted from the first terminal device; (ii) receives information related to a display of a second image selected by the first user from a group of a plurality of second images each including an image related to the first object, transmitted from the first terminal device; and (iii) transmits to the second terminal device the information related to the display of the first image and the information related to the display of the second image received from the first terminal device; and when it is determined that a predetermined condition related to the first user has been satisfied, a new second image including an image related to the first object is added to the group.

Effects

With the information processing system, the control method, and the server device disclosed in this specification, it is possible to improve the user interface for determining information to be provided to other users, without requiring the user to perform complicated operations.

BRIEF DESCRIPTION OF DRAWINGS

FIG. 4 is a diagram showing one example of the data structure of various tables.

FIG. 6 is a diagram showing one example of various screens displayed on a terminal device.

FIG. 9 is a diagram showing one example of various screens displayed on a terminal device.

FIG. 10 is a diagram showing one example of various screens displayed on a terminal device.

FIG. 12 is a diagram showing one example of various screens displayed on a terminal device.

FIG. 23, section (a), is a diagram showing one example of an operation flow of a reference information acquisition process, and FIG. 23, section (b), is a diagram showing one example of an operation flow of a candidate information display process.

FIG. 25 is a diagram showing one example of various screens displayed on a terminal device.

FIG. 28 is a diagram showing one example of an operation sequence of an information processing system.

DETAILED DESCRIPTION OF EXEMPLARY EMBODIMENTS

Various embodiments of the present disclosure will now be described with reference to the drawings. However, it should be noted that the technical scope of the present disclosure is not limited to those embodiments, but extends to the features described in the claims and equivalents thereof.

(Information Processing System Overview)

Figure 1:
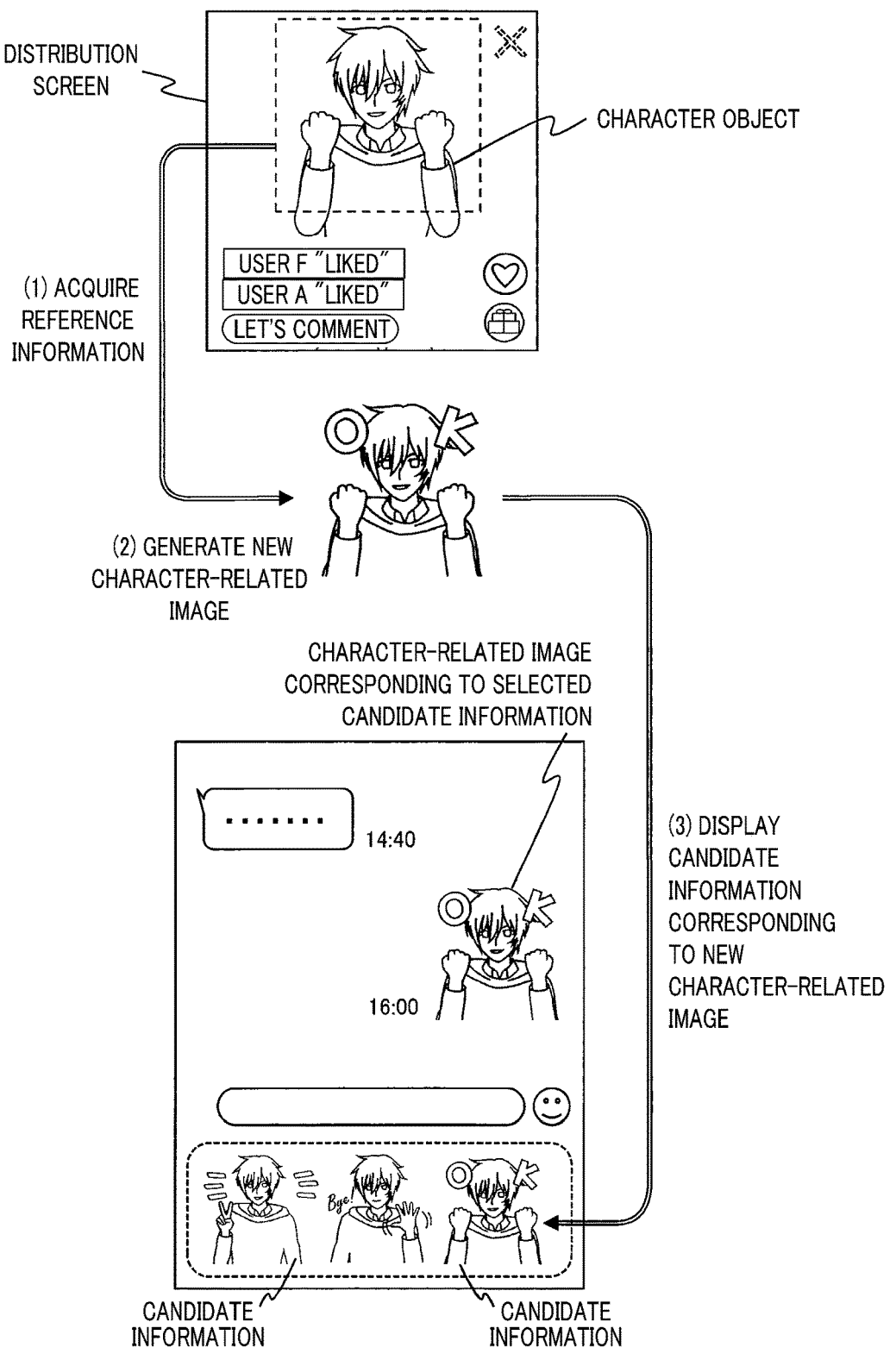
FIG. 1 is a schematic diagram for describing one example of an overview of an information processing system.
Figure 1:
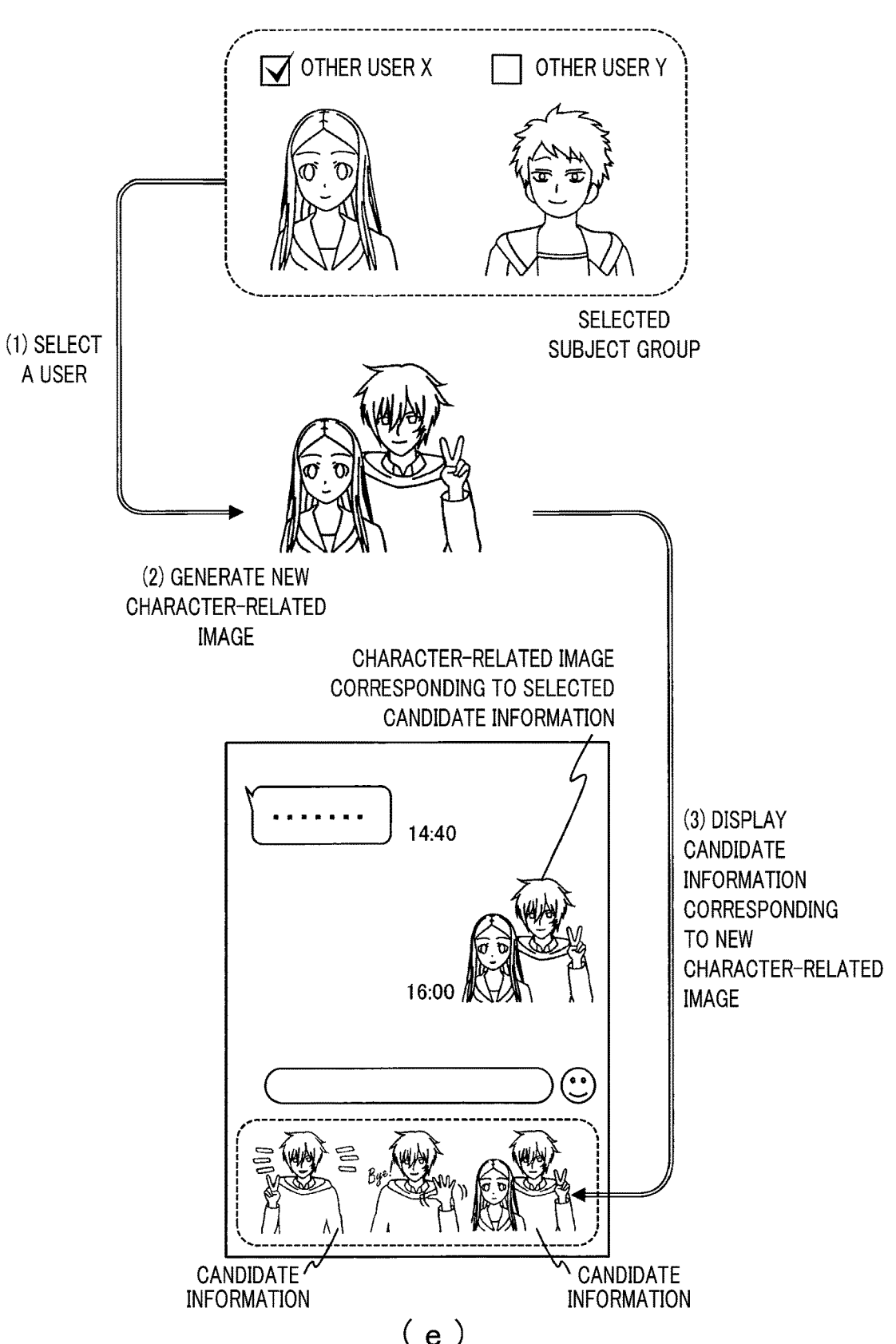

FIG. 1 is a schematic diagram for explaining an example of an overview of an information processing system. The information processing system includes a server device and terminal devices respectively operated by each of a plurality of users. For example, the terminal devices are information processors such as multifunctional mobile phones (so-called "smartphones") owned by the users. For example, the server device is a computer for providing a video distribution service and an information exchange service to the terminal devices via a communication network. The server device may provide the terminal devices with services (online games, and the like) other than the video distribution service and the information exchange service.

The video distribution service is a service in which an image showing a user operating a specific terminal device (a below-described distribution image including a character object showing the user, or the like) is distributed from a specific terminal device to one or more other user terminal devices. The information exchange service is a service in which various types of information such as text information and image information, and the like, are transmitted from one terminal device to another terminal device among a plurality of user terminal devices running instant messengers or the like. The information exchange service may be a service realized by a so-called chat function.

In at least two or more of the services out of the video distribution service, the information exchange service, and the other services, character objects representing each user may be used in conjunction with each other. Using character objects in conjunction with each other means, for example, that a character object whose appearance has been changed in the video distribution service is displayed in the changed appearance in the information exchange service as well. Additionally, using character objects in conjunction with each other may also mean that a character object that is permitted to be used in the information exchange service can also be used in the video distribution service. Using character objects in conjunction with each other may also mean that a character object that is no longer permitted to be used in the information exchange service can no longer be used in the video distribution service.

A terminal device stores a control program such as an application program, and loads the control program into memory in response to a start operation of the user. The terminal device starts at least one of the video distribution service and the information exchange service by input of instructions from the user and execution of commands included in the loaded control program. When the video distribution service is started, the terminal device realizes a plurality of functions related to the video distribution service by executing commands included in the control program. Further, when the information exchange service is started, the terminal device realizes a plurality of functions related to the information exchange service by executing commands included in the control program. When a user wants to use the various services provided by a server device, the user performs a commonly known login operation related to the various services using a terminal device capable of communicating with the server device, and through this a session between the server device and the terminal device relative to the various services is started. This enables the user to participate in the various services and to use the various services.

When the video distribution service is started, for example, the terminal device of the user realizes a generation function that generates character video data including motion data that is based on various types of input data input by the user. For example, the input data is a plurality of items of imaging data acquired at predetermined sampling time intervals by an imaging device provided in the terminal device of the user, and in this case, each item of imaging data shows the user. Character video data is an example of information relating to display of a distribution image including a character object showing the user. The character video data is generated at predetermined time intervals during the video distribution service.

Further, for example, the terminal device of the user displays the distribution image based on the character video data. The terminal device of the user transmits the generated character video data, together with a display of the distribution image, to the terminal device of another user via the server device, so that an output function is realized that transmits the generated character video data to the server device at predetermined time intervals. Also, for example, the terminal device of the user realizes a function that displays a distribution image including a specific object based on information indicating a predetermined instruction of another user transmitted from the server device at predetermined time intervals.

Hereinafter, a user who uses at least a terminal device function of transmitting character video data to a server device may be referred to as a distributing user. A terminal device operated by a distributing user may be referred to as a distributing terminal device. Also, a user who uses at least the function of a terminal device to receive character video data from a distributing terminal device and display a distribution image of a distributing user may be referred to as a viewing user. A terminal device operated by a viewing user may be referred to as a viewing terminal device. Note that one terminal device may have the functions of both a distributing terminal device and a viewing terminal device.

When the video distribution service is started, as shown in section (a) of FIG. 1, the distributing terminal device displays a distribution screen including a distribution image related to a distribution event of the distributing user. One or more viewing terminal devices receives character video data from the distributing terminal device via the server device, and displays the distribution screen including the distribution image related to the distribution event of the distributing user based on the character video data. The distribution image of the distributing user includes a character object representing the distributing user. The character object is displayed so as to move in accordance with motion data of the distributing user included in the character video data.

When the distributing terminal device is equipped with a microphone, the distributing terminal device can acquire audio generated by the distributing user and transmit the acquired audio data of the distributing user to one or more viewing terminal devices. In this case, the distributing terminal device transmits the character video data and audio data of the distributing user to the server device in order to transmit the audio data of the distributing user together with the character video data to one or more viewing terminal devices via the server device. Also, the one or more viewing terminal devices receive, from the server device, the character video data and audio data of the distributing user transmitted to the server device by the distributing terminal device.

When the audio generated by the distributing user is acquired by the distributing terminal device, the motion data of the distributing user included in the character video data includes face motion data indicating the movement of the lips of the distributing user. In this case, the distributing terminal device displays a distribution image including a character object representing the distributing user whose lips move so as to substantially synchronize with the audio generated by the distributing user. When the one or more viewing terminal devices receives the audio data of the distributing user together with the character video data of the distributing user, the audio of the distributing user is output, and a distribution image is displayed that includes the character object indicating the distributing user whose lips move so as to substantially synchronize with the output audio.

The distributing terminal device generates a character-related image including a character object representing the distributing user in accordance with an instruction from the distributing user. For example, the character-related image is a so-called "stamp image" that can be transmitted to the terminal devices of one or more other users by a distributing terminal device in an information exchange service. The character-related image is not limited to the stamp image, and may be any image as long as the image can be used in the service provided by the server device. The other users may be limited to viewing users, or may be users other than distributing users, including viewing users. The other users may be users other than distributing users, not including viewing users.

The character-related image may be used in a service(s) other than an information exchange service provided by the server device. For example, in a video distribution service, a distributing terminal device that has generated a character-related image may be configured to transmit the character-related image to one or more viewing terminal devices. Further, in an online game, the distributing terminal device that generated the character-related image may be configured to be able to transmit the character-related image to the terminal devices of one or more other users participating in the online game.

In the example shown in section (a) of FIG. 1, the distributing terminal device generates three types of character-related images. The character-related images generated by the distributing terminal device are not limited to three types as shown in section (a) of FIG. 1, for two types of character-related images may be generated, or four or more types of character-related images may be generated.

Next, the distributing terminal device sets a usable group including character-related images that can be used in at least one service provided by the server device. The character-related images belonging to (included in) the usable group set by the distributing terminal device are not limited to the two types shown in section (a) of FIG. 1. The usable group may be set so that one type of character-related image belongs to the usable group, or the usable group may be set so that three or more types of character-related images belong to the usable group.

The character-related image that does not belong to (is not included in) the usable group set by the distributing terminal device is not limited to the one type shown in section (a) of FIG. 1. There may be two or more types of character-related images that do not belong to the usable group. There may also be no character-related images that do not belong to the usable group, and in this case, the usable group may be set so that, each time a character-related image is generated, the generated character-related image belongs to the usable group.

An example of the use of a character-related image in an information exchange service will be described below with reference to sections (b) and (c) of FIG. 1. Sections (b) and (c) of FIG. 1 are diagrams showing an example of an information exchange screen displayed by a distributing terminal device using an information exchange service. In the example shown in sections (b) and (c) of FIG. 1, the input information input by the distributing user is displayed in the user display area of the information exchange screen in chronological order from the top of the screen to the bottom, starting with the oldest input information. For example, the user display area is an area near the right side of the information exchange screen. The input information includes text information, still image information, video information, stamp images, and the like. In addition, input information of other users transmitted from the terminal devices of one or more other users is displayed in the other user display area of the information exchange screen in chronological order from the top of the screen to the bottom, starting with the oldest input information. For example, the other user display area is an area near the left side of the information exchange screen.

As shown in section (b) of FIG. 1, the distributing terminal device selectably displays candidate information indicating all or part of the character-related images belonging to the usable group of the distributing user in accordance with an instruction from the distributing user. The candidate information is images identical to the character-related image, a thumbnail image obtained by reducing the character-related images, simplified images obtained by deforming the character-related image, or the like. The candidate information may include text information indicating character-related images, mark images, or the like.

The distributing terminal device displays the character-related image corresponding to the candidate information selected by the distributing user from the displayed candidate information, below the latest input information in the user display area of the information exchange screen (sections (b) and (c) of FIG. 1). Along with displaying the character-related image, the distributing terminal device transmits information regarding the display of the character-related image to the terminal devices of one or more other users via the server device. In this case, terminal devices of the one or more other users that have received the information regarding the display of the character-related image display the character-related image below the latest input information in the other user display area of the information exchange screen. The information regarding display of the character-related image is identification information for identifying the character-related image. The information regarding the display of the character-related image may be a character-related image.

The distributing terminal device determines, automatically at a predetermined timing or in response to an instruction from the distributing user, whether or not a candidate change condition regarding the distributing user is satisfied. As shown in section (c) FIG. 1, the distributing terminal device, upon determining that the candidate change condition is satisfied, automatically adds a new character-related image to the usable group. The new character-related image is a type of character-related image that does not belong to the usable group before the determination that the candidate change condition is satisfied. The candidate change condition is a condition related to use of the information exchange service by the distributing user, a condition related to a parameter associated with the distributing user, a condition related to the character object of the distributing user, and/or a condition set by the distributing user. Details of these conditions will be described later.

The distributing terminal device, upon determining that the candidate change condition is satisfied, may automatically delete at least one of the character-related images belonging to the usable group from the usable group. Upon determining that the candidate change condition is satisfied, the distributing terminal device may replace at least one of the character-related images belonging to the usable group with a new character-related image and establish a new usable group.

The terminal device that generates the character-related image is not limited to the distributing terminal device. As long as a terminal device can use a character object representing the user, the terminal device may generate a character-related image including the character object.

As described above with reference to FIG. 1, when the candidate change condition regarding the distributing user is satisfied, the information processing system, the terminal device, and the server device increase the types of character-related images that can be used. In this way, the information processing system, the terminal device, and the server device make it possible to improve the user interface for determining information to be provided to other users without requiring the user to perform complicated operations.

In addition, when the candidate change condition regarding the distributing user is satisfied, the information processing system, the terminal device, and the server device reduce the types of usable character-related images. In this way, the information processing system, the terminal device, and the server device make it possible for the user to easily select information to be provided to other users without requiring the user to perform complicated operations.

In addition, when the candidate change condition regarding the distributing user is satisfied, the information processing system, the terminal device, and the server device change the type of at least one character-related image among the usable character-related images. In this way, the information processing system, the terminal device, and the server device make it possible to change the information provided to other users without requiring the user to perform complicated operations, thereby preventing the user from getting tired of making choices.

Further, in a conventional information processing system, in order for the user to perform an operation or instruction to increase or decrease the number of character-related image candidates, the user had to suspend or end the service that used the character-related image. Thus, in a conventional information processing system, when the user performs an operation or instruction to increase or decrease the number of character-related image candidates, a plurality of communications relating to suspension or termination of the service and resumption of the suspended service occur, and as a result, the problem arises that the processing load on the terminal device and/or the communication load between the terminal device and the server device increases.

On the other hand, in the information processing system, the terminal device, and the server device disclosed in the present embodiment, the diversification of information provided to other users can be achieved by determining whether or not the candidate change condition is satisfied, the selection of information provided to other users can be made easier, and/or the information provided to other users can be changed so that selection by the user does not become tiresome, and the processing load on the terminal device and/or the communication load between the terminal device and the server device can be reduced. Further, with the information processing system, the terminal device, and the server device disclosed in the present embodiment, it is possible to automatically change the character-related image with a simple interface while continuing execution of the service. Also, in the present embodiment, the diversification of information provided to other users can be achieved by an additional generation process that generates a new character-related image based on information regarding character objects representing other users other than the user who instructed the generation of the character-related image, and/or the information provided to other users can be changed so that selection by the user does not become tiresome, and the processing load on the terminal device and/or the communication load between the terminal device and the server device can be reduced. Further, the information processing system, the terminal device, and the server device disclosed in this embodiment can diversify the character-related images provided to other users, so it is possible to increase the desire of users to use various services that can use character-related images.

Further, in the example shown in FIG. 1, the user who uses the information exchange service and another user may be users having a predetermined relationship. For example, the other user who has a predetermined relationship with the user is a mutual follower of the user. When a user follows another user and the other user also follows the user (the user and the other user follow each other), the user and the other user become mutual followers. Further, the other user having a predetermined relationship with the user may be another user who is in a mutual following relationship with a predetermined user who is a mutual follower of the user. In addition, the other user having a predetermined relationship with the user may be another user who has a friend relationship with the user, or another user for whom specific information (telephone number, email address, predetermined ID (identification), or the like) is stored in the terminal device of the user. Further, when the user is a distributing user, the other user having a predetermined relationship with the user may be a viewing user who has viewed a distribution image distributed by the user. In this case, when the user and the other user having a predetermined relationship perform an information exchange service as shown in FIG. 1, a predetermined information exchange group formed by the user and the other user may be temporarily created by the terminal device of the user or of the other user, or by the server device.

It should be noted that the above description of FIG. 1 is merely a description for deepening understanding of the content of the present disclosure. The present disclosure is embodied in particular in the embodiments described below, and may be embodied in various variations without substantially departing from the principles of the disclosure. All such variations are included within the scope of the claims and the disclosure of this specification.

For example, in a variation, the distributing terminal device executes an additional generation process of generating a new character-related image based on reference information regarding the character object representing the distributing user. The reference information is information indicating the displayed distribution image, response information input by a viewing user, information regarding a wearable object currently worn or worn in the past by the character object, information regarding an additional object displayed within the distribution screen, information regarding an additional object selected by a viewing user, information regarding an owned object associated with the distributing user, a profile image of the distributing user or the character object, and/or image information indicating the inside of the virtual space where the character object exists. The reference information is not limited to the above-mentioned examples, and may be any information as long as such is information related to the distributing user or information related to the character object representing the distributing user. Details of the reference information will be described later.

An example of the additional generation process is outlined below with reference to section (d) of FIG. 1. Hereinafter, a character object representing a distributing user may be simply referred to as a character object.

First, the distributing terminal device acquires reference information in response to an instruction from the distributing user or the viewing user, or automatically. In the example shown in (1) of section (d) of FIG. 1, image information of at least a part of the displayed distribution image is acquired as the reference information. The image information acquired as the reference information includes an image indicating a character object. The image information acquired as reference information need not include an image indicating a character object.

As the reference information, motion data of the character object in the distribution image may be acquired at a predetermined timing. The predetermined timing may be a timing corresponding to an instruction from the distributing user or the viewing user, or a timing that is automatically determined. The acquired motion data may be one item of motion data or a plurality of items of continuous motion data.

Next, the distributing terminal device generates a new character-related image based on the acquired reference information ((2) in section (d) of FIG. 1). For example, when the reference information is image information of at least a part of the distribution image, the distributing terminal device sets the part of the image information as a character-related image. The distributing terminal device may use an image generated by superimposing a predetermined image on the part of the image information as the character-related image. When the reference information is motion data, the distributing terminal device generates the character-related image based on the motion data acquired as the reference information and the model data of the character object.

Next, the distributing terminal device makes the new character-related image belong to (be included in) the usable group, and as shown in (3) of section (d) of FIG. 1, selectably displays candidate information indicating the new character-related image. Then, when one item of candidate information is selected by the distributing user from the displayed candidate information, the distributing terminal device displays the character-related image corresponding to the one item of candidate information, below the latest input information in the user display area of the information exchange screen.

The distributing terminal device may cause the new character-related image to belong to (be included in) a usable group, and may also delete other character-related images included in the usable group. The other character-related images to be deleted may be all the character-related images included in the usable group other than the new character-related image. As a result, the character-related images already included in the usable group are changed to new character-related images.

As described above with reference to FIG. 1, the information processing system, the terminal device, and the server device increase the types of character-related images that can be used, based on the information regarding the distributing user or the information regarding the character object representing the distributing user. In this way, the information processing system, the terminal device, and the server device make it possible to improve the user interface for determining information to be provided to other users without requiring the user to perform complicated operations.

In addition, the information processing system, the terminal device, and the server device change a character-related image that is based on the information regarding the distributing user or the information regarding the character object representing the distributing user to at least one character-related image among the usable character-related images. In this way, the information processing system, the terminal device, and the server device make it possible to change the information provided to other users without requiring the user to perform complicated operations, thereby preventing the user from getting tired of making choices.

Further, in a conventional information processing system, in order for the user to perform an operation or instruction to increase, decrease or change the character-related image candidates, the user had to suspend or end the service using the character-related image. Thus, in a conventional information processing system, when the user performs an operation or instruction to increase, decrease or change the character-related image candidates, a plurality of communications relating to suspension or termination of the service and resumption of the suspended service occur, and as a result, the problem arises that the processing load on the terminal device and/or the communication load between the terminal device and the server device increases.

On the other hand, in the information processing system, the terminal device, and the server device disclosed in the present embodiment, the diversification of information provided to other users can be achieved by the additional generation process that generates the new character-related image based on the reference information, and/or the information provided to other users can be changed so that selection by the user does not become boring, and the processing load on the terminal device and/or the communication load between the terminal device and the server device can be reduced. Further, with the information processing system, the terminal device, and the server device disclosed in the present embodiment, it is possible to automatically change the character-related image with a simple interface while continuing execution of the service.

Further, in the example shown in FIG. 1, the user who uses the information exchange service and other users may be users having a predetermined relationship. For example, the other users who have a predetermined relationship with the user are mutual followers of the user. Note that when a user follows another user and the other user also follows the user (the user and the other user follow each other), the user and the other user become mutual followers. Further, the other user having a predetermined relationship with the user may be another user who is in a mutual following relationship with the predetermined user who is a mutual follower of the user. In addition, the other user having a predetermined relationship with the user may be another user who has a friend relationship with the user, or specific information (telephone number, email address, predetermined ID (identification), or the like) stored in the terminal device of the user. Further, when the user is a distributing user, the other user having a predetermined relationship with the user may be a viewing user who has viewed a distribution image distributed by the user. In this case, when the user and the other user having a predetermined relationship perform an information exchange service as shown in FIG. 1, a predetermined information exchange group configured by the user and the other user may be temporarily created by the terminal device of the user or of the other user, or the server device.

For another variation shown in section (e) of FIG. 1, the additional generation process is outlined below.

First, the distributing terminal device selects one or more users from a selection target group made up of one or more other users, automatically or in response to an instruction from the distributing user. In the example shown in (1) of section (e) of FIG. 1, other user X is selected from a selection target group to which two other users (other user X and other user Y) belong.

The users belonging to the selection target group are not limited to other users who participate in the information exchange service and can exchange information with the distributing user. The selection target group may include one or more users who have a predetermined relationship with the distributing user, or the selection target group may include only one or more users who have a predetermined relationship with the distributing user. Furthermore, the selection target group may include users who participate in services other than information exchange, or the selection target group may include only users who participate in services other than information exchange.

When the other user X is selected, the distributing terminal device generates a new character-related image that includes both a character object representing the distributing user and a character object representing the selected other user X ((2) of section (e) of FIG. 1). The new character-related image may include various objects other than the character objects (objects representing text, background objects, or the like). The character objects included in the new character-related image may be controlled to automatically perform a predetermined action.

Next, the distributing terminal device makes the new character-related image belong to (be included in) the usable group, and as shown in (3) of section (e) of FIG. 1, selectably displays candidate information indicating the new character-related image. Then, when one item of candidate information is selected by the distributing user from among the displayed candidate information, the distributing terminal device displays the character-related image corresponding to the one item of candidate information, below the latest input information in the user display area of the information exchange screen.

The distributing terminal device may cause a new character-related image to belong to (be included in) a usable group, and may also delete other character-related images included in the usable group. The other character-related images to be deleted may be all the character-related images included in the usable group other than the new character-related image. As a result, the character-related images already included in the usable group are changed to new character-related images.

(Information Processing System 1)

Figure 2:
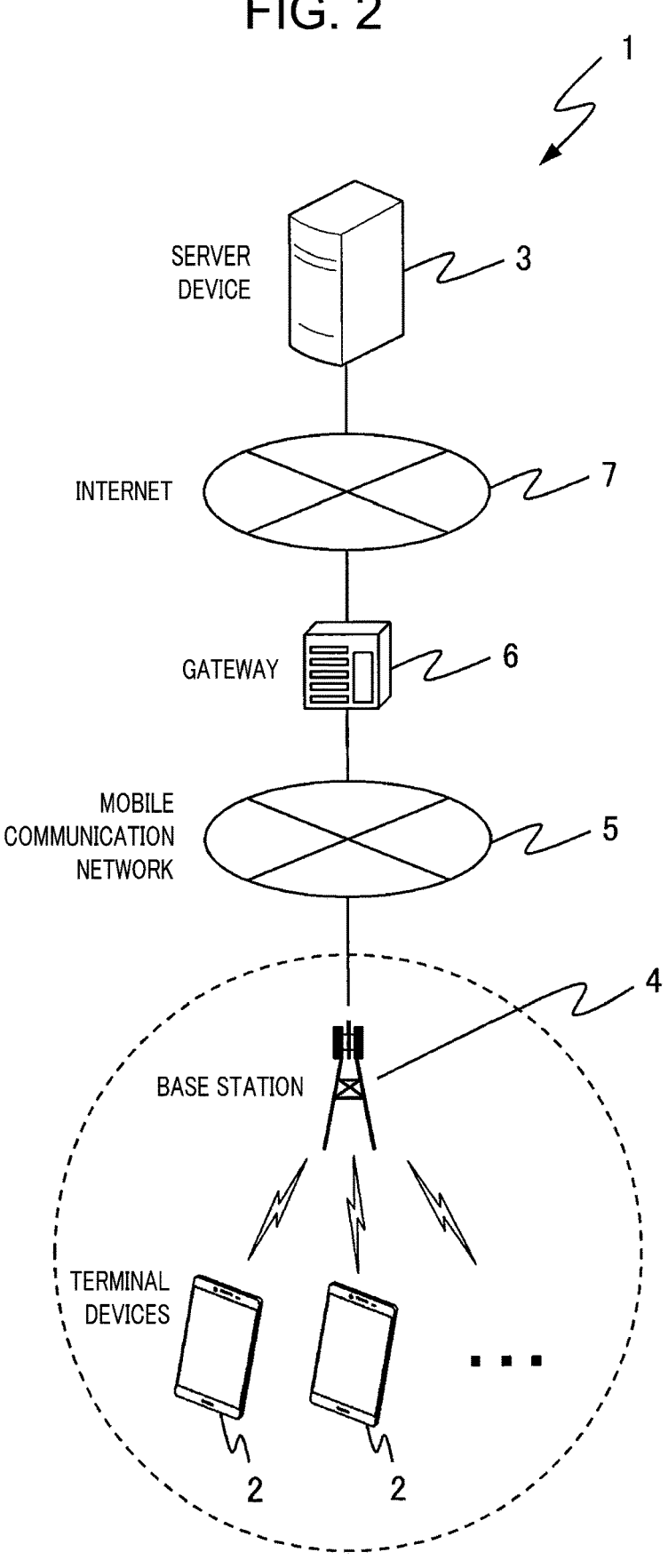
FIG. 2 is a diagram showing one example of a schematic configuration of an information processing system.

FIG. 2 is a diagram showing one example of a schematic configuration of an information processing system 1. The information processing system 1 includes terminal devices 2 operated respectively by a plurality of users, and a server device 3. The terminal device 2 and the server device 3 are interconnected via a base station 4, a mobile communication network 5, a gateway 6, and a communication network such as the Internet 7, for example. Communication is performed between the terminal devices 2 and the server device 3 based on a communication protocol such as Hypertext Transfer Protocol (HTTP), or the like. Additionally, a connection may first be established between the terminal device 2 and the server device 3 by HTTP communication, and then communication may be accomplished based on WebSocket, with which two-way communication can be performed at a lower cost (less communication load and processing load) than HTTP communication. The communication method between the terminal device 2 and the server device 3 is not limited to the above-described methods, and technology of any communication method may be used between the terminal device 2 and the server device 3 as long as the present embodiment can be realized.

The communication network may be a Local Area Network (LAN) or a Wide Area Network (WAN) or any combination of LAN and WAN. The communication network may include a Public Switched Telephone Network (PSTN), an Integrated Services Digital Network (ISDN) and/or sub-networks. The communication network may be a wired communication network such as an Ethernet network cable, a Universal Serial Bus (USB) cable, or the like. The communication network may be a wireless communication network such as a cellular network including EDGE, 3G, 4G and/or 5G wireless cellular systems. Wireless networks may include Wi-Fi (registered trademark), wireless LAN, Bluetooth (registered trademark), or other known wireless forms of communication.

The terminal device 2 is an information processor such as a smart phone or the like. The terminal device 2 may be a mobile phone, a notebook PC, a tablet terminal, a tablet PC, a head mounted display (HMD), an electronic book reader, a wearable computer, or the like. The terminal device 2 may be a portable game machine, a game console, or the like. The terminal device 2 may be any information processor as long as such is capable of displaying character objects representing the user and other users, outputting audio of other users, and exchanging information with other users.

In the example shown in FIG. 2, one server device 3 is illustrated as a component of the information processing system 1, but the server device 3 may be a set of a plurality of physically separate server devices 3. In this case, each of the plurality of server devices 3 may have the same function, or may have the functions of one server device 3 in a distributed manner. For example, a server device 3a for realizing the video distribution service and a server device 3b for realizing the information exchange service may be components of the information processing system 1.

(Terminal Device 2)

Figure 3:
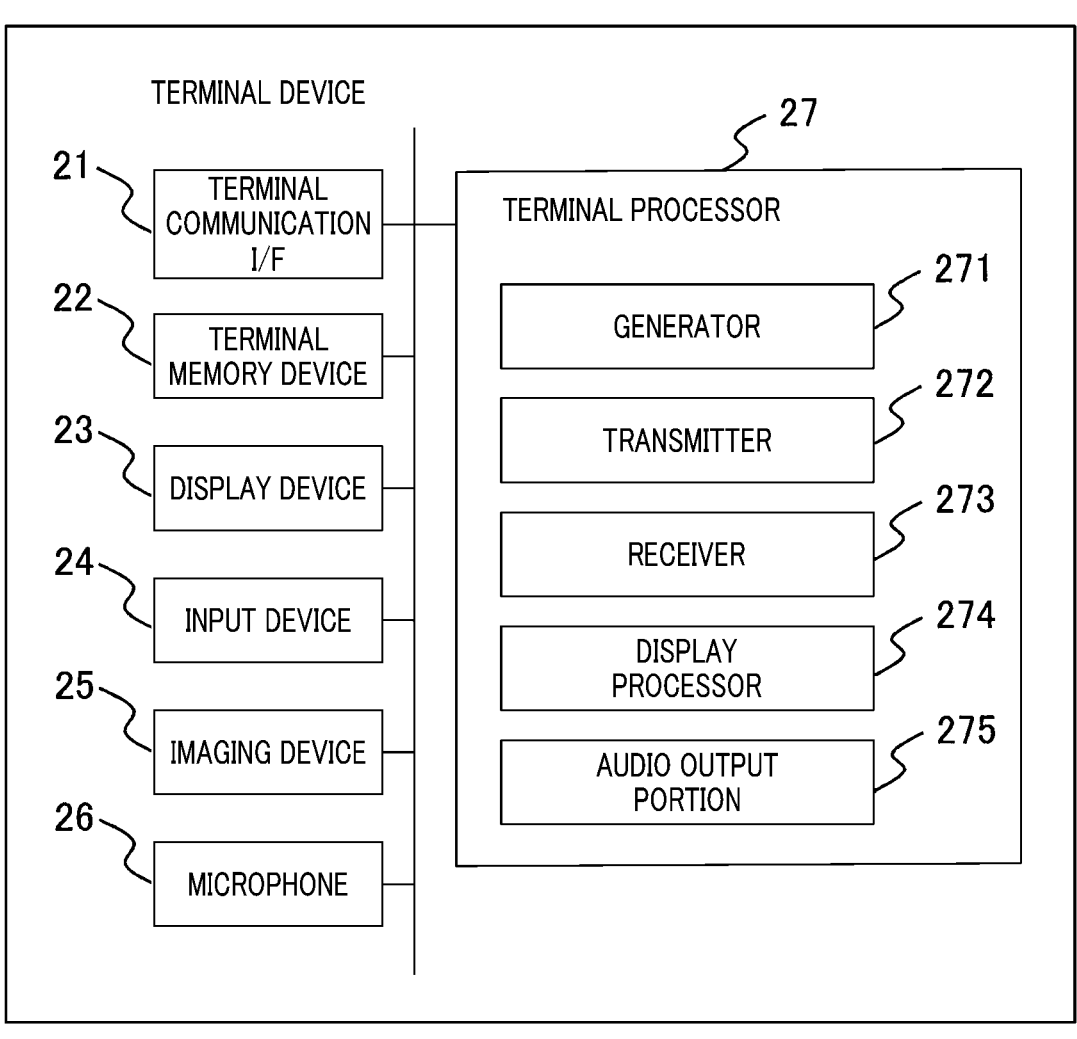
FIG. 3 is a diagram showing one example of a schematic configuration of a terminal device.

FIG. 3 is a diagram showing one example of a schematic configuration of the terminal device 2. The terminal device 2 connects to the server device 3 via the base station 4, the mobile communication network 5, the gateway 6, and the communication network such as the Internet 7, and communicates with the server device 3. The terminal device 2 generates character video data including motion data according to various data (imaging data, and the like) input by the user, and transmits the generated character video data and/or user audio data to the server device 3. In addition, the terminal device 2 receives character video data of another user and/or audio data of another user transmitted from the server device 3, and based on the received character video data and/or audio data, displays the character object of the other user and/or outputs the audio of the other user. In addition, the terminal device 2 chronologically displays input information such as text information, still image information, video information, and stamp images input by the user, and input information input by another user and received from the terminal device 2 of the other user. In order to realize such functions, the terminal device 2 includes a terminal communication interface (I/F) 21, a terminal memory device 22, a display device 23, an input device 24, an imaging device 25, a microphone 26, and a terminal processor 27.

The terminal communication I/F 21 is implemented as hardware, firmware, communication software such as a TCP/IP (Transmission Control Protocol/Internet Protocol) driver or a PPP (Point-to-Point Protocol) driver, or a combination thereof. The terminal device 2 can transmit data to and receive data from other devices such as the server device 3 via the terminal communication I/F 21. Additionally, the terminal communication I/F 21 may include a network controller such as an Ethernet PRO network interface card for interfacing with the communication network. The network controller may also comply with other direct wireless communication standards such as Bluetooth (registered trademark), Near Field Communication (NFC), infrared, or the like.

The terminal memory device 22 is, for example, a semiconductor memory device such as a ROM (Read Only Memory) or a RAM (Random Access Memory) or the like. The terminal memory device 22 stores operating system programs, driver programs, control programs, data, and the like, used for processing in the terminal processor 27. The driver programs stored in the terminal memory device 22 include an output device driver program that controls the display device 23, an input device driver program that controls the input device 24. The control programs stored in the terminal memory device 22 are, for example, application programs for realizing various functions related to various services including a video distribution service and an information exchange service. The control programs may be transmitted from the server device 3 or another device.

The terminal memory device 22 stores, as data, identification information (for example, a user ID) for uniquely identifying the user who operates the terminal device 2, and the like. The terminal memory device 22 also stores, as data, background data, model data, and the like. The terminal memory device 22 also stores, as data, a user table T1, an object table T2, a group table T3, and a reference information table T4. In addition, the terminal memory device 22 may temporarily store data related to predetermined processing.

The background data is asset data for constructing a virtual space in which the character object of the user exists in the distribution image. Background data includes data for drawing the background of the virtual space, data for drawing various objects included in the distribution image, and data for drawing various background objects displayed in the distribution image other than these. The background data may include object position information indicating positions of various background objects in the virtual space.

In addition, the terminal memory device 22 stores, as data, a plurality of types of motion data for the character-related image. The motion data for the character-related image includes body motion data that is a digital representation of the positions and orientations of each part (head, arms, hands (including fingers), chest, torso, legs, or other parts) for causing the character object to perform predetermined motions. Also, the motion data for the character-related image may include face motion data for causing the character object to make a predetermined facial expression.

The motion data for the character-related image may be a set of a plurality of pieces of continuous motion data to express the character object moving for a predetermined time interval (for example, 3 seconds). One piece of motion data may be used as the motion data for the character-related image. When the motion data for the character-related image is one piece of motion data, the character object included in the character-related image generated by the motion data for the character-related image does not move.

In addition, the terminal memory device 22 may also store, as data, object data for character-related images, such as various background objects, gift objects, and object data for expressing letters, in addition to motion data for character-related images. By using the character-related image object data related to the design of such character-related images, it is possible to diversify expressions of the character-related images. In this case, the terminal memory device 22 may store an object IDs associated with the object data for the character-related images.

The display device 23 is a liquid crystal display. The display device 23 may be an organic EL (Electro-Luminescence) display or the like. The display device 23 displays, on a display screen, a video corresponding to video data, and/or a still image corresponding to still image data, supplied from the terminal processor 27. In addition, the display device 23 need not be a component of the terminal device 2, and in this case, the display device 23 may be an HMD display capable of communicating with the server device 3, a projector for projection mapping capable of communicating with the terminal device 2 via a wired or wireless connection, a retinal projection type projection device, or the like. In addition, the terminal device 2 may include a display controller such as a graphics card or graphics adapter for interfacing with the display device 23.

The input device 24 is a pointing device such as a touch panel or the like. When the input device 24 is a touch panel, the input device 24 can detect various touch operations such as tapping, double tapping, and dragging by the user. The touch panel may include a capacitive proximity sensor and be configured to detect a user's non-contact operation. The input device 24 may be an input key or the like. The user can use the input device 24 to input letters, numbers and symbols, positions on the display screen of the display device 23, and the like. When operated by the user, the input device 24 generates a signal corresponding to the operation. The input device 24 then supplies the generated signal to the terminal processor 27 as a user instruction. Note that the terminal device 2 may include an I/O interface for interfacing with the input device 24. The I/O interface may connect with various peripherals other than the input device 24.

The imaging device 25 is a camera having an imaging optical system, an imaging element, an image processor, and the like. The imaging optical system is, for example, an optical lens, and forms an image of the light from the subject on an imaging surface of the imaging device. The imaging element is a CCD (Charge Coupled Device), a CMOS (Complementary Metal Oxide Semiconductor), or the like, and outputs an image of a subject image formed on the imaging surface. The image processor creates video data in a predetermined file format for each predetermined period from images continuously generated by the imaging device, and outputs the video data as imaging data. Alternatively, the image processor creates still image data in a predetermined file format from the image generated by the imaging device, and outputs the still image data as imaging data.

The microphone 26 is a sound-collecting device configured to acquire sounds uttered by the user and convert such into audio data. The microphone 26 is configured to be able to acquire audio input of the user, and converts the audio input of the user acquired by the microphone 26 into audio data, and outputs the audio data to the terminal processor 27.

The terminal processor 27 is a processor that loads an operating system program, a driver program and a control program stored in the terminal memory device 22 into memory and executes the instructions contained in the loaded programs. The terminal processor 27 is, for example, an electronic circuit such as a CPU (Central Processing Unit), an MPU (Micro Processing Unit), a DSP (Digital Signal Processor), a GPU (Graphics Processing Unit), or a combination of various electronic circuits. The terminal processor 27 may be realized by integrated circuits such as ASICs (Application Specific Integrated Circuits), a PLD (Programmable Logic Device), an FPGA (Field Programmable Gate Array), an MCU (Micro Controller Unit), or the like. Although the terminal processor 27 is illustrated as a single component in FIG. 3, the terminal processor 27 may be a collection of a plurality of physically separate processors. For example, a plurality of processors cooperatively operating in parallel to execute instructions may be implemented.

It should be noted that the functions realized by the components disclosed in this specification (for example, the terminal processor 27 and/or the server processor 33 (described below)) may be implemented in "circuitry" or "processing circuitry" including general-purpose processors, special-purpose processors, integrated circuits, ASICs, CPUs, conventional circuits, and/or combinations thereof, programmed to realize the described functions. Processors, including transistors and other circuits, are considered "circuitry" or "processing circuitry." The processor may be a "programmed processor" that executes programs stored in memory.

As used herein, "circuitry," "unit," and "means" are hardware programmed to realize, or hardware that performs, the functions described. The hardware may be any hardware disclosed herein or any hardware that is programmed to realize or that performs the functions described.

If the hardware is a processor considered to be a type "circuitry," then the "circuitry," "unit" or "means" is a combination of the hardware and the software used to configure the hardware and/or a processor.

"Processing circuitry" may be used to control any computer-based and cloud-based control process. Descriptions or blocks in the operational sequences, operational flows and flowcharts described below can be understood to show a portion of the modules, segments, or code containing one or more executable instructions for implementing particular logical functions or steps of the control process. These alternative implementations are also included within the scope of exemplary embodiments of the present advancements. For example, certain logical functions or steps of the control process may be performed in an order different from that disclosed, such as substantially concurrently, or in the reverse order from the order disclosed.

"Processing Circuitry" may include a CPU that executes one or more of the control processes disclosed in this specification. Process data and instructions may be stored in memory. The process data and instructions may be stored on a storage medium disk such as a hard disk drive (HDD) or a portable storage medium. The process data and instructions may also be stored remotely.

The claimed advancements are not limited by the form of computer-readable medium on which the instructions of the processes of the present advancements are stored. For example, the instructions may be on stored on a CD, DVD, flash memory, RAM, ROM, PROM, EPROM, EEPROM, hard disk, or any other non-volatile computer-readable medium of an information processor (another server device or computer or the like) with which the "processing circuitry" communicates. The instructions may be stored in network-based storage, cloud-based storage, or other mobile-accessible storage so long as the instructions are executable by the "processing circuitry."

The claimed advancements may be provided as utility applications, background daemons, operating system components, or combinations thereof. In addition, the claimed advancements may be executed by operating systems including Microsoft Windows (registered trademark), UNIX (registered trademark), Solaris, LINUX (registered trademark), Apple MAC-OS, Apple iOS, and other systems known to those skilled in the art, in cooperation with a CPU.

The functions and features disclosed in this specification may be performed by various distributed components of the information processing system 1. For example, one or more processors may perform these system functions, and each processor may be distributed among a plurality of components that can communicate within a network. Distributed components may include various human interfaces, communication devices (display monitors, smartphones, tablets, personal digital assistants (PDAs), and the like), or one or more client and server devices that share processing. The input to the information processing system 1 may be direct input by a user or remote input by a real-time or batch process. Moreover, some of the implementations may be performed in modules or hardware other than those disclosed in this specification, in which case other implementations are also within the scope of the claims.

The terminal processor 27 functions as a generator 271, a transmitter 272, a receiver 273, a display processor 274, and an audio output portion 275 by executing various commands included in the control program. Functions of the generator 271, the transmitter 272, the receiver 273, the display processor 274, and the audio output portion 275 are described below.

(Various Tables)

FIG. 4 is a diagram showing an example of the data structure of a user table T1, an object table T2, and a group table T3 stored in the terminal memory device 22. At least one of the user table T1, the object table T2, and the group table T3 may be stored in the server memory device 32 of the server device 3. In this case, the terminal device 2 may receive the latest table stored in the server memory device 32 and store such in the terminal memory device 22 at a predetermined timing.

(User Table T1)

Section (a) of FIG. 4 is an example of the data structure of the user table T1 for managing users who use the services provided by the server device 3. Users managed in the user table T1 are distributing users, but users other than distributing users may be managed. In the user table T1, for each user, a user ID, a user name, a character object of the user, objects owned by the user, used objects, and the like, are stored in association with each other. In the user table T1, coins owned by the user (information indicating the total amount of "coins" of virtual monetary value owned by the user) and/or user points, or the like, are stored in association with the user ID of the user. The user ID is an example of identification data for uniquely identifying each user. The title is an example of data indicating the title of each user.

For example, a character object is a model ID for identifying model data for generating animation of the character object. The model data is stored in the terminal memory device 22 in association with the model ID. The model data may be three-dimensional model data for generating three-dimensional animation, or two-dimensional model data for generating two-dimensional animation. The model data includes, for example, rig data (so-called "skeleton data") indicating the skeleton of the face of the character object and parts other than the face, and surface data indicating the surface shape and texture of the character object. The model data may include a plurality of different model data. Each of the plurality of model data may have rig data different from each other, or may have the same rig data. Each of the plurality of model data may have surface data different from each other, or may have the same surface data. Note that a plurality of object IDs associated with each of a plurality of partial objects forming the character object may be associated with the model ID. In this case, 3D model data for generating a 3D animation may be stored in the terminal memory device 22 and the server memory device 32 for each object ID of a plurality of partial objects. In this case, in the character object display process, the object IDs of a plurality of partial objects associated with the model ID are extracted, the three-dimensional model data (of each partial object) corresponding to each object ID is specified, and a character object may be displayed based on the specified three-dimensional model data (of each partial object). Also, image information corresponding to each three-dimensional model data may be stored.

An owned object is an object ID indicating an object owned by each user. Owned objects are wearable objects that can be associated with specific parts of the character object, wallpaper objects that are arranged behind the character object of the user in the distribution image, and the like. Details of the wearable object and the wallpaper object will be described later. An owned object is not limited to the above examples, and may be any object as long as such can be displayed on the distribution screen. An owned object may be an object that a user came to own as a result of an event in which the user participated or as a result of a selection game (e.g., a lottery game) performed by the user. The owned object may also be an object owned by the user as a result of the user consuming "coins" of virtual monetary value in a purchase function of the information processing system 1.

A used object is an object ID indicating an object used in the distribution image being displayed on the terminal device 2 of the user. For example, when a change instruction of the user is input during a video distribution service, a wearable object owned by the user as an owned object of the user is mounted on the user's character object included in the distribution image being displayed. In this case, the object ID of the wearable object worn by the character object of the user is stored in the user table T1 in association with the user ID as the used object. Further, for example, when a change instruction of the user is input during a video distribution service, a wallpaper object owned by the user as an owned object is arranged behind the character object of the user in the distribution image being displayed. In this case, the object ID of the wallpaper object arranged in the distribution image is stored in the user table T1 in association with the user ID as the used object.

(Object Table T2)

Section (b) of FIG. 4 is an example of the data structure of the object table T2 that manages objects selected as additional objects. An additional object is, for example, a gift object presented by a viewing user to a distributing user. In the object table T2, the object ID, the title, image information, a rarity level, a placement location, and the like, of each additional object are stored in association with each other.

The object ID is an example of identification data for uniquely identifying each additional object. The image information is one or more still images corresponding to each additional object. The image information may be one or more videos corresponding to each additional object. The rarity level is information indicating the degree of rarity of each additional object. The placement location is information indicating the location where the image information of each additional object is displayed. Note that when the display position and display range of the character object are determined, information indicating the position relative to the character object may be stored as the placement location. Instead of the image information, model data of an additional object may be stored. The model data of the additional object includes surface data and rig data representing a three-dimensional shape, and an image of the additional object viewed from a predetermined viewpoint is drawn based on the model data.

The additional objects are classified into multiple types (categories). For example, additional objects include effect objects used as effect gifts, normal objects used as normal gifts, wearable objects used as wearable gifts, and message objects used as message gifts. The additional objects may include a wallpaper object placed behind the character object in the distribution image. Information indicating the type (category) of the additional object may be stored in the object table T2 in association with the object ID of the additional object. The image information and the placement location will be described below according to the types of additional objects.

An effect object is an object that affects the overall impression of a distribution image. The effect object is, for example, an object resembling confetti. When the effect object is an object resembling confetti, an image representing a plurality of papers is stored as the image information.

Information indicating "space" is stored as the placement location of the effect object. For example, an object resembling confetti is displayed over the entire distribution image. The effect object may be displayed on the entire distribution screen including the distribution image of the distributing user in accordance with the instruction of a viewing user. The effect object may be displayed so as to overlap with a character object included in the distribution image. The effect object is displayed without being associated with a specific part of the character, unlike wearable objects, which will be described later. In this way, the terminal device 2 of the information processing system 1 displays the effect object in the distribution image of the distributing user in accordance with the instruction of the viewing user, and through this it is possible to change the overall impression of the distribution image of the distributing user compared to before the effect object was displayed.

A normal object is, for example, an object that resembles a stuffed animal, a bouquet of flowers, an accessory, or an item suitable as a gift or present. Information indicating "space" is stored as the placement location of the normal object. For example, the normal object is associated with information about a predetermined movement route, and the normal object moving along the predetermined movement route within the distribution image is displayed. The information indicating the "space" stored as the placement location of the "normal object" may be classified into a plurality of types. The plurality of types of "space" are, for example, "central space" (area in the center of the image when the distribution image is divided into left, right and center), "left space" (area on the left side of the image when the distribution image is divided into left, right and center), and "right space" (area on the right side of the image when the distribution image is divided into left, right and center). In addition, the plurality of types of "space" may be "central space" (the area in the center of the image when the distribution image is divided into upper, lower, and center), "upper space" (the area on the upper side of the image when the distribution image is divided into upper, lower, and center), and "lower space" (the area on the lower side of the image when the distribution image is divided into upper, lower, and center). In this case, the movement route associated with the normal object is set within the type of "space" associated as the location of the normal object. For example, when information indicating a "right space" is stored for the normal object, the normal object is associated with information on a movement route for moving within the area on the right side of the image when the distribution image is divided into left, right and center. In addition, a normal object may be displayed that moves according to a predetermined movement rule from a position set for each normal object in the distribution image or a position automatically determined at random. The predetermined movement rule is, for example, a movement rule that is set so that the object moves as if in free fall. In addition, the normal object may be displayed so as to overlap the character object. In this case, the normal object is displayed without being associated with a specific part of the character object, unlike a wearable object, which will be described later. Also, the normal object may be displayed so as to accomplish movement akin to bouncing back at the timing of contact with the character object.

When the normal object is displayed overlapping the character object included in the distribution image, for example, the normal object may be displayed so as to overlap "a portion other than the 'head' including the 'face'" of the character object. In this case, the normal object is displayed so as not to overlap the "head" of the character object. In addition, the normal object may be displayed so as to overlap "a portion other than the 'upper body' including the 'face'" of the character object. In this case, the normal object is displayed so as not to overlap the "upper body" of the character object.

A wearable object is an object that is displayed in a distribution image in association with a specific part (wearing position) of a character object. For example, the specific parts are the front left side, the front right side, the rear left side, the rear right side, the center front side, the center rear side, the left eye, the right eye, the left ear, the right ear, and the entire hair, of the head of the character object. Also, the specific part may be the thumb, ring finger, wrist, elbow, shoulder, upper arm, whole hand, whole arm, torso, upper body, lower body, or the like.

The wearable object associated with the specific part of the character object is displayed in the distribution image so as to be in contact with the specific part of the character object. Also, the wearable object associated with the specific part of the character object may be displayed in the distribution image so as to cover part or all of the specific part of the character object. The specific part may be identified by three-dimensional position information indicating the position in a three-dimensional coordinate space, or may be associated with position information in a three-dimensional coordinate space.

The image information of the wearable object is image information imitating, for example, an accessory (headband, necklace, earrings, or the like), clothing (T-shirt, dress, or the like), a costume, and other items that can be worn by the character object.

As the placement location of the wearable object, information is stored that indicates the wearing place showing with which place on the character object the wearable object is associated. For example, when the wearable object is a "headband," information indicating the "head" of the character object is stored as the placement location of the wearable object. Further, when the wearable object is a "T-shirt," information indicating the "torso" of the character object is stored as the placement location of the wearable object.

Information indicating a plurality of wearing locations in a three-dimensional coordinate space may be stored as the placement location of the wearable object. For example, when the wearable object is a "headband," information indicating two parts of the character object, namely the "left rear side of the head" and "right rear side of the head," may be stored as placement locations of the wearable object. As a result, the wearable object imitating the "headband" is displayed so as to be worn on both the "left rear side of the head" and the "right rear side of the head" of the character object.

When the character object is equipped with a plurality of types of wearable objects having a common wearing location, the plurality of types of wearable objects are worn on the character object at intervals of time. As a result, a plurality of types of wearable objects having a common wearable location are not worn on the character object at the same time. For example, when "head" is stored as the wearing location of both the wearable object indicating "headband" and the wearable object indicating "cap," the wearable object indicating "headband" and the wearable object indicating "cap" are not simultaneously displayed on the head of the character object.

In the object table T2, a display time corresponding to the type of additional object may be stored in association with the object ID of the additional object. For example, the display time of the wearable object may be longer than the display time of the effect object and the display time of the normal object. For example, when "60 seconds" is stored as the display time of the wearable object, "5 seconds" may be stored as the display time of the effect object, and "10 seconds" may be stored as the display time of the normal object.

(Group Table T3)

Section (c) of FIG. 4 is an example of a data structure of a group table T3 for managing information exchange groups to which the user belongs. The group table T3 is individually provided for each user, and the group table T3 shown in section (c) of FIG. 4 is the group table T3 of the user who operates the terminal device 2 storing the group table T3.

In the group table T3, for each information exchange group, a group ID of the information exchange group, a name of the information exchange group, belonging users belonging to the information exchange group, and the like, are stored in association with each other. The group ID is an example of identification data for uniquely identifying each information exchange group. The title is an example of data indicating the title of each information exchange group. The belonging users are the user IDs of each user belonging to the information exchange group.

When the group table T3 is stored in the server memory device 32, the user ID of the corresponding user (the user who operates the terminal device 2 storing the group table T3) is associated with each group table T3.

Returning to FIG. 3, the functions of the generator 271, the transmitter 272, the receiver 273, the display processor 274, and the audio output portion 275 will be described.

(Generator 271)

The generator 271 functions when the terminal device 2 is used as a distributing terminal device operated by a distributing user. The generator 271 acquires from the imaging device 25 the imaging data continuously output by the imaging device 25. For example, the imaging device 25 of the terminal device 2 (distributing terminal device) held by the distributing user is provided in the terminal device 2 so that the face of the distributing user looking at the display screen of the display device 23 is in the shooting direction. The imaging device 25 continuously captures images of the face of the distributing user in the shooting direction, acquires imaging data of the face of the distributing user, and outputs the data to the generator 271 of the terminal processor 27. The imaging device 25 may capture images of parts of the distributing user other than the face, such as the head, arms, hands (including fingers), chest, torso, legs, or parts other than these, to acquire the imaging data. Also, the imaging device 25 may be a 3D camera capable of detecting the depth of a person's face.

The generator 271 generates face motion data, which is a digital expression of the movements of the face of the distributing user, as time passes, based on the continuously acquired imaging data. Face motion data may be generated at predetermined sampling time intervals. In this way, the face motion data generated by the generator 271 can digitally represent the movements of the face (changes in facial expression) of the distributing user chronologically.

The generator 271 may generate body motion data that is a digital representation of the position and orientation of each part of the distributing user (head, arms, hands (including fingers), chest, torso, legs, or parts other than these), together with the face motion data or separately from the face motion data, based on the continuously acquired imaging data.

The body motion data may be generated based on detection information from commonly known motion sensors worn by the distributing user. In this case, the terminal communication I/F 21 of the terminal device 2 (distributing terminal device) has a predetermined communication circuit for acquiring detection information from motion sensors attached to the distributing user through wireless communication. The generator 271 then generates the body motion data based on the detection information acquired by the terminal communication I/F 21. The body motion data may be generated at predetermined sampling time intervals. In this way, the body motion data generated by the generator 271 can digitally represent the motion of the body of the distributing user chronologically.

Generation of the body motion data based on detection information from motion sensors worn by the distributing user may be performed, for example, in a photography studio. In this case, the photography studio may be equipped with a base station, a tracking sensor, and a display. The base station is, for example, a multi-axis laser emitter. The motion sensor(s) worn by the distributing user may be, for example, a Vive Tracker provided by HTC Corporation, and the base station may be, for example, a base station provided by HTC Corporation.

In addition, a supporter computer may be installed in a separate room adjacent to the photography studio. A display in the photography studio may be configured to display information received from the supporter computer. The server device 3 may be installed in the same room as the room in which the supporter computer is installed. The room in which the supporter computer is installed and the photography studio may be separated by a glass window. In this case, the operator of the supporter computer can visually recognize the distributing user. The supporter computer may be configured to be able to change the settings of various devices provided in the photography studio according to the operation of the supporter. The supporter computer can, for example, set the scanning interval by the base station, set the settings of the tracking sensor(s), and change various settings of various devices other than these. The operator may input a message into the supporter computer, and the input message may be displayed on the display of the photography studio.

The generator 271 generates character video data including face motion data and/or body motion data generated as needed, and outputs the generated character video data to the display processor 274. Hereinafter, face motion data and body motion data may be collectively referred to as motion data. In addition, the generator 271 outputs to the transmitter 272 the generated character video data and the user ID of the distributing user stored in the terminal memory device 22. In addition, when the audio data of the distributing user output from the microphone 26 is acquired, the generator 271 outputs to the transmitter 272 the generated character video data, the acquired audio data, and the user ID of the distributing user stored in the terminal memory device 22.

(Transmitter 272)

In response to a distribution start instruction from the distributing user, the transmitter 272 of the terminal device 2 (distributing terminal device) of the distributing user transmits information related to the distribution start instruction commanding the start of a distribution event by the distributing user, together with the user ID of the distributing user stored in the terminal memory device 22, to the server device 3 via the terminal communication I/F 21. Hereinafter, the user ID of the distributing user may be referred to as the distributing user ID.

In addition, the transmitter 272 of the terminal device 2 of the distributing user (the distributing terminal device) transmits the character video data of the distributing user output from the generator 271 to the server device 3 via the terminal communication I/F 21 as information for displaying the distribution image of the distributing user in the distribution event, together with the distributing user ID stored in the terminal memory device 22. When the audio data of the distributing user is output from the generator 271 together with the character video data of the distributing user, the transmitter 272 transmits the character video data and the audio data of the distributing user, together with the distributing user ID, to server device 3 via the terminal communication I/F 21.

In addition, in response to a distribution end instruction from the distributing user, the transmitter 272 of the terminal device 2 (the distributing terminal device) of the distributing user transmits information regarding the distribution end instruction for commanding the end of the distribution event by the distributing user to the server device 3 via the terminal communication I/F 21, together with the distributing user ID stored in the memory device 22.

In addition, in response to a distribution image viewing start instruction from a viewing user, the transmitter 272 of the terminal device 2 of the viewing user (the viewing terminal device) transmits information regarding the viewing start instruction, together with information regarding the distribution image and the user ID of the viewing user stored in the terminal memory device 22, to the server device 3 via the terminal communication I/F 21. The information regarding the distribution image is information for specifying the distribution image for which the start of viewing has been commanded by the viewing user, and for example, is identification information of the distribution image (distribution image ID), the distributing user ID of the distributing user distributing the distribution image, or the like. Hereinafter, the user ID of a viewing user may be referred to as a viewing user ID.

In addition, the transmitter 272 transmits information indicating various instructions input by the user by operating the input device 24, together with the user ID stored in the terminal memory device 22, to the server device 3 via the terminal communication I/F 21. The various instructions from the user include, for example, an addition instruction, a change instruction, a generation instruction, and the like. The information indicating the addition instruction is transmitted to the server device 3 together with the object ID of the additional object to be included in the distribution image of the distributing user, the distributing user ID, and the viewing user ID stored in the terminal memory device 22 of the terminal device 2 of the viewing user (the viewing terminal device).

When the distributing user selects a partial object and gives an instruction regarding the creation of a character object composed of the selected partial object, the model ID for identifying the model data of the character object and the object IDs of a plurality of partial objects that constitute the character object may be transmitted to the server device 3 via the terminal communication I/F 21 together with the user ID and the like stored in the terminal memory device 22 of the terminal device 2 of the distributing user (the distributing terminal device). In this case, the server device 3 may associate the user ID, the model ID, and the object IDs of a plurality of partial objects constituting the character object with each other and store such in the server memory device 32.

In addition, the terminal device of the viewing user (the viewing terminal device) that has received, via the server device 3, the model ID for identifying the model data of the character object of the distributing user, the object IDs of the plurality of partial objects constituting the character object of the user, and the user ID of the user, may associate the received user ID, model ID, and object IDs of the plurality of partial objects constituting the character object with each other and store such in the terminal memory device 22. As a result, by transmitting only the distributing user ID (or model ID) of the distributing user to the terminal device 2 of the viewing user (the viewing terminal device) via the server device 3, the terminal device 2 of the viewing user (the viewing terminal device) can extract the object IDs of the plurality of partial objects associated with the user ID (or model ID) received. Then, the terminal device 2 of the viewing user (the viewing terminal device) can display the distribution image including the character object of the distributing user based on the three-dimensional model data (of each partial object) corresponding to each object ID extracted.

In response to an instruction from the user to start a new information exchange, the transmitter 272 of the terminal device 2 of the user transmits information regarding the new start instruction to the server device 3 via the terminal communication I/F 21. The user IDs of other users designated by the user and the user ID stored in the terminal memory device 22 of the terminal device 2 are transmitted to the server device 3 along with the information regarding the new start instruction. The other users specified by the user are one or more users specified by the user as partners for information exchange. Hereinafter, a group to which a user and one or more other users belong may be referred to as an information exchange group.

In response to an instruction by the user to start an information exchange (for example, a text chat or the like) within the information exchange group, the transmitter 272 of the terminal device 2 of the user belonging to the information exchange group transmits information regarding the information exchange start instruction to the server device 3 via the terminal communication I/F 21. Together with the information regarding the information exchange start instruction, the group ID of the information exchange group to which the user belongs, which is stored in the terminal memory device 22 of the terminal device 2, is transmitted to the server device 3 as transmission destination information. If the server device 3 does not store the user ID of each user belonging to the information exchange group, transmission destination information including the group ID indicating the information exchange group or the user IDs of other users belonging to the information exchange group may be transmitted to the server device 3 together with the information regarding the information exchange start instruction.

When input information is input by the user while the information exchange screen is being displayed, the transmitter 272 of the terminal device 2 of the user belonging to the information exchange group transmits the input information to the server device 3 via the terminal communication I/F 21. Along with the input information, the user ID and transmission destination information stored in the terminal memory device 22 of the terminal device 2 of the user belonging to the information exchange group are transmitted to the server device 3. The transmission destination information is a group ID indicating an information exchange group, or the user IDs of other users belonging to the information exchange group.

(Receiver 273)

The receiver 273 of the terminal device 2 of the viewing user (the viewing terminal device) receives, via the terminal communication I/F 21, the character video data and user ID of the distributing user transmitted from the server device 3. The receiver 273 of the terminal device 2 of the viewing user (the viewing terminal device) receives, via the terminal communication I/F 21, the character video data, the audio data and the user ID transmitted from the server device 3. The receiver 273 of the terminal device 2 of the viewing user (the viewing terminal device) receives, via the terminal communication I/F 21, the audio data and user ID of the distributing user transmitted from the server device 3. Further, the receivers 273 of the terminal device 2 of the distributing user (the distributing terminal device) and the terminal device 2 of the viewing user (the viewing terminal device) receive, via the terminal communication I/F 21, information indicating various instructions from other users transmitted from the server device 3. The receiver 273 passes the received information to the terminal processor 27.

The character video data and user ID of the distributing user transmitted from the server device 3 have been transmitted to the server device 3 by the transmitter 272 of the terminal device 2 of the distributing user (the distributing terminal device). The character video data, audio data, and user ID of the distributing user transmitted from the server device 3 have been transmitted to the server device 3 by the transmitter 272 of the terminal device 2 of the distributing user (the distributing terminal device). Also, the audio data and user ID of the distributing user transmitted from the server device 3 have been transmitted to the server device 3 by the transmitter 272 of the terminal device 2 of the distributing user (the distributing terminal device).

The receivers 273 of the terminal devices 2 of users belonging to the information exchange group receive the new start instruction transmitted from the server device 3, and the user IDs of users belonging to the information exchange group, in response to information regarding the new start instruction transmitted from the terminal device 2 of another user belonging to the information exchange group.

The receivers 273 of the terminal devices 2 of users belonging to the information exchange group receive the input information and the user ID of the other user belonging to the information exchange group, transmitted from the server device 3, through the terminal communication I/F 21. (Display Processor 274)

The display processor 274 of the terminal device 2 of the distributing user (the distributing terminal device) displays an image drawn based on the character video data including motion data generated by the generator 271 on the display device 23 as the distribution image of the distributing user, in response to an instruction to start a distribution event. The motion data is transmitted to the terminal device 2 of the viewing user (the viewing terminal device) as the character video data. In addition, the display processor 274 of the terminal device 2 of the viewing user (the viewing terminal device) displays an image drawn based on the character video data (motion data) of the distributing user received by the receiver 273 on the display device 23 as the distribution image of the distributing user.

The drawing process of the distribution image based on the motion data will be described below. In the following description, the user ID stored in the terminal memory device 22 is used in the drawing process of the distribution image that is based on the motion data at the distributing terminal device, and the user ID received from the server device 3 is used in the drawing process of the distribution image that is based on the motion data at the viewing terminal device.

First, the display processor 274 extracts the model ID of the character object associated with the user ID and the object ID of the used object from the user table T1. Next, the display processor 274 reads from the terminal memory device 22 the model data associated with the extracted model ID, and the image information and placement location associated with the extracted object ID of the used object. Next, the display processor 274 generates an animation of the character object with the used object worn in the placement location based on the model data, the image information of the used object, the placement location, and the motion data that were read. Note that when the model ID of the character object is associated with the object IDs of a plurality of partial objects constituting the character object, the display processor 274 extracts the model data corresponding to the object IDs of the plurality of partial objects associated with the extracted model ID. Next, the display processor 274 generates an animation of the character object in which the used object is worn in the placement location based on the model data of the plurality of partial objects, the image information of the used object, the placement location, and the motion data that were read. Note the used object may be included in a plurality of partial objects.

When face motion data is included in the motion data, the display processor 274 generates an animation of the character object so that the facial expression of the character object changes based on the face motion data. Accordingly, the display processor 274 can generate an animation of the character object that moves in synchronization with the facial expressions of the distributing user, based on the model data and the face motion data that were read. When face motion data and body motion data are included in the motion data, the display processor 274 generates an animation of the character object that moves in synchronization with the facial expression and body motion of the distributing user, based on the model data, the face motion data, and the body motion data that were read. Next, the display processor 274 draws a distribution image including the generated animation (video) of the character object and a background image showing the background generated using the background data stored in the terminal memory device 22. Then, the display processor 274 outputs drawing data indicating the drawn distribution image, and terminates the drawing processing of the distribution image based on the motion data. When three-dimensional model data is used in the distribution image drawing process, the distribution image drawn in the distribution image drawing process is a three-dimensional video image depicting the inside of a three-dimensional virtual space that includes a character object that moves in synchronization with the facial expressions and body movements of the distributing user. Hereinafter, distribution images including animations (videos) of character objects will be primarily described, but distribution images are not limited to those including animations (videos) of character objects. Distribution images may include still images of character objects. Further, the distribution image may be one in which a new still image of the character object is displayed at predetermined time intervals.

In addition, the display processor 274 may execute a change process that displays, on the display device 23, a wearable object owned by the distributing user or a character object to which a wearable object transmitted from the viewing user as a wearable gift is applied, in response to a change instruction from the distributing user. For example, when the wearable object instructed to be changed by the distributing user is "headband," the display processor 274 extracts the object ID of the wearable object ("headband") from the owned objects associated with the user ID of the distributing user in the user table T1, and stores such as a used object of the distributing user. The display processor 274 extracts from the object table T2 the image information and placement location associated with the object ID stored as the used object of the distributing user. Next, based on the extracted image information and placement location, the display processor 274 generates a distribution image including the character object of the distributing user wearing the wearable object ("headband") on the head (the placement location associated with the object ID of "headband"). In addition, the display processor 274 may generate a distribution image including a character object wearing a wearable object that moves along with the movement of the wearing part (placement location) of the character object. For example, in the distribution image, the wearable object "headband" is displayed so as to move along with the movement of the head of the character object.

In addition, the display processor 274 of the terminal device 2 of the viewing user (the viewing terminal device) displays a distribution image including an additional object in response to an additional object addition instruction from the viewing user. Also, the display processor 274 of the terminal device 2 of the distributing user (the distributing terminal device) displays the distribution image including the additional object in accordance with information indicating the additional object addition instruction received from the terminal device 2 of the viewing user.

When the object ID received from the terminal device 2 of the viewing user (the viewing terminal device) together with the information indicating the additional object addition instruction is the object ID of an effect object, the display processor 274 of the terminal device 2 of the distributing user (the distributing terminal device) extracts from the terminal memory device 22 the still image or video (image information) of the effect object associated with the object ID received together with the information indicating the addition instruction, with reference to the object table T2, and generates a distribution image containing the extracted still image or video. For example, when an instruction to add an effect object representing confetti or fireworks is given, the display processor 274 of the terminal device 2 of the distributing user (the distributing terminal device) generates a distribution image including a video of the effect object (not shown) imitating confetti or fireworks. When the object ID received together with the information indicating the additional object addition instruction from the viewing user is the object ID of an effect object, the display processor 274 of the terminal device 2 of the viewing user (the viewing terminal device) similarly extracts from the terminal memory device 22 the still image or video (image information) of the effect object associated with the object ID received together with the information indicating the addition instruction, with reference to the object table T2, and generates a distribution image for the viewing user containing the extracted still image or video.

When the object ID received together with the information indicating the additional object addition instruction received from the terminal device 2 of the viewing user (the viewing terminal device) is the object ID of a normal object, the display processor 274 of the terminal deice 2 of the distributing user (the distributing terminal device) extracts the still image or video (image information) and the placement location of the normal object, which are associated with the object ID of the normal object, with reference to the object table T2. Next, the display processor 274 of the terminal device 2 of the distributing user (the distributing terminal device) generates a distribution image for the viewing user including the still image or video of the normal object placed at the position indicated by the placement location. Further, when the object ID received together with the information indicating the additional object addition instruction from the viewing user is the object ID of a normal object, the display processor 274 of the terminal device 2 of the viewing user (the viewing terminal device) similarly extracts the still image or video (image information) and the placement location of the normal object, which are associated with the object ID of the normal object, with reference to the object table T2, and generates a distribution image for the viewing user including the still image or video of the normal object placed at the position indicated by the placement location.

The display processor 274 may generate a distribution image including a video of a normal object that moves within the display area of the distribution image. For example, the display processor 274 may generate a distribution image that includes a video of a normal object that moves such that the normal object falls from the top toward the bottom of the distribution image. In this case, the normal object may be displayed in the display area of the distribution image while falling from the start of falling to the bottom of the output image, and may disappear from the distribution image after falling to the bottom of the distribution image. Additionally, the movement route of the normal object may be a left-to-right direction, a right-to-left direction, an upper-left to lower-left direction, or a route in a direction other than these in the distribution image, and may also be a route along a linear trajectory, a circular trajectory, an elliptical trajectory, a helical trajectory, or a trajectory other than these.

When the object ID received together with the information indicating the additional object addition instruction from the viewing user is the object ID of a wearable object, the display processor 274 of the terminal device 2 of the distributing user (the distributing terminal device) displays notification information about the wearing instruction inside the distribution image. Next, the display processor 274 refers to the object table T2 and extracts the image information and the placement location of the wearable object associated with the object ID received together with the information indicating the addition instruction. Next, the display processor 274 generates a distribution image including the character object of the distributing user wearing the wearable object on the wearing part indicated by the placement location, based on the extracted image information and placement location. Further, when the object ID received together with the information indicating the additional object addition instruction from the viewing user is the object ID of a wearable object, the display processor 274 of the terminal device 2 of the viewing user (the viewing terminal device) displays notification information about the wearing instruction inside the distribution image. Next, the display processor 274 refers to the object table T2 and extracts the image information and the placement location of the wearable object associated with the object ID received together with the information indicating the addition instruction. Next, the display processor 274 generates a distribution image including the character object of the distributing user wearing the wearable object on the wearing part indicated by the placement location, based on the extracted image information and placement location.

In addition, the display processor 274 of the terminal device 2 of the user, in response to an instruction from the user to start a new information exchange, displays an information exchange screen related to a new exchange group to which the user and all other users specified by the user belong. In addition, when the information on the new start instruction of the other users and the user ID of each user belonging to the new information exchange group are received by the receiver 273, the display processor 274 of the terminal device 2 of the user displays the information exchange screen related to the information exchange group.

In addition, in response to an instruction from the user to start the information exchange (for example, a text chat or the like) within the information exchange group, the display processor 274 of the terminal device 2 of the user belonging to the information exchange group displays the information exchange screen related to the information exchange group. In addition, when information about the information exchange start instruction of another user belonging to the information exchange group and the user ID of each user belonging to the information exchange group are received by the receiver 273, the display processor 274 of the terminal devices 2 of the users belonging to the information exchange group display the information exchange screen relating to the information exchange group.

In addition, when input information is input by the user while the information exchange screen is being displayed, the display processor 274 of the terminal devices 2 of the users belonging to the information exchange group display the input information that was input, below the most recent input information in the user display area of the information exchange screen. Further, when input information from another user is received by the receiver 273 while the information exchange screen is being displayed, the display processor 274 of the terminal devices 2 of the users belonging to the information exchange group display the received input information below the most recent input information in the other user display area of the information exchange screen.

(Audio Output Portion 275)

When the audio data of the distributing user is received by the receiver 273, the audio output portion 275 of the terminal device 2 of the viewing user (the viewing terminal device) outputs from a speaker (not shown) the audio data of the distributing user generated based on the audio data. In addition, when the character video data and the audio data of the distributing user are received, the audio output portion 275 of the viewing terminal device outputs the audio of the distributing user from the speaker based on the audio data, along with the display of the distribution image of the distributing user by the display processor 274. As a result, the audio of the distributing user is output while the lips of the character object of the distributing user included in the distribution image are moving, so the viewing user can view the distribution image including the character object of the distributing user as though producing the audio.

(Server Device 3)

Figure 5:
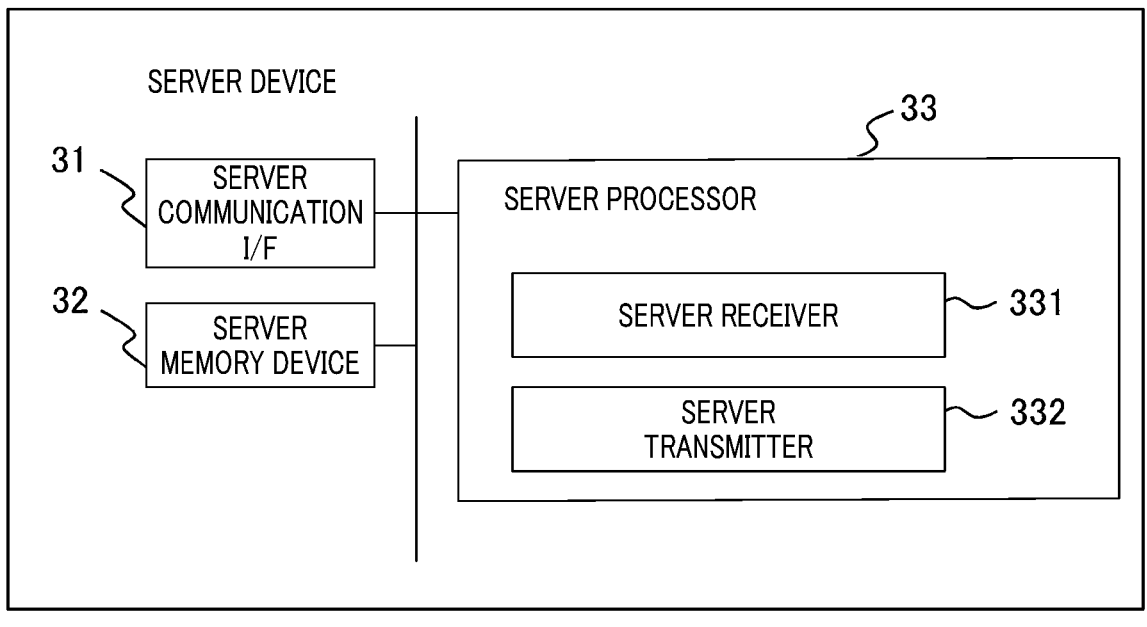
FIG. 5 is a diagram showing one example of a schematic configuration of a server device.

FIG. 5 is a diagram showing one example of a schematic configuration of the server device 3. The server device 3 that provides various services such as a video distribution service and an information exchange service to the respective terminal devices 2 of a plurality of users transmits the character video data of the distributing user and various instructions transmitted from the terminal device 2 of the distributing user to the terminal devices 2 of one or more viewing users. In addition, the server device 3 transmits input information (text information, stamp image, and the like) received from the terminal device of one user to the terminal devices 2 of one or more users belonging to the same information exchange group as the one user. Further, the server device 3 may transmit information received from the terminal device 2 of one user to the terminal device 2 of a user indicated by the user ID included in transmission destination information received simultaneously with the information. For this purpose, the server device 3 includes a server communication I/F 31, a server memory device 32 and a server processor 33.

The server communication I/F 31 is implemented as hardware, firmware, communication software such as a TCP/IP driver or a PPP driver, or a combination thereof. The server device 3 can transmit information to other devices and receive information from other devices, via the server communication I/F 31.

The server memory device 32 is, for example, a semiconductor memory device such as ROM, RAM, or the like. The server memory device 32 may be, for example, a magnetic disk, an optical disk, or any other type of memory device capable of storing data. The server memory device 32 stores an operating system program, a driver program, an application program, data, and the like, used in processing in the server processor 33. The server memory device 32 may store the user table T1, the object table T2, the group table T3, and the reference information table T4 as data. In addition, the server memory device 32 stores, as data, the distributing user ID of the distributing user who is currently distributing, and stores the user ID of the viewing user (the viewing user ID) who is viewing the distribution image of the distributing user in association with the distributing user ID of the distributing user. The distributing user ID is a type of information relating to the distribution image. The information relating to the distribution image may be identification information of the distribution image (distribution image ID). For example, a distribution image ID, a distributing user ID, and a viewing user ID may be associated with each other and stored.

The server processor 33 is a processor that loads into memory an operating system program, a driver program, and a control program stored in the server memory device 32, and executes the instructions contained in the loaded programs. The server processor 33 is, for example, an electronic circuit such as a CPU, MPU, DSP, or GPU, or a combination of various electronic circuits. The server processor 33 may be realized by integrated circuits such as ASICs, PLDs, FPGAs, and MCUs. Although the server processor 33 is illustrated as a single component in FIG. 5, the server processor 33 may be a collection of a plurality of physically separate processors. For example, a plurality of processors may be implemented that operate cooperatively and in parallel to execute instructions. The server processor 33 functions as a server receiver 331 and a server transmitter 332 by executing various commands included in the control program.

(Server Receiver 331)

The server receiver 331 receives information related to a distribution start instruction transmitted from the terminal device 2 of the distributing user (the distributing terminal device), together with the distributing user ID, via the server communication I/F 31. The server receiver 331 receives information related to a distribution end instruction transmitted from the terminal device 2 of the distributing user (the distributing terminal device), together with the distributing user ID, via the server communication I/F 31. In addition, the server receiver 331 receives information for displaying the distribution image of the distributing user transmitted from the terminal device 2 of the distributing user (the distributing terminal device), together with the distributing user ID, via the server communication I/F 31.

In addition, the server receiver 331 receives information relating to a viewing start instruction transmitted from the terminal device 2 of the viewing user (the viewing terminal device), together with the information relating to the distribution image and the viewing user ID, via the server communication I/F 31. The server receiver 331 receives information indicating an addition instruction transmitted from the terminal device 2 of the viewing user (the viewing terminal device), together with an object ID, the distributing user ID, and the viewing user ID, via the server communication I/F 31.

In addition, the server receiver 331 receives information relating to a new start instruction, the user ID of a user, and the user ID of another user selected as the partner for information exchange, from the terminal device 2 of the user who wants to start a new information exchange, via the server communication I/F 31. In this case, the server receiver 331 sets the group ID of the new information exchange group. Then, the server receiver 331 associates the received user ID of the user and the user ID of the other user with the group ID of the new information exchange group as user IDs belonging to the new information exchange group, and stores such in the server memory device 32.

In addition, the server receiver 331 receives, from the terminal device 2 of a user belonging to the information exchange group, information relating to an information exchange start instruction, the user ID of the user, and the transmission destination information, via the server communication I/F 31. When the received transmission destination information is a group ID indicating an information exchange group, the server receiver 331 refers to the server memory device 32 and extracts the user IDs of the users associated with the group ID received as the transmission destination information. Then, the server receiver 331 identifies the extracted user IDs as the user IDs of the users of the terminal devices 2 of the transmission destination. Further, when the received transmission destination information is a user ID, the server receiver 331 identifies the user ID received as the transmission destination information as the user ID of the user of the terminal device 2 of the transmission destination. Then, the server receiver 331 passes the received information related to the information exchange start instruction and the user ID of the user of the terminal device 2 of the transmission destination to the server transmitter 332.

In addition, the server receiver 331 receives the input information input by the user, the user ID of the user, and the transmission destination information from the terminal device 2 of the user belonging to the information exchange group, via the server communication I/F 31. Next, the server receiver 331 extracts the user ID of the user of the terminal device 2 of the transmission destination based on the transmission destination information received. The server receiver 331 passes the received input information, the user ID of the user who input the input information, and the user ID of the user of the terminal device 2 of the transmission destination to the server transmitter 332.

(Server Transmitter 332)

The server transmitter 332 transmits the character video data and the user ID of the distributing user received by the server receiver 331 to the terminal device 2 of the viewing user (the viewing terminal device) indicated by the viewing user ID associated with the distributing user ID of the distributing user stored in the server memory device 32, via the server communication I/F 31. The server transmitter 332 transmits the character video data, the audio data and the user ID of the distributing user received by the server receiver 331 to terminal device 2 of the viewing user (the viewing terminal device) indicated by the viewing user ID associated with the distributing user ID of the distributing user stored in the server memory device 32, via the server communication I/F 31.

In addition, the server transmitter 332 transmits information indicating various instructions by the distributing user received by the server receiver 331 to the terminal device 2 of the viewing user (the viewing terminal device) indicated by the viewing user ID associated with the distributing user ID of the distributing user stored in the server memory device 32, via the server communication I/F 31. In addition, the server transmitter 332 transmits information indicating various instructions by the viewing user received by the server receiver 331 to the terminal device 2 of the distributing user indicated by the distributing user ID associated with the user ID of the viewing user, and to the terminal device 2 of a viewing user indicated by the user ID of another viewing user associated with the distributing user ID, via the server communication I/F 31.

In addition, in response to the setting of the group ID of a new information exchange group by the server receiver 331, the server transmitter 332 extracts the user IDs belonging to the new information exchange group associated with the group ID of the new information exchange group from the server memory device 32. Then, the server transmitter 332 transmits information related to a display instruction for an information exchange screen related to the new information exchange group to the terminal device 2 of the users identified by the extracted user IDs, via the server communication I/F 31.

Further, when the information related to the information exchange start instruction and the transmission destination information are received from the server receiver 331, the server transmitter 332 transmits the information related to the display instruction for the information exchange screen related to the information exchange start instruction received, to the terminal devices 2 of the users identified by the user IDs related to the transmission destination information, via the server communication I/F 31.

In addition, when the input information, the user ID of the user who input the input information, and the user IDs of the users of the terminal devices 2 of the transmission destination are received from the server receiver 331, the server transmitter 332 transmits the received input information to the terminal devices 2 of the users identified by the user IDs other than the user ID of the user who input the input information, among the user IDs of the users of the terminal devices 2 of the transmission destination, via the server communication I/F 31.

(Examples of Various Screens)

Hereinafter, examples of various screens displayed on the display device 23 of the terminal device 2 of the user will be described with reference to FIGS. 6 to 13, 19 to 21, 26 and 27. In FIGS. 6 to 13, 19 to 21, 26 and 27, a plurality of constituent elements denoted by the same reference numerals are constituent elements having mutually equivalent functions.

Section (a) of FIG. 6 is a diagram showing one example of a distribution screen 600 displayed on the display device 23 of the terminal device 2 of the distributing user (the distributing terminal device). The distribution screen 600 includes a distribution image 602 including a character object 601, a response information display area 603, an acquisition button 604, and a distribution end button 605. Section (b) of FIG. 6 is a diagram showing one example of a distribution screen 610 displayed on the display device 23 of the terminal device 2 of the viewing user (the viewing terminal device). The distribution screen 610 includes a distribution image 612 including a character object 611, an evaluation button 613, an add button 614, a comment button 615, a response information display area 616, and a viewing end button 617.

The terminal device 2 of the distributing user (the distributing terminal device) executes a process of transmitting information regarding a distribution start instruction to the server device 3 by the transmitter 272 in response to the start of a distribution event. The distribution event is started when a distribution event start instruction from the distributing user is input to the terminal processor 27 from the input device 24 in response to an operation by the distributing user on a predetermined screen (not shown) such as a home screen or the like displayed on the display device 23. Next, the terminal device 2 (the distributing terminal device) simultaneously (in parallel) executes transmission processing of the character video data and the like by the transmitter 272 and display processing of the distribution screen 600 by the display processor 274.

When the receiver 273 of the terminal device 2 of the viewing user (the viewing terminal device) receives information indicating one or more distributing users who are currently performing distribution, the display processor 274 of the terminal device 2 (the viewing terminal device) displays a distribution event selection screen (not shown) on the display device 23. The distribution event selection screen includes a selection object for selecting one or more distributing users who are currently performing distribution. Next, the transmitter 272 of the terminal device 2 (the viewing terminal device) acquires from the input device 24 information indicating the distributing user selected in response to an operation on the input device 24 by the viewing user from the one or more distributing users included in the distribution event selection screen. In this manner, the transmitter unit 272 receives from the input device 24 the viewing start instruction of the distribution image by the viewing user. Then, the transmitter 272 transmits information regarding the viewing start instruction including information indicating the selected distributing user, information regarding the distribution image, and the user ID of the viewing user stored in the terminal memory device 22, to the server device 3 via the terminal communication I/F 21.

The server receiver 331 of the server device 3 receives the information regarding the viewing start instruction, the information regarding the distribution image, and the user ID of the viewing user transmitted from the terminal device 2 (the viewing terminal device), via the server communication I/F 31. Next, the server transmitter 332 of the server device 3 identifies the terminal device 2 of the viewing user (the viewing terminal device) identified by the user ID received together with the information regarding the viewing start instruction. Next, the server transmitter 332 distributes information for displaying the distribution image identified by the information regarding the distribution image received together with the information regarding the viewing start instruction to the specified terminal device 2 (the viewing terminal device) via the server communication I/F 31. The information for displaying the distribution image is the character video data of the distributing user, or the character video data and audio data of the distributing user.

When character video data is received by the receiver 273 of the terminal device 2 (the viewing terminal device), the display processor 274 of the terminal device 2 (the viewing terminal device) displays a distribution screen 610 based on the character video data received. When character video data and audio data are received by the receiver 273 of the terminal device 2 (the viewing terminal device), the display processor 274 of the terminal device 2 (the viewing terminal device) displays the distribution screen 610 based on the character video data received, and the audio output portion 275 of the terminal device 2 (the viewing terminal device) outputs, from a speaker (not shown), the audio of the distributing user generated based on the audio data. In addition, the server receiver 331 of the server device 3 registers (stores in the memory device 32) the viewing user ID of the viewing user of the terminal device 2 (the viewing terminal device) that has transmitted the information regarding the viewing start instruction as the viewing user ID of the viewing user who is currently viewing.

Below, each display element included in the distribution screen 600 will be described.

The character object 601 included in the distribution screen 600 is an animation (video) of a character object of the distributing user generated by the display processor 274. The display processor 274 generates an animation of the character object of the distributing user based on the generated motion data of the distributing user and the character object associated with the user ID of the distributing user stored in the user table T1. When the motion data includes face motion data, the display processor 274 changes the facial expression of the character object 601 in synchronization with the movement of the facial expression of the distributing user. When the motion data includes body motion data, the display processor 274 causes the corresponding part of the character object 601 to move in synchronization with the movement of the body of the distributing user. The display processor 274 displays a distribution image 602 including the generated character object 601 on the display device 23.

A response information display area 603 included in the distribution screen 600 includes response information (comment information, evaluation information, and/or information regarding additional objects) transmitted from each terminal device 2 (the viewing user terminals).

In the example of the response information display area 603 shown in section (a) of FIG. 6, comment information indicating that the comment "cool" was transmitted from the terminal device 2 (the viewing terminal device) of a viewing user named "user R" is shown. Next, it is shown that evaluation information was transmitted from the terminal device 2 (the viewing terminal device) of a viewing user named "user F." It is also shown that evaluation information was most recently transmitted from the terminal device 2 (the viewing terminal device) of a viewing user named "user A."

The distribution end button 605 included in the distribution screen 600 is an object image such as a button object for ending display of the distribution screen 600 and ending distribution of the distribution image 612. When the distribution end button 605 is selected by an operation of the input device 24 by the distributing user, the display processor 274 of the terminal device 2 of the distributing user (the distributing terminal device) ends the display of the distribution screen 600. Then, the transmitter 272 of the terminal device 2 (the distributing terminal device) transmits information regarding the distribution end instruction, together with the distributing user ID stored in the terminal memory device 22, to the server device 3 via the terminal communication I/F 21. Upon receiving the information regarding the distribution end instruction transmitted from the terminal device 2 of the distributing user (the distributing terminal device), the server receiver 331 of the server device 3 deletes the distributing user ID received together with the information regarding the distribution end instruction from the server memory device 32. Furthermore, the server receiver 331 deletes the viewing user ID associated with the deleted distributing user ID from the server memory device 32. This ends distribution of the distribution image by the distributing user who selected the distribution end button 605. It should be noted that the distributing user ID of the distributing user who has ended distribution need not be deleted from the server memory device 32. In this case, the distributing user ID of the distributing user who ended distribution may be stored in the server memory device 32 as a distribution ended user ID. Also, the viewing user ID associated with the distributing user ID of the distributing user who ended distribution need not be deleted from the server memory device 32. In this case, the viewing user ID associated with the distributing user ID of the distributing user who ended distribution may be stored in the server memory device 32 as a viewing ended user ID. In addition, the server transmitter 332 may transmit information regarding the distribution end instruction to the terminal device 2 of the viewing user (the viewing terminal device) identified by the viewing user ID associated with the distributing user ID of the distributing user who ended distribution. In this case, the terminal device 2 of the viewing user (the viewing terminal device) displaying the distribution image of the distributing user also ends the display of the distribution screen 610 in response to receiving the information regarding the distribution end instruction.

Each display element included in the distribution screen 610 will be described below.

A character object 611 included in the distribution screen 610 is an animation (video) of the character object of the distributing user generated by the display processor 274. The display processor 274 generates an animation of the character object of the distributing user based on the character video data (motion data) of the distributing user received by the receiver 273, and the character object associated with the user ID of the distributing user stored in the user table T1. An example of display processing of the distribution image 612 including the character object 611 will be described below.

When information regarding the viewing start instruction for the distribution image from the distributing user, information regarding the distribution image (the distributing user ID of the distribution image), and the user ID of the viewing user are received from the terminal device 2 of the viewing user (the viewing terminal device), the server device 3 stores the received viewing user ID of the viewing user in association with the received distributing user ID of the distribution image.

When face motion data of the distributing user is included in the character video data (motion data) of the distributing user received by the receiver 273 of the terminal device 2 of the viewing user (the viewing terminal device), the distribution image 612 including the character object 611 whose expression changes in synchronization with movement of the facial expression of the distributing user is displayed. For example, when the distributing user utters audio, the distribution image 612 including the character object 611 whose lips are moving is displayed. Further, when body motion data of the distributing user is included in the motion data of the distributing user received by the receiver 273, the distribution image 612 including the character object 611 whose corresponding parts move in synchronization with the body motion of the distributing user is displayed. When character video data and audio data of the distributing user are received, the distribution image 612 based on the received character video data is displayed by the display processor 274, and audio of the distributing user generated based on the received audio data of the distributing user is output by the audio output portion 275. As a result, the user A can hear the audio of the distributing user while looking at the character object 611 of the distributing user that moves as if producing audio. With this, the display processing of the distribution image 612 ends. The display processing of the distribution image 612 is executed each time output information of the distributing user is received, at predetermined time intervals (for example, every two seconds).

The evaluation button 613 included in the distribution screen 610 is an object image for instructing transmission of evaluation information regarding the character object 611 included in the distribution screen 610, or transmission of evaluation information regarding the distributing user related to the character object 611. When the evaluation button 613 is selected in response to operation of the input device 24 by the viewing user, the transmitter 272 of the terminal device 2 (the viewing terminal device) transmits information regarding the evaluation information display instruction, together with evaluation information indicating that "a positive evaluation of the character object 611 included in the distribution screen 610" has been made or evaluation information indicating that "a positive evaluation of the distributing user related to the character object 611 included in the distribution screen 610" has been made, to the server device 3 via the terminal communication I/F 21.

The server receiver 331 of the server device 3 may store the received evaluation information in the server memory device 32, and additionally, the server transmitter 332 of the server device 3 may transmit the received evaluation information to the terminal device 2 of the distributing user (the distributing terminal device).

The evaluation button 613 may be an object image for instructing transmission of evaluation information indicating that "a negative evaluation of the character object 611 included in the distribution screen 600" has been made or evaluation information indicating that "a negative evaluation of the distributing user related to the character object 611 included in the distribution screen 600" has been made. In addition, the distribution screen 610 may include a plurality of types of evaluation buttons 613 (for example, two types of evaluation buttons—an evaluation button for transmitting positive evaluation information and an evaluation button for transmitting negative evaluation information).

When the distribution screen 610 is displayed on a plurality of terminal devices 2 (viewing terminal devices), aggregated information obtained by aggregating the evaluation information transmitted from each terminal device 2 (viewing terminal device) may be included on the distribution screen 600 and/or the distribution screen 610. For example, the server device 3 may count the number of items of evaluation information transmitted from each of the plurality of terminal devices 2 (viewing terminal devices), and generate display information for including the number of items of evaluation information in the distribution screen 600 and/or the distribution screen 610. The aggregated information is not limited to the number of items of evaluation information, and may be information related to the time slot in which the evaluation information was transmitted. The aggregation period is the period from the start of the distribution event to the current time, the period from the start of displaying of the distribution screen 600 to the current time, the period from the start of distribution of the distribution screen 610 to the current time, or a predetermined period (for example, the period from 21:00 to 24:00). Also, a plurality of aggregation periods may be set. When the evaluation information can be transmitted by the server device 3 to the terminal device 2 of the distributing user (the distributing terminal device), the evaluation information aggregation process may be executed by the terminal device 2 (the distributing terminal device). In this case, the process of including the aggregated information in the distribution screen 600 may be executed by the terminal device 2 (the distributing terminal device), and the process of including the aggregated information in the distribution screen 610 may be performed by the terminal device 2 (the viewing terminal device) displaying the distribution screen 610.

The add button 614 included in the distribution screen 610 is an object image for instructing display of a selection screen 700 for selecting an additional object to be displayed on the distribution screen 600 and the distribution screen 610. When the add button 614 is selected in accordance with operation of the input device 24 by the viewing user, a selection screen 700 is displayed on the terminal device 2 of the viewing user (the viewing terminal device). Details of the selection screen 700 will be described later.

The comment button 615 included in the distribution screen 610 is an object image for instructing display of a comment input window (not shown) for inputting comments (character strings) to be displayed on the distribution screen 600 and the distribution screen 610. When the comment button 615 is selected in accordance with operation of the input device 24 by the viewing user, the comment input window (not shown) is superimposed on the distribution screen 610.

The comment input window is displayed only on the display device 23 of the terminal device 2 of the viewing user who has selected the comment button 615, and the character string being input into the comment input window is not displayed on the display device 23 of the other terminal devices 2. For example, the display processor 274 of the terminal device 2 of the viewing user creates comment information indicating the comment (character string) input into the comment input window in accordance with operation of the input device 24 by the viewing user. Comment information is one type of response information.

Response information (comment information, evaluation information, and/or information regarding additional objects (to be described later)) created in accordance with operation by the viewing user, and response information transmitted from the terminal devices 2 of other viewing users who are viewing the distribution image 612 of the same distributing user, are included in the response information display area 616 included in the distribution screen 610.

In the example of the response information display area 616 shown in section (b) of FIG. 6, it is shown that the comment information indicating the comment (character string) "cool" was transmitted from the terminal device 2 of the viewing user named "user R." Also, it is shown that evaluation information has been transmitted from the terminal device 2 of the viewing user named "user F." Furthermore, it is shown that evaluation information created by the terminal device 2 of the user A who operates this terminal device 2 has been transmitted.

When the viewing user of the terminal device 2 creates response information and inputs a transmission instruction, the transmitter 272 of the terminal device 2 displaying the distribution screen 610 transmits information regarding the display instruction of the response information together with the created response information to the server device 3 via the terminal communication I/F 21. The viewing user ID of the viewing user stored in the terminal memory device 22 is transmitted together with the information regarding the display instruction of the response information.

The server receiver 331 of the server device 3 receives the information regarding the display instruction of the response information transmitted from the terminal device 2 displaying the distribution screen 610, together with the response information and the viewing user ID. The server transmitter 332 of the server device 3 extracts from the server memory device 32 the distributing user ID stored in association with the received viewing user ID. Then, the server transmitter 332 transmits the received response information and the viewing user ID to the terminal device 2 of the distributing user indicated by the extracted distributing user ID and the terminal device 2 of the viewing user indicated by the extracted viewing user ID. The receiver 273 of each terminal device 2 displaying the distribution screen 610 receives the response information and the viewing user ID transmitted from the server device 3, via the terminal communication I/F 21. The display processor 274 of each terminal device 2 displaying the distribution screen 610 displays the distribution screen including the response information and the name of the viewing user who input the response information within the response information display area 616 in chronological order, based on the received response information and the name associated with the received viewing user ID. The name associated with the received user ID is information extracted by the display processor 274 by referring to the user table T1. In this way, each time response information is received, the display processor 274 of each terminal device 2 displaying the distribution screen 610 displays the received response information and the name of the viewing user who input the response information in chronological order in the response information display area 616.

An upper limit may be set for the number of items of response information that can be displayed in the response information display area 603 and/or the response information display area 616. In the example of the response information display area 603 shown in section (a) of FIG. 6 and the response information display area 616 shown in section (b) of FIG. 6, the upper limit number of items of displayable response information is "3." When the number of items of response information displayed on each terminal device 2 exceeds the set upper limit, the display processor 274 of each terminal device 2 sequentially displays the distribution screen 600 in which the three most recently received items of response information are included in the response information display area 603, or the distribution screen 610 in which the three most recently received items of response information are included in the response information display area 616.

The response information in the response information display area 616 may be displayed in a scrollable manner. In this case, in response to a swipe operation by the user (for example, an operation in which the finger moves up from the bottom of the screen while in contact with the screen), response information that is not currently included in the response information display area 616 is scroll-displayed within the response information display area 616. The response information in the response information display area 603 included in the distribution screen 600 may also be displayed in a scrollable manner, similar to the response information display area 616.

The viewing end button 617 is an object image such as a button object for ending display of the distribution screen 610 and ending viewing of the distribution image 612. When the viewing end button 617 is selected by an operation of the input device 24 by the viewing user, the display processor 274 of the terminal device 2 of the viewing user ends the display of the distribution screen 610. Then, the transmitter 272 of the terminal device 2 transmits information regarding the viewing end instruction together with the viewing user ID and the destination information stored in the terminal memory device 22 to the server device 3 via the terminal communication I/F 21. Upon receiving the viewing user ID and the information regarding the viewing end instruction transmitted from the terminal device 2 of the user, the server receiver 331 of the server device 3 stores the viewing user ID that is the same as the received viewing user ID and is associated with the distributing user ID of the distributing user related to the distribution screen 610 in the server memory device 32 as a viewing ended user ID. In addition, the viewing ended user ID is stored in association with the distributing user ID of the distributing user related to the distribution screen 610 that has been ended. As a result, viewing of the distribution image by the viewing user who selected the viewing end button 617 ends.

Figure 7:
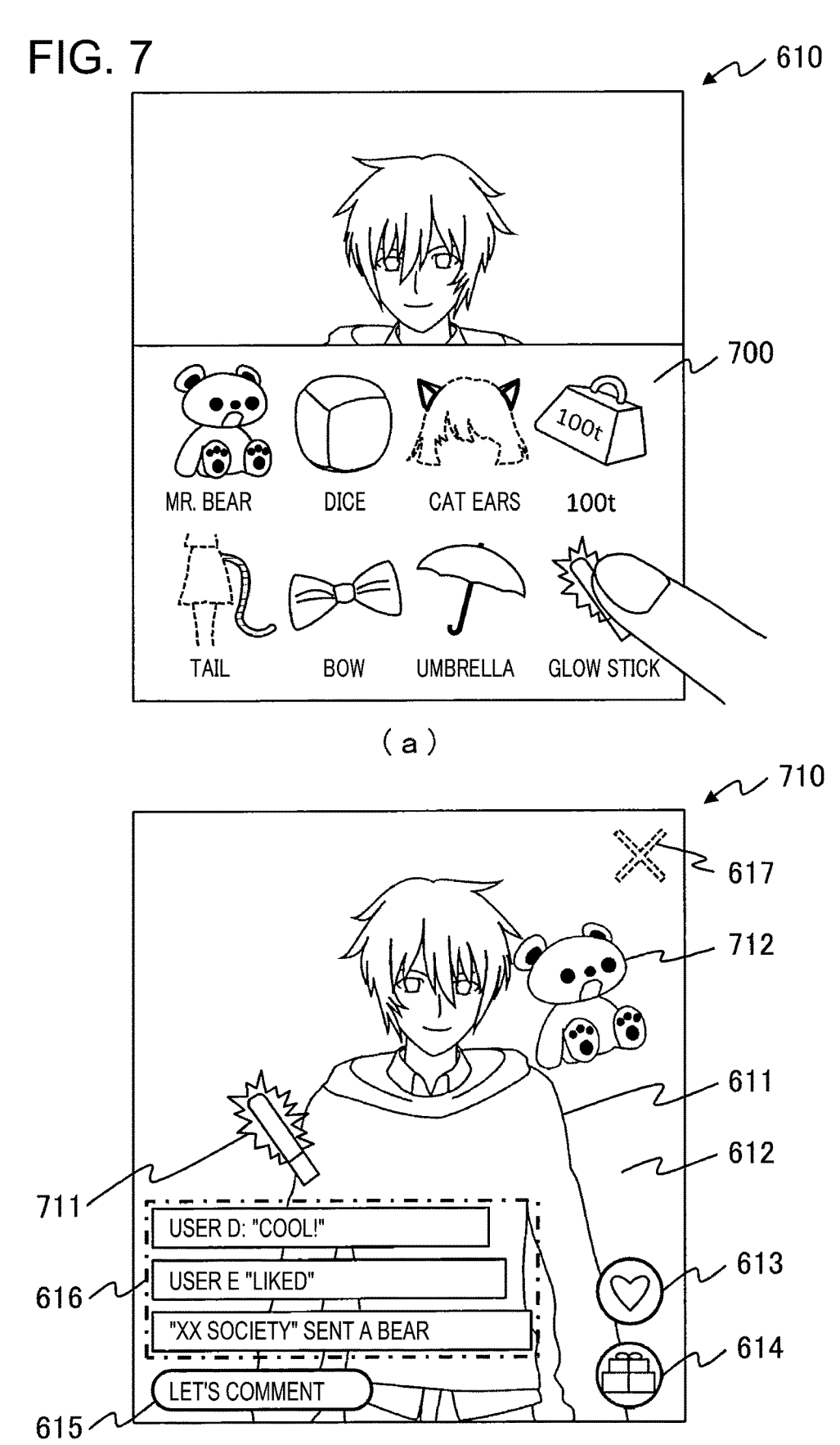
FIG. 7 is a diagram showing one example of various screens displayed on a terminal device.

Section (a) of FIG. 7 is a diagram showing one example of a selection screen 700 displayed on the display device 23 of the terminal device 2 of the viewing user (the viewing terminal device). As shown in section (a) of FIG. 7, the selection screen 700 is displayed so as to be superimposed on the distribution screen 610. The selection screen 700 may also be displayed later while displaying of the distribution screen 610 is temporarily interrupted, and the distribution screen 610 may be redisplayed when displaying of the selection screen 700 is finished.

In the example shown in section (a) of FIG. 7, images showing eight types of addition candidate objects are included within the display area of the selection screen 700. A title (or name) indicating the addition candidate object may be arranged near the image indicating the addition candidate object. The number of addition candidate objects included in the display area of the selection screen 700 is not limited to eight, and may be seven or less or nine or more. When a portion of the images showing the plurality of addition candidate objects cannot be included within the display area of the selection screen 700, the display processor 274 of the terminal device 2 may display the images showing the addition candidate objects in a scrollable manner. In this case, in response to a swipe operation by the viewing user (for example, an operation in which a finger moves from right to left while in contact with the screen), images showing the addition candidate objects that are not currently included in the display area of the selection screen 700 are scrolled and displayed within the display area of the selection screen 700.

Each addition candidate object indicates an additional object. The image representing the addition candidate object is, for example, an icon image, a thumbnail image, or the like, representing a gift object, which is a type of additional object. In addition, on the selection screen 700, the image of each addition candidate object may be categorized and displayed for each type of additional object (free gift, paid gift, accessory, support goods, appeal, variety, cooperative gifts requiring cooperation from a user belonging to a group, and the like). An additional object belonging to the paid gift type is an additional object that can be purchased by the user by consuming "coins" of virtual monetary value. An additional object belonging to the free gift type is an additional object that can be obtained by consuming points that can be obtained by viewing a distribution instead of consuming monetary value. In addition, the additional object may be an object that the viewing user can transmit to the distributing user by playing a predetermined mission executed on the terminal device 2 and clearing the predetermined mission. The additional object may be an object that the viewing user can transmit to the distributing user by playing a known lottery game executed on the terminal device 2 and winning the lottery game. Also, the additional object may be managed (stored) as an object owned by the viewing user.

When an addition candidate object is selected in accordance with operation of the input device 24 by the viewing user, the input device 24 inputs an addition instruction to the terminal processor 27 together with the object ID corresponding to the selected addition candidate object. An example of the addition process according to the addition instruction will be described below.

First, upon acquiring the input addition instruction and object ID, the display processor 274 refers to the object table T2 and extracts from the terminal memory device 22 the still image or video image (image information) of the additional object associated with the acquired object ID. Next, the display processor 274 generates a new distribution image 612, in which the extracted still image or video is included in the distribution image 612 including the character object 611 of the distributing user.

Next, upon acquiring the input addition instruction and object ID, the transmitter 272 transmits information indicating the addition instruction, together with the acquired object ID, the viewing user ID of the viewing user stored in the terminal memory device 22, and information regarding the distribution image (the distributing user ID of the distribution image) to the server device 3 via the terminal communication I/F 21. Next, the server receiver 331 of the server device 3 receives the information indicating the addition instruction, the object ID, the viewing user ID and the information regarding the distribution image (the distributing user ID of the distribution image) via the server communication I/F 31. If the information about the distribution image (the distributing user ID of the distribution image) is not transmitted, the server transmitter 332 of the server device 3 extracts, from the server memory device 32, the distributing user ID stored in association with the received viewing user ID. The server transmitter 332 extracts a viewing user ID other than the received viewing user ID from the information regarding the distribution image (the distributing user ID of the distribution image) or the viewing user ID associated with the extracted distributing user ID. Then, the server transmitter 332 transmits the information indicating the received addition instruction, the object ID, and the received user ID (the user ID of the viewing user who issued the addition instruction) to the terminal device 2 of the viewing user indicated by the extracted viewing user ID, via the server communication I/F 31. In addition, the server transmitter 332 transmits the information indicating the received addition instruction, the object ID and the received viewing user ID to the terminal device 2 of the distributing user indicated by the information regarding the distribution image (the distributing user ID of the distribution image) or the extracted distributing user ID, via the server communication I/F 31.

Then, the receivers 273 of the terminal devices 2 of the viewing users (excluding the viewing user who issued the addition instruction) and the distributing user receive the information indicating the addition instruction, the user ID of the viewing user who issued the addition instruction, and the object ID, via the terminal communication I/F 21. Next, the display processor 274 of each terminal device 2 refers to the object table T2 and extracts from the terminal memory device 22 the still image or the video (image information) of the additional object associated with the received object ID. Next, the display processor 274 generates a new distribution image 612 including the extracted still image or video in the distribution images 602 and 612 including the character objects 601 and 611 of the distributing user. In addition, the new distribution images 602 and 612 may newly display response information including the name of the viewing user who issued the addition instruction and the name of the additional object associated with the received object ID. With the above, the addition process ends.

Section (b) of FIG. 7 is a diagram showing another example of a distribution screen 710 displayed on the display device 23 of the terminal device 2. Similar to the distribution screen 610, the distribution screen 710 includes the distribution image 612 including the character object 611, the evaluation button 613, the add button 614, the comment button 615, the response information display area 616, and the viewing end button 617.

Unlike the distribution screen 610, the distribution screen 710 includes an additional object 711 and an additional object 712. Both the additional object 711 and the additional object 712 are still images or videos showing additional objects. An example of display processing for the additional object 712 will be described below, taking as an example a case where the viewing user who instructed the addition of the additional object 712 is the user A.

When an addition candidate object (corresponding to the additional object 712) is selected in response to operation of the input device 24 by the user A, the input device 24 of the terminal device 2 of the user A inputs an addition instruction to the terminal processor 27 together with the object ID corresponding to the selected addition candidate object. Upon acquiring the input addition instruction and object ID, the display processor 274 of the terminal device 2 of the user A refers to the object table T2 and extracts from the terminal memory device 22 the still image or the video (image information) of the additional object associated with the acquired object ID. Then, the display processor 274 of the terminal device 2 of the user A generates a new distribution image 612 including the additional object 712 based on the extracted still image or video, in the distribution image 612 including the character object 611 of the distributing user.

The transmitter 272 of the terminal device 2 of the user A transmits the information indicating the addition instruction for the additional object 712, the acquired object ID, and the viewing user ID of the user A stored in the terminal memory device 22 to the terminal device 2 of the viewing users (excluding the viewing user who issued the addition instruction) and the distributing user, via the server device 3. When the information indicating the addition instruction for the additional object 712, the viewing user ID of the user A, and the object ID are received by the receiver 273 of the terminal device 2 of each viewing user (excluding the user A) and the distributing user, the display processor 274 of the terminal device 2 of each viewing user (excluding the user A) and the distributing user refers to the object table T2 and extracts from the terminal memory device 22 the still image or the video (image information) of the additional object associated with the received object ID. Then, the display processor 274 of each terminal device 2 generates a new distribution image 612 based on the extracted still image or video, in the distribution image 612 including the character object 611 of the distributing user. With the above, the display process of the additional object 712 ends.

The additional object added to the distribution screen may change in shape, size, placement, color, brightness, and/or design while the distribution screen is being displayed when a predetermined change condition is met. The predetermined change condition may be a condition related to information indicating an instruction to add an additional object. For example, the predetermined change condition may be that any one of all viewing users viewing the same distribution screen satisfies a condition related to the timing of an addition instruction, and/or that at least two of all viewing users viewing the same distribution screen issue an addition instruction for a plurality of specific types of additional objects different from each other. Satisfying a condition regarding the timing of the addition instruction means, for example, that the time difference between the timing of the addition instruction by the plurality of viewing users is within a predetermined period. Predetermined points are given to a viewing user by the server device 3 according to the addition instruction by the viewing user. If the predetermined change condition is satisfied, a viewing user who has given an addition instruction that satisfies the predetermined change condition may be awarded more points than the predetermined points. The predetermined change condition may be that a condition related to the timing of an addition instruction by any one of the plurality of viewing users having a predetermined relationship is satisfied, and/or that a plurality of viewing users having a predetermined relationship has issued an addition instruction for a plurality of specific types of additional objects different from each other. In this case, even if the condition regarding the timing of an addition instruction by a viewing user who does not have the predetermined relationship is satisfied, the predetermined change condition is not satisfied.

The predetermined relationship among the plurality of viewing users is, for example, that one viewing user among the plurality of viewing users is a mutual follower with another viewing user among the plurality of viewing users. Note that when one user follows another user and the other user also follows the one user (one user and another user follow each other), the one user and the other user become mutual followers. Further, the predetermined relationship among the plurality of viewing users may be that one viewing user among the plurality of viewing users has a mutual following relationship with a predetermined viewing user who mutually follows another viewing user among the plurality of viewing users.

Further, the predetermined relationship among the plurality of viewing users may be that the plurality of viewing users is in a friend relationship. In addition, the predetermined relationship among the plurality of viewing users may be that specific information (telephone number, email address, a predetermined ID (identification), or the like) of another viewing user among the plurality of viewing users is stored in the terminal device of one viewing user among the plurality of viewing users. Also, the predetermined relationship among the plurality of viewing users may be a relationship in which the number of times the plurality of viewing users has engaged in information exchanges using the same information exchange service is at least a predetermined number of times. Moreover, the predetermined relationship among the plurality of viewing users may be a relationship in which the number of times each of the plurality of viewing users has participated in the same and/or different information exchange services is at least a predetermined number of times.

Further, the predetermined relationship among the plurality of viewing users may be such that when one viewing user among the plurality of viewing users distributes a distribution image as a distributing user, the relationship is related to operation by another viewing user among the plurality of viewing users. Here, the relationship related to operation by another viewing user is a relationship such that the number of times the other viewing user has viewed the distribution image delivered by the one viewing user is at least a predetermined number of times of viewing. Also, the relationship related to operation by another viewing user may be a relationship such that, in the distribution image distributed by the one viewing user, transmission of comment information by the other viewing user is at least a predetermined number of transmissions.

Further, the predetermined relationship among the plurality of viewing users may be a relationship regarding a predetermined event in which each of the plurality of viewing users participates. Here, the relationship regarding a predetermined event is a relationship in which each of the plurality of viewing users is currently participating in the same event. Also, the relationship regarding a predetermined event may be a relationship in which each of the plurality of viewing users has participated in the same event in the past. Further, the relationship regarding a predetermined event may be a relationship such that another viewing user among the plurality of viewing users has participated in an event in which one or more viewing users among the plurality of viewing users has participated in the past.

When a change button (not shown) of the distribution image 602 is selected by operation of the input device 24 by the distributing user, a selection screen 800 is displayed. For example, the change button is included in distribution screen

Figure 8:
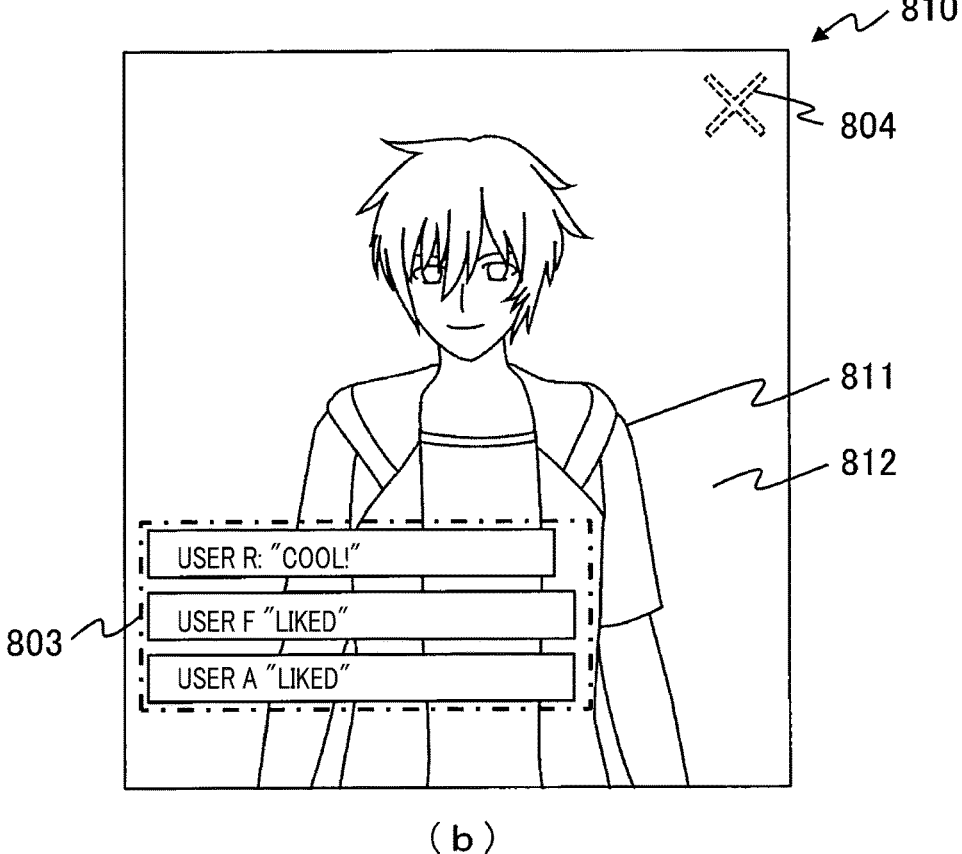
FIG. 8 is a diagram showing one example of various screens displayed on a terminal device.

600. The change button may be included in a predetermined screen such as the home screen or the like displayed on the display device 23. Section (a) of FIG. 8 is a diagram showing one example of the selection screen 800 displayed on the display device 23 of the terminal device 2 of the distributing user (the distributing terminal device). The selection screen 800 shown in section (a) of FIG. 8 is displayed superimposed on the distribution screen 600. The selection screen 800 may be displayed after displaying of the distribution screen 600 ends.

The selection screen 800 includes a plurality of placement candidate objects 801 respectively indicating a plurality of placement locations, and wearable candidate objects 802 that are candidates for a wearable object to be newly worn on the character object 601. When one of the plurality of placement candidate objects 801 is selected by operation of the input device 24 by the distributing user, a wearable candidate object 802 corresponding to the object ID of an owned object of the distributing user associated with the placement candidate corresponding to the selected placement candidate object 801 is displayed on the selection screen 800. When one of the plurality of wearable candidate objects 802 is selected by operation of the input device 24 by the distributing user, the input device 24 inputs a change instruction to the terminal processor 27, and the display processor 274 performs the change process described above. Then, the display processor 274 displays a distribution screen 810 section (b) of (FIG. 8) including a distribution image 812 including a character object 811 wearing the new wearable object.

Section (b) of FIG. 8B is a diagram showing another example of the distribution screen 810 displayed on the display device 23 of the terminal device 2 of the distributing user (the distributing terminal device). The distribution screen 810 includes at least the distribution image 812 including the character object 811 of the distributing user wearing the new wearable object. In the example shown in section (b) of FIG. 8, the character object 811 is displayed with the clothes worn by the character object 601 of the distributing user having changed.

Information regarding the change instruction input by the distributing user who started the video distribution service is transmitted via the server device 3 to the terminal device 2 (the viewing terminal device) of a viewing user who is viewing the distribution image of the distributing user. As a result, the change process corresponding to the change instruction input by the distributing user is also executed in the terminal device 2 of the viewing user (the viewing terminal device). As a result, the distribution image including the distributing user character object that is wearing the new wearable object is displayed on the terminal device 2 of the viewing user (the viewing terminal device).

As described with reference to FIGS. 7 and 8, at least part of the distribution image including the character object of the distributing user is changed in accordance with the addition instruction from a viewing user, and at least part of the character object of the distributing user is changed in accordance with the change instruction from the distributing user. As a result, it is possible to prevent the viewing user from becoming bored during the distribution event, and to increase the motivation of the users to continue using the video distribution service.

Further, in a conventional information processing system, after starting the distribution event to a viewing user via the character object, the distributing user had to interrupt the distribution event in order to change the distribution image including the character object. After the distribution event was interrupted, it was necessary to activate a function for changing the appearance of the character object and/or the image such as the background in the distribution image including the character object. Then, the distributing user had to perform a complicated procedure to restart the distribution event after changing the character object and/or the distribution image using the change function. In contrast, the information processing system 1 of the present embodiment makes it possible to change the character object of the distributing user without interrupting the distribution event and resetting the character object of the distributing user. As a result, in the information processing system 1 of the present embodiment, the user interface for changing the character object of the distributing user during the distribution event does not become complicated, so usability can be improved, as compared to the conventional information processing system. In addition, in the information processing system 1 of the present embodiment, since it is possible to change the character object of the user without interrupting the distribution event, it is possible to reduce the number of communications and the amount of communication between the server device 3 and the terminal devices 2. Thus, in the information processing system 1 of this embodiment, it is possible to improve communication between the server device 3 and the terminal devices 2.

Section (a) of FIG. 9 is a diagram showing one example of a group setting screen 900 displayed on the display device 23 of the terminal device 2 of a user. The group setting screen 900 is displayed in response to an operation by the user on a predetermined screen such as the home screen displayed on the display device 23. A user who can operate the terminal device 2 capable of displaying the group setting screen 900 is a distributing user or a viewing user. The user who can operate the terminal device 2 capable of displaying the group setting screen 900 is not limited to the distributing user and the viewing user, and may be any user capable of receiving the service provided by the server device 3. A new information exchange group is set in response to an operation by the user on the group setting screen 900.

As shown in section (a) of FIG. 9, the group setting screen 900 includes a candidate display area 901, selection objects 902, and a start button 903. The candidate display area 901 displays information indicating one or more candidate users who can belong to an information exchange group. For example, the one or more candidate users who can belong to the information exchange group are users who are mutual followers of the user operating the terminal device 2 displaying the group setting screen 900. Alternatively, the one or more candidate users who can belong to the information exchange group may be users who are friends with the user who operates the terminal device 2 displaying the group setting screen 900. The one or more candidate users who can belong to the information exchange group are not limited to those described above, and may be any user who has a predetermined relationship with the user who operates the terminal device 2 displaying the group setting screen 900. In the example shown in section (a) of FIG. 9, the display processor 274 of the terminal device 2 of the user displays, in the candidate display area 901, thumbnail images and names of each of the character objects of a plurality of users who can belong to the information exchange group, as information indicating the candidate users.

The selection objects 902 are operation objects for selecting the respective candidate users displayed in the candidate display area 901. In the example shown in section (a) of FIG. 9, the display processor 274 of the terminal device 2 of the user displays check box objects corresponding to the respective candidate users as the selection objects 902. For example, when a selection object 902 is selected by the user operating the input device 24, the selection object 902 is displayed with a "check" mark. In this case, the candidate users corresponding to the selection objects 902 displayed with the "check" mark are selected. Further, when a selection object 902 displayed with the "check" mark is selected by the user operating the input device 24, the selection object 902 is displayed without the "check" mark. In this case, the candidate user corresponding to the selection object 902 displayed without the "check" mark is not selected. Each selection object 902 is associated with the user ID of the corresponding candidate user.

The start button 903 is a button object or the like for the user to create a new information exchange group and start information exchange with other users who belong to the newly created information exchange group. When the start button 903 is selected by the user operating the input device 24, a new information exchange group is created to which the user operating the terminal device 2 and candidate users selected by the selection objects 902 belong as belonging users. For example, the display processor 274 of the terminal device 2 of the user specifies the user ID of the user stored in the terminal memory device 22 and the user IDs of the candidate users associated with the selection objects 902 that are in a state of having been selected by the selection objects 902. Then, the display processor 274 associates the user ID of the specified user and the user IDs of the candidate users with the newly created group ID as belonging users, and stores such in the group table T3. At this time, the display processor 274 may associate an automatically created information exchange group name, or associate an information exchange group name input by the user, with the newly created group ID. When a new information exchange group is created in response to selection of the start button 903, the display processor 274 displays an information exchange screen 1000 by users belonging to the new information exchange group.

Section (b) of FIG. 9 is a diagram showing one example of an information exchange start screen 910 displayed on the display device 23 of the terminal device 2 of a user. The information exchange start screen 910 is displayed in accordance with a user operation on a predetermined screen such as the home screen displayed on the display device 23. A user who can operate a terminal device 2 capable of displaying the information exchange start screen 910 is a distributing user or a viewing user. The user who can operate the terminal device 2 capable of displaying the information exchange start screen 910 is not limited to the distributing user and the viewing user, and may be any user capable of receiving the service provided by the server device 3. Information exchange by the selected information exchange group is started in response to an operation by the user on the information exchange start screen 910.

As shown in section (b) of FIG. 9, the information exchange start screen 910 includes a candidate group area 911. Information indicating the information exchange groups to which the user who operates the terminal device 2 displaying the information exchange start screen 910 belongs is displayed in the candidate group area 911. The information indicating the information exchange groups is selectable by the user, and the information indicating the information exchange group is associated with the group ID of the corresponding information exchange group.

When information indicating one of the information exchange groups included in the information exchange start screen 910 is selected by the user operating the input device

24, the group ID associated with the information indicating the selected information exchange group is specified. The display processor 274 displays an information exchange screen 1000 of each user identified by the user ID associated with the specified group ID (each user belonging to the information exchange group indicated by the specified group ID).

Section (a) of FIG. 10 is a diagram showing one example of an information exchange screen 1000 displayed on the display device 23 of the terminal device 2 of the user. On the information exchange screen 1000, information is exchanged by a plurality of users belonging to the information exchange group newly set by the user selecting the start button 903 included in the group setting screen 900. Alternatively, on the information exchange screen 1000, information is exchanged by a plurality of users belonging to the information exchange group selected by the user on the information exchange start screen 910. Hereinafter, users other than the user operating the terminal device 2 displaying the information exchange screen 1000 among the plurality of users belonging to the information exchange group that exchanges information may be referred to as other users. The information exchange screen 1000 (and each information exchange screen described below) may be realized by a so-called chat screen or the like that realizes text chat or the like.

The information exchange screen 1000 includes other user input information 1001, other user information 1002, a text input object 1003, a candidate display button 1004, and user input information 1005. The other user input information 1001 is input information input by another user. The other user information 1002 is information (such as an icon image of a character object) indicating another user displayed in association with each item of the other user input information 1001. The text input object 1003 is an operation object for the user to input text information as input information. The candidate display button 1004 is an operation object for displaying candidate information 1101, 1211 and 1303 corresponding to character-related images so that the user can select such. The user input information 1005 is input information input by the user.

Each time other user input information transmitted from the terminal device 2 of another user is received via the server device 3, the display processor 274 displays the other user input information 1001 indicating the received input information of the other user, in the other user display area of the information exchange screen 1000. For example, the other user display area is an area near the left side of the information exchange screen 1000, and the other user input information 1001 is displayed chronologically from the top to the bottom of the screen in the other user display area, starting with the oldest information. Each time the input information of the user is input by an input operation of the user on the text input object 1003, the display processor 274 displays the user input information 1005 indicating the input information of the user that was input, in the user display area of the information exchange screen 1000. For example, the user display area is an area near the right side of the information exchange screen 1000, and the user input information 1005 is displayed chronologically from the top to the bottom of the screen in the user display area, starting with the oldest information.

When the information exchange screen 1000 related to a newly established information exchange group is displayed, the transmitter 272 of the terminal device 2 of the user transmits information regarding the new information exchange group to the server device 3 via the terminal communication I/F 21. The information regarding the new information exchange group is the group ID of the new information exchange group, the name of the new information exchange group, and the user IDs of the users belonging to the new information exchange group.

The server receiver 331 of the server device 3 receives the information regarding the information exchange group via the server communication I/F 31. The server receiver 331 stores the received information regarding the new information exchange group in the server memory device 32. For example, the server receiver 331 stores the name of the new information exchange group and the user IDs of the users belonging to the new information exchange group in the server memory device 32 in association with the group ID of the new information exchange group.

The server transmitter 332 of the server device 3 transmits, via the server communication I/F 31, the information regarding the new information exchange group to the terminal devices 2 of other users indicated by the user IDs of users other than the user transmitting the information regarding the new information exchange group, among the users belonging to the new information exchange group.

Upon receiving the information regarding the new information exchange group transmitted from the terminal device 2 of the user via the server device 3, the receiver 273 of the terminal devices 2 of the other users stores the name of the new information exchange group and the user IDs of the users who belong to the new information exchange group in the group table T3, associated with the group ID of the new information exchange group. In addition, the display processor 274 of the terminal devices 2 of the other users may automatically display the information exchange screen 1000 related to the new information exchange group upon receiving the information regarding the new information exchange group.

In the information exchange screen 1000, when new text information is input to the text input object 1003 as input information by a user operation, the display processor 274 displays the input new text information in the user display area as the user input information 1005. In the information exchange screen 1000, when image information, video information, or the like is input as input information by a user operation, the display processor 274 displays the input image information, video information, or the like in the user display area as the user input information 1005. Information that is input as input information is not limited to text information, image information, and video information, and may be information in a format that can be used by a predetermined application program.

When the input information input by an operation of another user into the information exchange screen displayed by the terminal device 2 of the other user is received via the server device 3 along with the user ID of the other user, the received input information is displayed in the other user display area as other user input information. In this case, an image or the like related to the received user ID of the other user is displayed as the other user information 1002.

The transmitter 272 of the terminal device 2 of the user transmits the input new text information and user ID of the user to the terminal device 2 of the other user via the server device 3. As a result, the input new text information is displayed as other user input information 1001 on the information exchange screen 1000 displayed on the terminal device 2 of the other user who is a belonging user other than the user who input the text information.

When the candidate display button 1004 is selected on the information exchange screen 1000 by the user operating the input device 24, the input device 24 transmits to the terminal processor 27 an instruction to display candidate information for selecting a character-related image. Next, the display processor 274 determines whether or not a character-related image including the character object of the user has been generated in the past and stored in the terminal memory device 22. If no character-related image containing the character object of the user is stored, the display processor 274 displays a generation instruction object 1006 for instructing generation of a character-related image. Further, when a character-related image including the character object of the user is stored, for example, the display processor 274 displays the information exchange screen 1100 including four types of stored candidate information 1101.

Section (b) of FIG. 10 is a diagram showing one example of an information exchange screen 1010 displayed on the display device 23 of the terminal device 2 of the user. The information exchange screen 1010 is a screen displayed when it is determined that a character-related image including the character object of the user is not stored in terminal memory device 22 when the candidate display button 1004 included in the information exchange screen 1000 is selected by the user.

Similar to the information exchange screen 1000, the information exchange screen 1010 includes the other user input information 1001, the other user information 1002, the text input object 1003, the candidate display button 1004, and the user input information 1005. Furthermore, the information exchange screen 1010 includes the generation instruction object 1006. In the example shown in section (b) of FIG. 10, information prompting generation of a character-related image is displayed on the information exchange screen 1010, together with the generation instruction object 1006.

When the generation instruction object 1006 is selected by operation of the input device 24 by the user on the information exchange screen 1010, the input device 24 transmits a character-related image generation instruction to the terminal processor 27. When character-related image generation instruction is acquired from the input device 24, the generator 271 executes a character-related image generation process. An example of character-related image generation process will be described below.

First, the generator 271 extracts the model ID of the character object associated with the user ID stored in the terminal memory device 22 and the object ID of a used object from the user table T1. Next, the generator 271 reads from the terminal memory device 22 the model data associated with the extracted model ID, and the image information and placement location associated with the extracted object ID of the used object. Next, the generator 271 reads the motion data for the character-related image and the object data for the character-related image from the terminal memory device 22. Next, the generator 271 generates a character-related image including a character object with a predetermined action and facial expression, and object data such as a background, letters and the like, based on the model data, the image information and placement location of the used object, the motion data for the character-related image, and the object data for the character-related image that were read. Then, the generator 271 associates the generated character-related image with a related image ID for uniquely identifying the character-related image, and stores such in the terminal memory device 22. The generator 271 also generates candidate information indicating the generated character-related image, associates the generated candidate information with the related image ID for identifying the character-related image, and stores such in the terminal memory device 22. In addition, the generator 271 associates the object ID of the used object at the time of generating the character-related image with the related image ID and stores such in the terminal memory device 22, and the character-related image generation process ends. In addition, part or all of the generated character-related image may be set so as not to be usable in the information exchange service. In this case, a usable group composed of character-related images usable in the information exchange service may be set. Then, when a new character-related image that is usable in the information exchange service is generated, the new character-related image is set to be included in the usable group.

An example of the transmission process for the character-related image is described below. First, the transmitter 272 of the terminal device 2 that generated the character-related image transmits the character-related image associated with the related image ID, the candidate information, and the object ID of the used object, which are stored in the terminal memory device 22, to the server device 3 via the terminal communication interface (I/F) 21. The user ID stored in the terminal memory device 22 is transmitted to the server device 3 together with the character-related image associated with the related image ID, the candidate information, and the object ID of the used object. Upon receiving the character-related image associated with the related image ID, the candidate information, the object ID of the used object, and the user ID, the server receiver 331 of the server device 3 stores the related image ID in association with the user ID, and also stores the character-related image, the candidate information, and the object ID of the used object in the server memory device 32, in association with the related image ID. Then, the server transmitter 332 transmits the related image ID associated with the user ID of the user, and the character-related image associated with the related image ID, the candidate information and the object ID of the used object that were received, to the terminal device 2 of another user belonging to the information exchange group to which the user of the terminal device 2 that transmitted the character-related image or the like belongs, via the server communication interface (I/F) 31. The terminal device 2 of the other user stores the transmitted related image ID associated with the user ID, the character-related image associated with the related image ID, the candidate information, and the object ID of the used object in the terminal memory device 22. With the above, the character-related image transmission process ends. In addition, the transmitter 272 of the terminal device 2 that generated the character-related image need not transmit to the server device 3 the candidate information associated with the related image ID or the object ID of the used object stored in the terminal memory device 22. Also, the candidate information and the object ID of the used object associated with the user ID of one user belonging to the same information exchange group need not be transmitted to the terminal device 2 of another user belonging to the information exchange group. Also, the timing at which the character-related image associated with the user ID of one user belonging to the same information exchange group is transmitted to the terminal device 2 of another user belonging to the information exchange group may be the timing of the character-related image being selected as the input information. The character-related image transmission process may be performed each time the character-related image generation process is performed and/or the additional generation process is performed.

Figure 11:
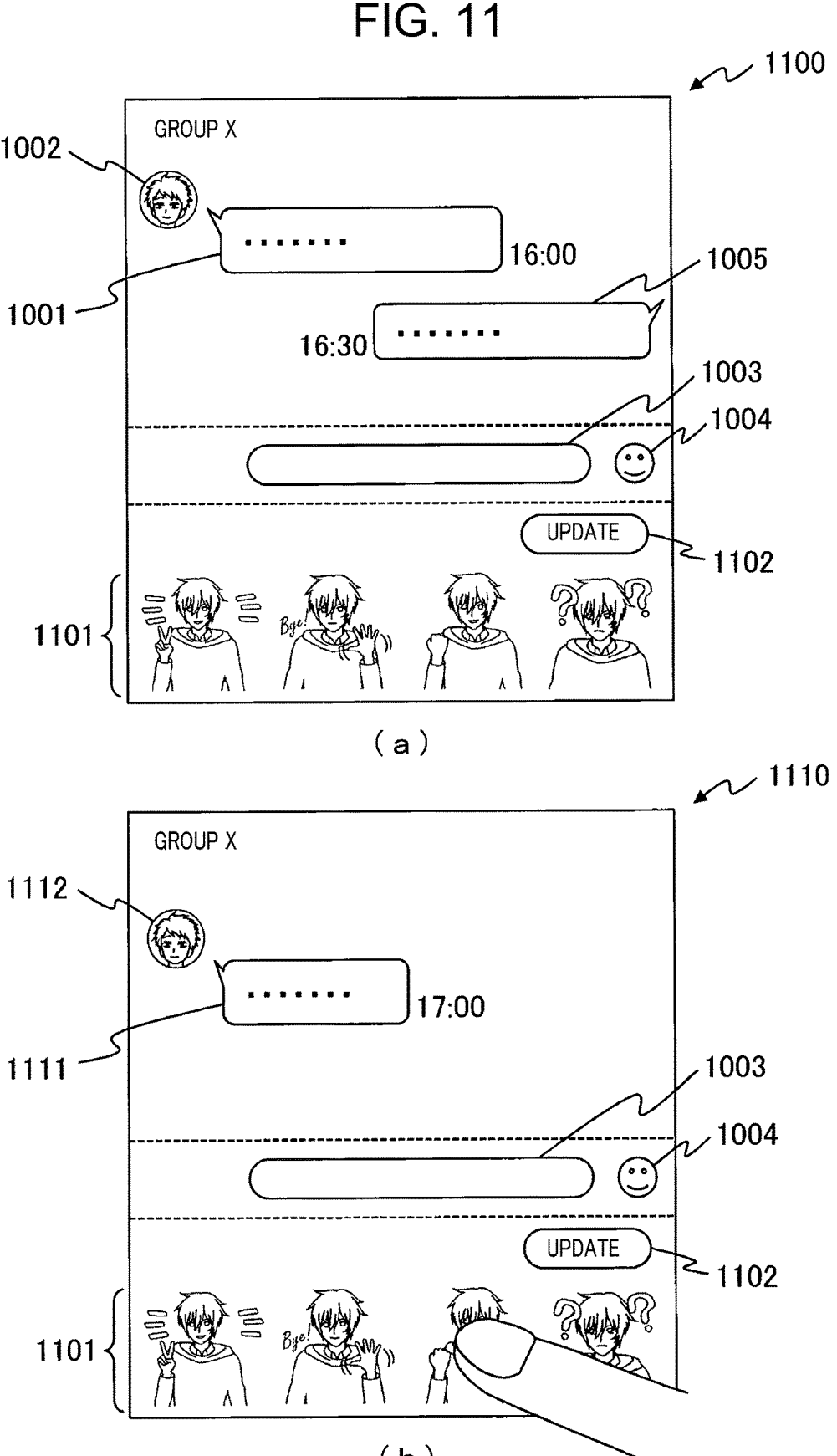
FIG. 11 is a diagram showing one example of various screens displayed on a terminal device.

The display processor 274 reads out the candidate information generated by the generator 271 from the terminal memory device 22 and displays such. Section (a) of FIG. 11 is a diagram showing one example of an information exchange screen 1100 displayed on the display device 23 of the terminal device 2 of the user. The information exchange screen 1100 is a screen that is displayed when the generation instruction object 1006 included in the information exchange screen 1010 is selected by the user.

Similar to the information exchange screen 1000, the information exchange screen 1100 includes the other user input information 1001, the other user information 1002, the text input object 1003, the candidate display button 1004, and the user input information 1005. Furthermore, the information exchange screen 1010 includes four types of generated candidate information 1101 and an update button 1102. The types of candidate information 1101 included in the information exchange screen 1100 are not limited to four types, and may be three or fewer types or five or more types. The display processor 274 of the terminal device 2 may display the candidate information 1101 in a scrollable manner when a portion of the multiple types of the candidate information 1101 cannot be included in the display area of the information exchange screen 1100. In this case, the candidate information 1101 that is not currently included in the display area of the information exchange screen 1100 can be scrolled and displayed within the display area of the information exchange screen 1100 in response to a swipe operation by the user (for example, an operation in which the finger moves from right to left while in contact with the screen).

When one of the four types of candidate information 1101 is selected in accordance with an operation of the input device 24 by the user (section (b) of FIG. 11), the input device 24 transmits the related image ID associated with the selected candidate information to the terminal processor 27. Next, the display processor 274 extracts from the terminal memory device 22 the character-related image identified by the related image ID received from the input device 24, and displays the extracted character-related image as the user input information 1201 in the user display area on the distribution screen 1200 (section (a) of FIG. 12).

Along with the display of the user input information 1201 by the display processor 274, the transmitter 272 transmits the related image ID received from the input device 24 and the user ID stored in the terminal memory device 22 to the server device 3 via the terminal communication I/F 21. The server transmitter 332 of the server device 3 extracts from the server memory device 32 the user ID of other users associated with the same information exchange group as the user ID received by the server receiver 331. Further, the server transmitter 332 transmits the related image ID and the user ID received by the server receiver 331 to the terminal devices 2 of the other users identified by the extracted user ID, via the server communication I/F 31.

Then, the receiver 273 of the terminal devices 2 of the other users receive the related image ID and the user ID transmitted from the server device 3, via the terminal communication I/F 21. Next, the display processor 274 of the terminal devices 2 of the other users extracts, from the terminal memory device 22, the character-related image identified by the related image ID received by the receiver 273, and displays the extracted character-related image in the other user display area of the distribution screen as the other user input information. In this way, the same image as the character-related image used by the user is also displayed on the terminal devices 2 of the other users associated with the information exchange group to which the user belongs. In addition, the display processor 274 of the terminal device 2 of each of the other users is such that when a character-related image identified by the received related image ID is not stored in the terminal memory device 22, the transmitter 272 of the terminal device 2 of the other user transmits an image transmission request to the server device 3. The image transmission request is transmitted together with the received related image ID and/or user ID along with the user ID of the other user. When the image transmission request is received by the server receiver 331, the server transmitter 332 of the server device 3 extracts from the server memory device 32 the character-related image associated with the related image ID received together with the image transmission request. Next, the server transmitter 332 transmits the extracted character-related image to the terminal device 2 of the other user together with the received related-image ID and user ID. The receiver 273 of the terminal device 2 of the other user receives, via the terminal communication I/F 21, the related image ID, the character-related image and the user ID transmitted from the server device 3, associates these with each other, and stores these in the terminal memory device 22. Then, the display processor 274 of the terminal device 2 of the other user displays the stored character-related image in the other user display area of the distribution screen as the other user input information.

Returning to section (a) of FIG. 11, when the update button 1102 is selected in response to operation of the input device 24 by the user, the display processor 274 of the terminal device 2 of the user extracts the object ID of the used object of the user, from the user table T1. Next, the display processor 274 of the terminal device 2 of the user reads the related image ID associated with the user ID of the user from the terminal memory device 22, and reads the object ID of the used object associated with the related image ID that was read, from the terminal memory device 22. Then, when the object ID extracted from the user table T1 is different from the object ID associated with the related image ID, the display processor 274 instructs the generator 271 to execute the character-related image generation process. When the character object change process is executed, the object ID extracted from the user table T1 is different from the object ID associated with the related image ID. Furthermore, when execution of the character-related image generation process is ordered from the display processor 274, the generator 271 re-executes the character-related image generation process.

When the re-executed character-related image generation process ends, the transmitter 272 performs a transmission process on the character-related image associated with the related image ID, the candidate information, and the object ID of the used object. The character-related image and candidate information to be transmitted are generated by the re-executed generation process. A candidate information display process by the display processor 274 is executed along with the process of transmitting the character-related image and the like. The displayed candidate information is generated by the re-executed generation process.

Section (b) of FIG. 12 is a diagram showing one example of an information exchange screen 1210 displayed on the display device 23 of the terminal device 2 of the user. The information exchange screen 1210 is a screen displayed when the used object of the character object of the user differs from the used object of the character-related image, when the update button 1102 included in the information exchange screen 1100 is selected by the user.

Similar to the information exchange screen 1100, the information exchange screen 1210 includes the other user input information 1111, the other user information 1112, the text input object 1003, the candidate display button 1004, and the update button 1102. Unlike the used object of the candidate information 1101 of the information exchange screen 1100, the used objects of the candidate information 1211 of the information exchange screen 1210 reflect clothes that are the used object of the current character object.

The change to the candidate information 1211 on the information exchange screen 1210 is not limited to being performed in accordance with selection of the update button 1102. For example, the display processor 274 may re-execute the character-related image generation process in conjunction with execution of the character object change process by operation of the selection screen 800 by the user. In this case, an information exchange screen 1210 including changed candidate information 1211 generated by the re-executed generation process may be displayed in response to selection of the candidate display button 1004 by the user.

Returning to section (a) of FIG. 11, when the update button 1102 included in the information exchange screen 1100 is selected in accordance with operation of the input device 24 by the user, the display processor 274 determines whether a candidate change condition is satisfied. When the display processor 274 determines that the candidate change condition is satisfied, the generator 271 executes a generation process for a new character-related image, and the display processor 274 generates candidate information corresponding to the new character-related image. Motion data for the new character-related image stored in the terminal memory device 22 is used in the generation process for the new character-related image. Object data for the new character-related image stored in the terminal memory device 22 may be used in the generation process for the new character-related image.

For example, the candidate change condition is a condition related to the information exchange service provided by the user. For example, the condition regarding the information exchange service performed by the user is a condition that the number of items of input information input in accordance with operation of the input device 24 by the user is at least a predetermined number. The number of items of input information is the number of items of all types of input information (text information, stamp image, and the like). The number of items of input information may be the number of items of a particular type of input information. For example, the candidate change condition may be a condition that the number of items of text information input as input information is at least a predetermined number, or a condition that the number of character-related images input as input information is at least a predetermined number. Additionally, the candidate change condition may be a condition that the number of stamp images input as input information is at least a predetermined number, or a condition that the number of videos input as input information is at least a predetermined number.

The condition regarding the information exchange service performed by the user may be a condition that the number of other users (information exchange partners) who operate terminal devices 2 that have received the input information input in accordance with operation of the input device 24 by the user is at least a predetermined number. The input information transmitted to (the terminal devices 2 of) at least a predetermined number of other users is the number of items of all types of input information (text information, stamp image, and the like). The input information transmitted to (the terminal devices 2 of) at least a predetermined number of other users may be the number of items of specific types of input information. For example, the candidate change condition may be a condition that the number of terminal devices 2 that have received a stamp image input as input information (the number of users who have received the stamp image) is at least a predetermined number. Alternatively, the candidate change condition may be a condition that the number of terminal devices 2 that have received a character-related image input as input information (the number of users who have received the character-related image) is at least a predetermined number. The condition regarding the information exchange service performed by the user may be, for example, a condition that the number of times the user has performed a so-called video chat is at least a predetermined number.

In addition, the candidate change condition may be a condition regarding a parameter of the user who selects the update button 1102, regarding a distribution event performed by the user as a distributing user. For example, the condition regarding a parameter of the user regarding a distribution event is a condition regarding the number of viewing users who issued an addition instruction for a specific additional object in a distribution event performed by the user as a distributing user. For example, in a distribution event in which the user who selected the update button 1102 performs as a distributing user, a parameter indicating a "rank" is associated with the user and stored in the terminal memory device 22 in accordance with the number of viewing users who issued an addition instruction for a specific additional object. In this case, for example, the specific additional object may be an additional object such as a point gift, a coin gift, or the like. Further, for example, a parameter indicating "rank A" is stored in the terminal memory device 22 in association with a distributing user whose number of viewing users who issued an addition instruction for a specific additional object is "1000" or more, and a parameter indicating "rank B" is stored in the terminal memory device 22 in association with a distributing user whose number of viewing users who issued an addition instruction for a specific additional object is less than "1000." The parameter indicating "rank" may be information indicating a numerical value or information indicating a character string.

The parameter indicating "rank" may be a parameter in which the number of viewing users who issued an addition instruction for a plurality of types of specific additional objects is calculated for each type, and the "rank" is indicated based on the number of viewing users who issued an addition instruction for each type of specific additional object.

Further, the condition regarding the parameter of the user regarding the distribution event may be a condition regarding ranking of the distributing user based on the number of viewing users who issued an addition instruction for a specific additional object in the distribution event performed by the user as a distributing user. For example, in a distribution event performed by the user as a distributing user, the number of viewing users who issued an addition instruction for the additional object of "bear" (for example, a gift object having the appearance of a bear) is calculated for each distributing user, and the candidate change condition may be determined to be satisfied for the top five distributing users who have the largest number of viewing users who issued the addition instruction for the additional object of "bear." In addition, the new character-related images of the five distributing users who satisfied the candidate change condition may include the additional object of "bear." Further, the condition regarding the parameter of the user regarding the distribution event may be a condition that the number of days of the distribution event performed by the user as a distributing user is at least a predetermined number of days.

Further, the candidate change condition may be a condition regarding other users related to the user. For example, the candidate change condition is a condition that the number of other users having a predetermined relationship with the user is at least a predetermined number. Further, for example, the candidate change condition is a condition that, for a distribution event performed by the user as a distributing user, among other users having a predetermined relationship with the user, the number of other users who have viewed the distribution event is at least a predetermined number. For example, the other users who have a predetermined relationship with the user are mutual followers of the user. Further, the other users who have a predetermined relationship with the user may be other users who are in a mutual following relationship with a predetermined user who is a mutual follower of the user. In addition, the other users who have a predetermined relationship with the user may be other users who have a friend relationship with the user, or may be other users for which specific information (telephone number, email address, predetermined ID (identification), or the like) is stored in the terminal device of the user. Also, the predetermined relationship between the user and the other users may be a relationship in which the number of times the user and the other users have exchanged information using the same information exchange service is at least a predetermined number of times. Also, the predetermined relationship between the user and the other users may be a relationship in which the number of times the user and the other users have participated in the same and/or different information exchange services is at least a predetermined number of times. Further, the predetermined relationship between the user and the other users may be a relationship relating to operation by another viewing user of out of plurality of viewing users, when one viewing user among the user and other users distributes a distribution image as a distributing user. Here, the relationship related to operation by the other viewing user is a relationship in which the number of times other viewing users have viewed the distribution image delivered by the one viewing user is at least a predetermined number of times of viewing. Also, the relationship related to operation by the other viewing user may be a relationship in which, in the distribution image distributed by the one viewing user, transmission of comment information by the other viewing users is at least a predetermined number of transmissions. Also, the predetermined relationship between the user and other users may be a relationship regarding a predetermined event in which the user and other users are each participating. Here, the relationship regarding the predetermined event is a relationship in which the user and the other users are each currently participating in the same event. Also, the relationship regarding a predetermined event may be a relationship in which the user and the other users have each participated in the same event in the past. In addition, the relationship regarding a predetermined event may be a relationship in which the user and other viewing users among the other users have in the past participated in an event in which one or more viewing users among the user and other users are participating.

Also, the candidate change condition may be a condition regarding the character object of the user. For example, the candidate change condition is a condition that the date is N years after the date when the user generated the character object. "N" in this case is a natural number. For example, it may be determined that the candidate change condition is satisfied only on the day N years after the date the user generated the character object. For example, if "N" is 1 and the character object was generated on Jan. 1, 2020, it is determined that the candidate change condition has been satisfied on the one day of Jan. 1, 2021. Alternatively, the candidate change condition may be a condition regarding a predetermined period related to the date when the user generated the character object. For example, it may be determined that the candidate change condition is satisfied for a period of two days, beginning 10 days after the user generated the character object. For example, if the character object was generated on Jan. 1, 2020, it is determined that the candidate change condition was satisfied on the two days of Jan. 11 and 12, 2020.

Further, the candidate change condition may be a condition regarding a predetermined event in which the user participates. For example, the candidate change condition may be determined to be satisfied during a period in which the user participates in a specific event. For example, the specific event is an event in which a plurality of distributing users is classified into two or more event groups and each event group competes on the total score value according to the activities of the distributing users. In this case, the new character-related image when the candidate change condition is satisfied is an image related to the event group to which the user belongs. A character-related image related to an event group is an image including a background image in a color associated with the event group, an image including an item image in a color associated with the event group, or the like. In this way, the new character-related image when the user belongs to one event group out of a plurality of event groups is different from the new character-related image when the user belongs to another event group. When the condition regarding the predetermined event in which the user participates is the candidate change condition, when the predetermined event ends, the character-related image newly generated by the condition regarding the predetermined event in which the user participates being satisfied may be deleted.

In addition, the candidate change condition may be a condition regarding a consideration paid by the user. The consideration is a real or virtual monetary value, an object, game media, or the like that can be used in various services. For example, when the user pays a specific monetary value for each predetermined period, it may be determined that the candidate change condition is satisfied during the predetermined period corresponding to the paid monetary value. For example, when the user pays 1000 yen once every 10 days, a new character-related image is added only during the 10 days from the date of payment. The monetary value paid by the user may be a consideration for an information exchange service and/or a video distribution service, or a consideration for a service other than an information exchange service or a video distribution service.

Figure 13:
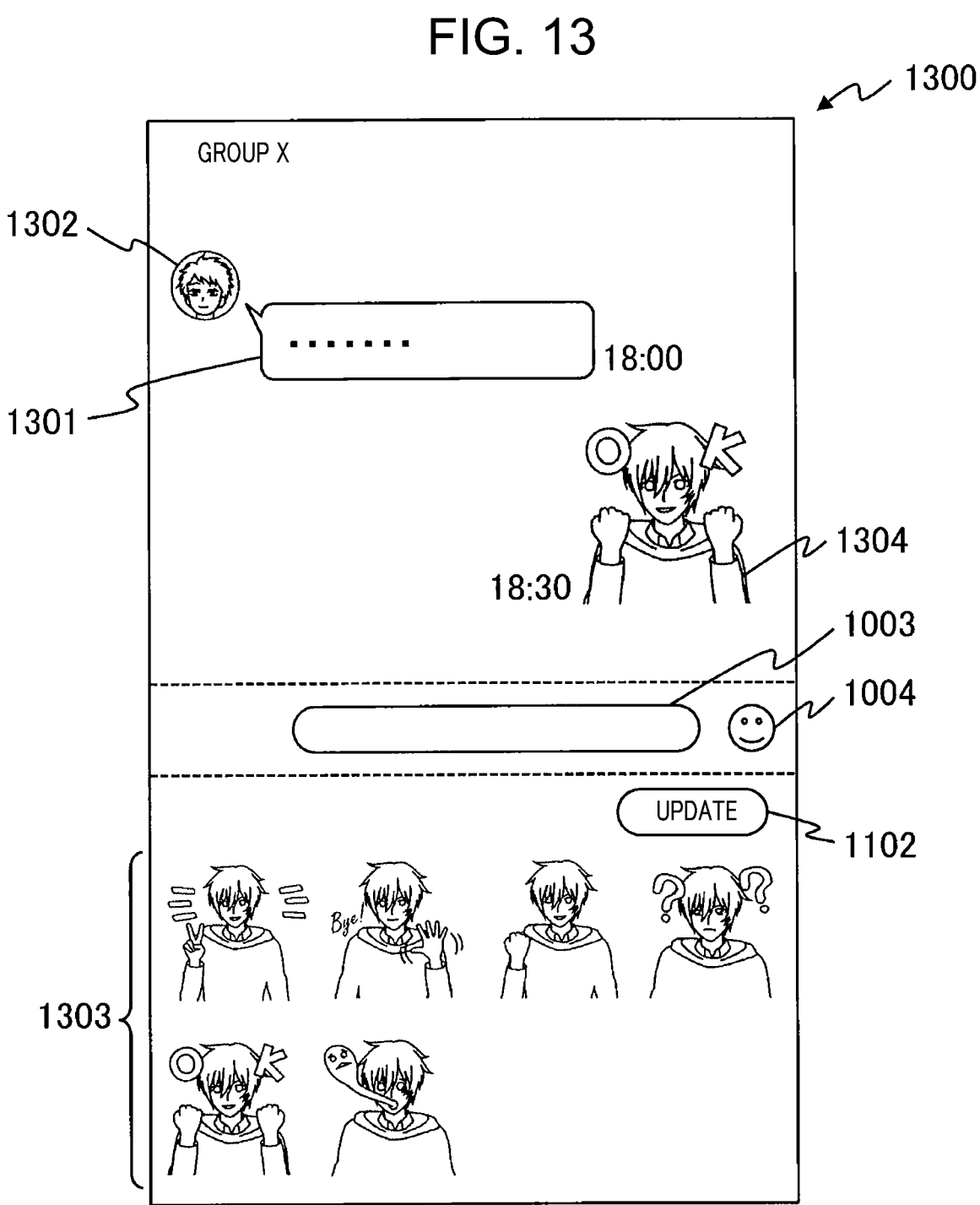
FIG. 13 is a diagram showing one example of various screens displayed on a terminal device.

FIG. 13 is a diagram showing one example of an information exchange screen 1300 displayed on the display device 23 of the terminal device 2 of the user. The information exchange screen 1300 is a screen displayed when candidate change condition is satisfied when the update button 1102 included in the information exchange screen 1100 is selected by the user. The information exchange screen 1300 may be displayed regardless of whether the update button 1102 is selected by the user as long as the candidate change condition is satisfied. For example, along with a generation process for a character-related image in accordance with selection of the generation instruction object 1006 by the user, determination of the candidate change condition may be executed and a generation process for a new character-related image may be executed. Further, when the candidate change condition is satisfied while the information exchange screen 1100 is being displayed, the candidate information 1101 may be automatically changed to candidate information 1303 including the candidate information corresponding to the new character-related image.

Similar to the information exchange screen 1100, the information exchange screen 1300 includes other user input information 1301, other user information 1302, the text input object 1003, the candidate display button 1004, user input information 1304, and the update button 1102. The candidate information 1303 of the information exchange screen 1300 includes the four types of candidate information 1101 of the information exchange screen 1100 and two types of candidate information corresponding to new character-related images. When the candidate information 1303 includes two types of candidate information corresponding to new character-related images, one or more types of the previously included four types of candidate information 1101 may be deleted from the candidate information 1303. For example, by deleting three or more types of candidate information, the options for candidate information are reduced, making it easier for the user to select information.

When one of the six types of candidate information 1303 is selected in accordance with operation of the input device 24 by the user, the input device 24 transmits the related image ID associated with the selected candidate information to the terminal processor 27. Next, the display processor 274 extracts from the terminal memory device 22 the character-related image identified by the related-image ID received from the input device 24, and displays the extracted character-related image as the user input information 1304 in the user display area of the information exchange screen 1300 (FIG. 13).

Along with the display of the user input information 1304 by the display processor 274, the transmitter 272 transmits the related image ID received from the input device 24 and the user ID stored in the terminal memory device 22 to the server device 3 via the terminal communication I/F 21. The server transmitter 332 of the server device 3 extracts from the server memory device 32 the user IDs of other users associated with the same information exchange group as the user ID received by the server receiver 331. Further, the server transmitter 332 transmits the related image ID and the user ID received by the server receiver 331 to the terminal devices 2 of the other users identified by the extracted user IDs, via the server communication I/F 31.

Then, the receiver 273 of the terminal device 2 of each of the other user receives the related image ID and the user ID transmitted from the server device 3 via the terminal communication I/F 21. Next, the display processor 274 of the terminal device 2 of each other user extracts the character-related image identified by the related image ID received by the receiver 273 from the terminal memory device 22, and displays the extracted character-related image in the other user display area of the distribution screen as other user input information. In this way, the same image as the character-related image used by the user is also displayed on the terminal devices 2 of other users associated with the information exchange group to which the user belongs. In addition, when the character-related image identified by the received related image ID is not stored in the terminal memory device 22, the display processor 274 of the terminal device 2 of the other user is such that the transmitter 272 of the terminal device 2 of the other user transmits an image transmission request to the server device 3. The image transmission request is transmitted together with the received related image ID and/or user ID, along with the user IDs of the other users. When the image transmission request is received by the server receiver 331, the server transmitter 332 of the server device 3 extracts, from the server memory device 32, the character-related image associated with the related image ID received together with the image transmission request. Next, the server transmitter 332 transmits the extracted character-related image to the terminal device 2 of the other user together with the received related image ID and user ID. The receiver 273 of the terminal device 2 of the other user receives the related image ID, the character-related image and the user ID transmitted from the server device 3 via the terminal communication I/F 21, and stores these in the terminal memory device 22 associated with each other. Then, the display processor 274 of the terminal device 2 of the other user displays the stored character-related image in the other user display area of the distribution screen as other user input information.

(Operation Sequence of the Information Processing System 1)

Figure 14:
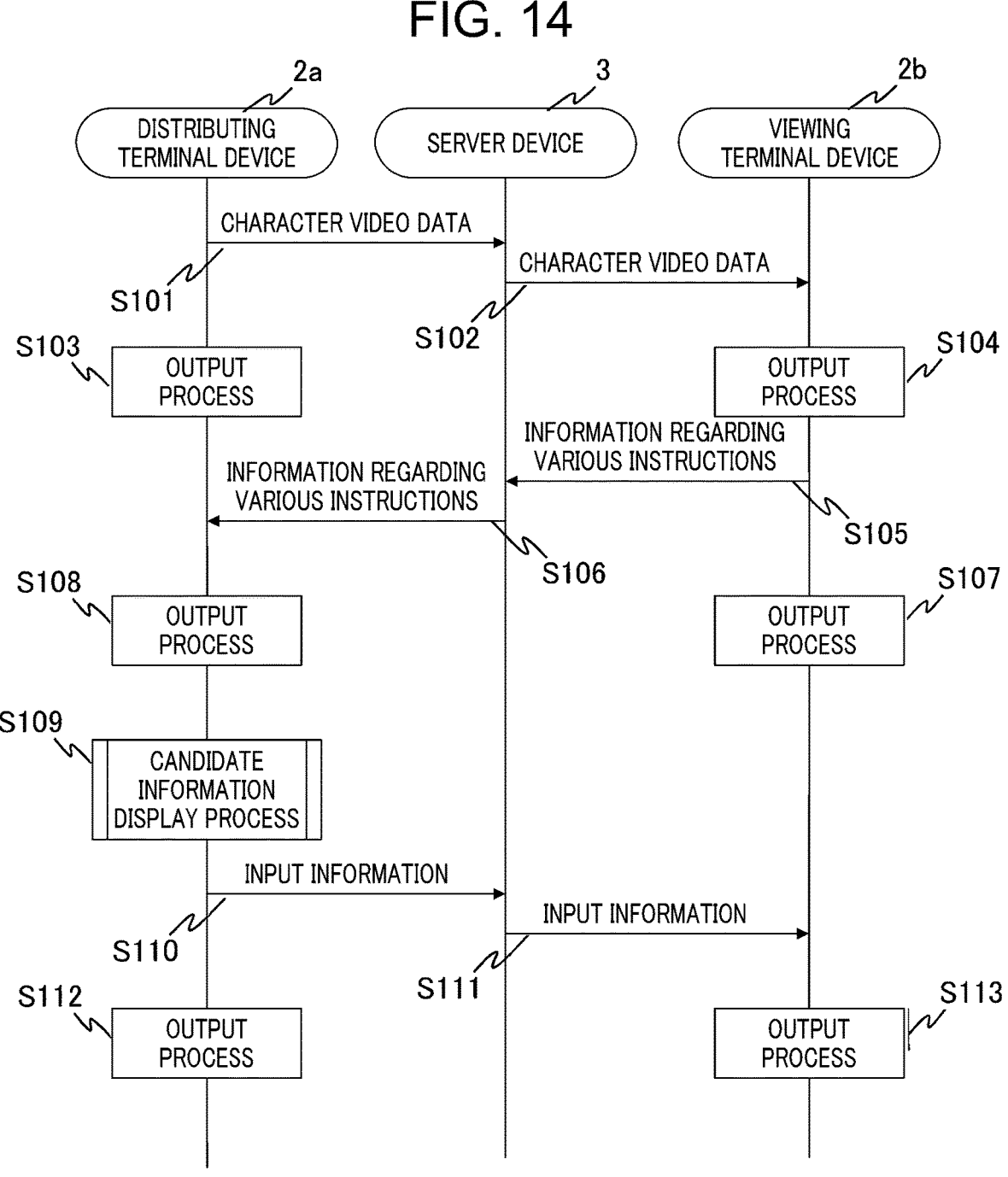
FIG. 14 is a diagram showing one example of an operation sequence of an information processing system.

FIG. 14 is a diagram showing one example of an operation sequence of the information processing system 1. This operation sequence is executed primarily by the terminal processor 27 and the server processor 33 in cooperation with each element of the terminal device 2 and the server device 3, based on control programs respectively stored in advance in the terminal memory device 22 and the server memory device 32. Hereinafter, of the two terminal devices 2, a distributing terminal device 2a is taken to be the terminal device 2 operated by the distributing user, and a viewing terminal device 2b is taken to be the terminal device 2 operated by the viewing user.

First, the transmitter 272 of the distributing terminal device 2a transmits the character video data generated by the generator 271 and the distributing user ID of the distributing user to the server device 3 via the terminal communication I/F 21 (step S101). The transmitter 272 may transmit audio data of the distributing user to the server device 3 together with the character video data. From the start to the end of the video distribution service, the process of step S101 is continuously executed at predetermined time intervals (for example, at intervals of 2 seconds). Then, the processes of steps S102 to S104 are intermittently executed in accordance with execution of the process of step S101.

The server transmitter 332 of the server device 3 distributes the received character video data to the viewing terminal device 2b via the server communication I/F 31 each time the server receiver 331 receives the character video data (step S102). The display processor 274 of the distributing terminal device 2a generates drawing data for displaying a distribution image based on the character video data generated by the generator 271, and displays a distribution screen on the display device 23 based on the generated drawing data (step S103). The display processor 274 of the viewing terminal device 2b generates drawing data for displaying a distribution image based on the character video data received by the receiver 273, and displays a distribution screen on the display device 23 based on the generated drawing data (step S104).

Next, the transmitter 272 of the viewing terminal device 2b transmits information regarding a display instruction for displaying response information on the distribution screen and/or information indicating an addition instruction for displaying an additional object on the distribution screen, which is input according to operation of the input device 24 by the viewing user, to the server device 3 via the terminal communication I/F 21 (step S105). The server transmitter 332 of the server device 3 transmits the received information regarding various instructions to the distributing terminal device 2a via the server communication I/F 31 each time information regarding various instructions (display instructions, additional instructions, and the like) is received by the server receiver 331 (step S106). The display processor 274 of the viewing terminal device 2b generates drawing data for displaying the response information and/or the additional object based on various instructions input in accordance with operation of the input device 24 by the viewing user, and displays the distribution screen on the display device 23 based on the generated drawing data (step S107). The display processor 274 of the distributing terminal device 2a generates drawing data for displaying the response information and/or the additional object based on the information regarding the various instructions received by the receiver 273, and displays the distribution screen on the display device 23 based on the generated drawing data (step S108).

Next, the display processor 274 of the distributing terminal device 2a executes a candidate information display process (step S109). Details of the candidate information display process will be described later. Note that the candidate information display process is not limited to a process that can be executed only by the distributing terminal device 2a. For example, a viewing terminal device 2b that can use a character object representing the user may execute the candidate information display process.

Next, the transmitter 272 of the distributing terminal device 2a transmits the input information input in accordance with operation of the input device 24 by the distributing user to the server device 3 via the terminal communication I/F 21 (step S110). Next, the server transmitter 332 of the server device 3 distributes the received input information to the viewing terminal device 2b via the server communication I/F 31 each time the server reception unit 331 receives the input information (step S111). The generator 271 of the distributing terminal device 2a generates drawing data for displaying the input information input in accordance with operation of the input device 24 by the distributing user, and the display processor 274 displays the information exchange screen on the display device 23 based on the generated drawing data (step S112). The generator 271 of the viewing terminal device 2b generates drawing data for displaying the input information received by the receiver 273, and the display processor 274 displays the information exchange screen on the display device 23 based on the generated drawing data (step S113).

Figure 15:
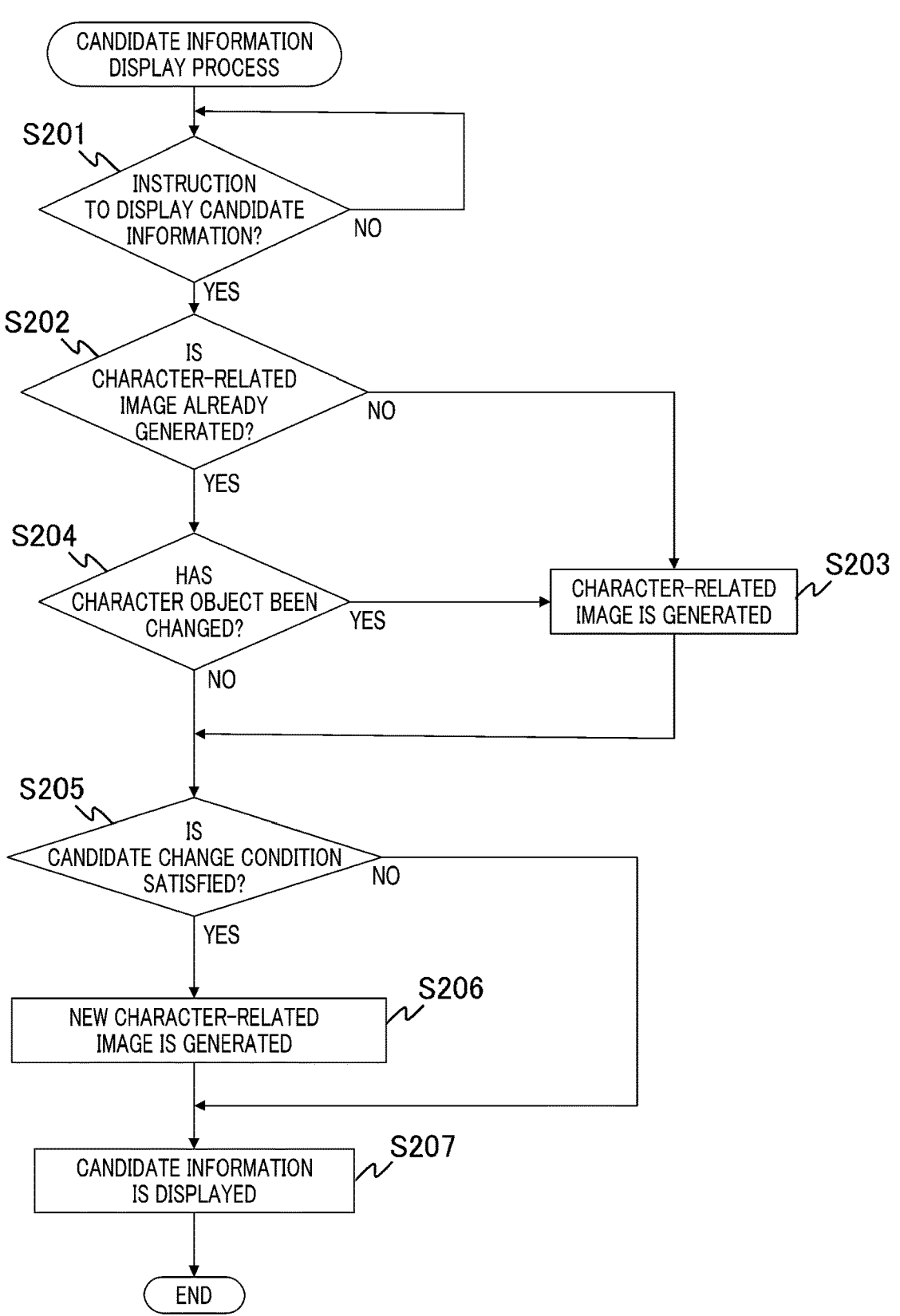
FIG. 15 is a diagram showing one example of an operation flow of a candidate information display process.

FIG. 15 is a diagram illustrating one example of an operation flow of a candidate information display process. The candidate information display process shown in FIG. 15 is executed in step S109 of FIG. 14.

First, the display processor 274 determines whether or not a candidate information display instruction has been acquired (step S201). If the candidate information display instruction has not been acquired (step S201—No), the process returns to step S201 (waits until the candidate information display instruction is acquired).

When a candidate information display instruction is acquired (step S201—Yes), the display processor 274 determines whether or not a character-related image has been generated in the past and stored in the terminal memory device 22 (step S202). If the character-related image is not stored (step S202—No), the generation unit 271 generates a character-related image (step S203), and the process advances to step S205.

When a character-related image has been generated in the past and stored in the terminal memory device 22 (step S202—Yes), the display processor 274 determines whether or not a used object of the character object of the user has been changed from the used object at the time of generation of the character-related image (step S204). If the used object of the character object of the user has been changed (step S204—Yes), the display processor 274 advances the process to step S203.

When the used object of the character object of the user has not been changed (step S204—No), or when the process of step S203 has ended, the display processor 274 determines whether or not the candidate change condition is satisfied (step S205). When it is determined that the candidate change condition is not satisfied (step S205—No), the display processor 274 advances the process to step S207.

When the display processor 274 determines that the candidate change condition is satisfied (step S205—Yes), the generator 271 generates a new character-related image (step S206). Next, the generation unit 271 generates candidate information corresponding to the character-related image, and the display processor 274 displays the generated candidate information (step S207), and ends the candidate information display process.

(Additional Features)

Figure 17:
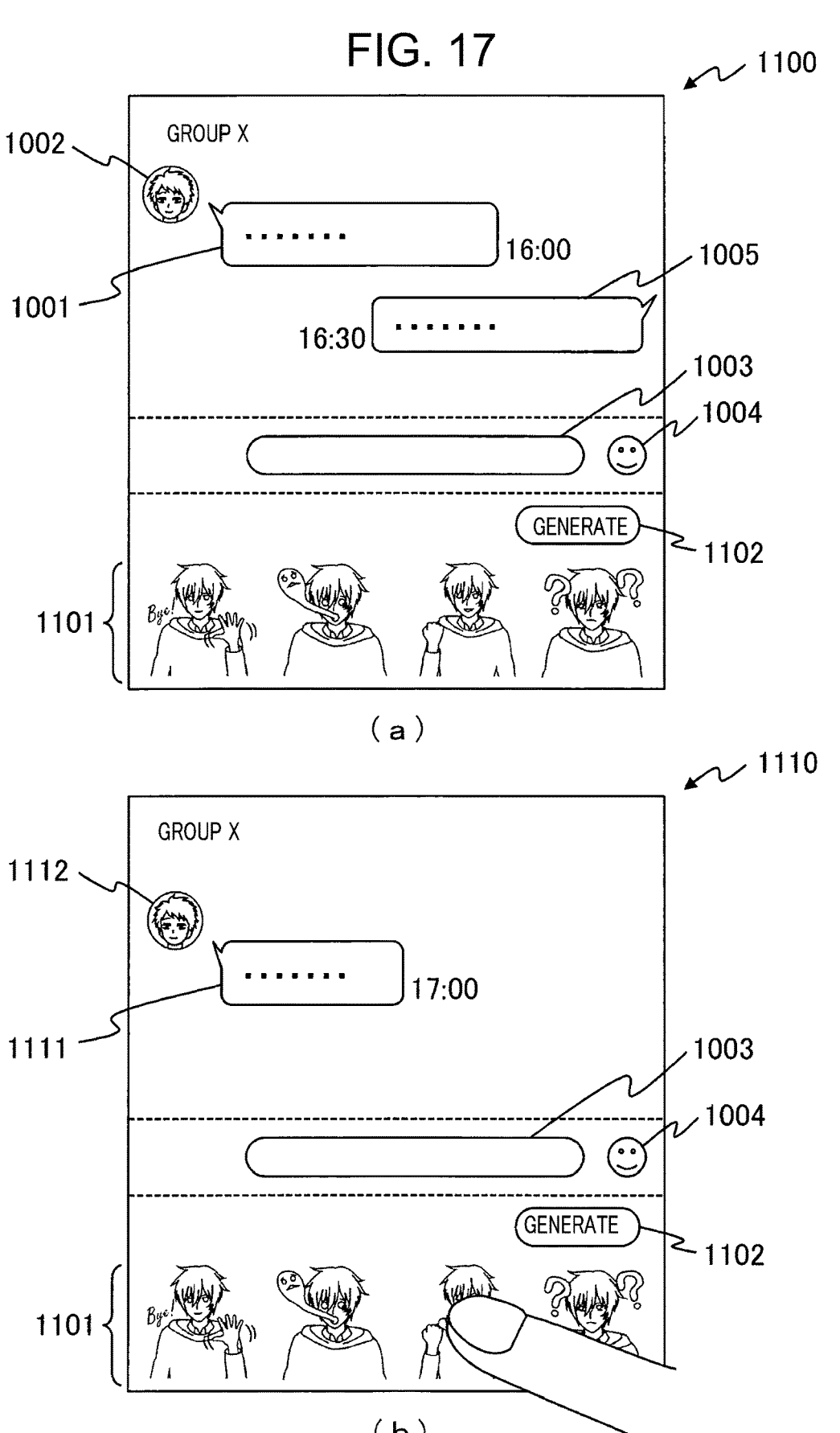
FIG. 17 is a diagram showing one example of various screens displayed on a terminal device.

The display processor 274 reads out the candidate information generated by the generator 271 from the terminal memory device 22 and displays such. Section (a) of FIG. 17 is a diagram showing one example of an information exchange screen 1100 displayed on the display device 23 of the terminal device 2 of the user. The information exchange screen 1100 is a screen that is displayed when the generation instruction object 1006 included in the information exchange screen 1010 is selected by the user.

Similar to the information exchange screen 1000, the information exchange screen 1100 includes the other user input information 1001, the other user information 1002, the text input object 1003, the candidate display button 1004, and the user input information 1005. Furthermore, the information exchange screen 1010 includes four types of generated candidate information 1101 and an additional generation button 1102. The types of candidate information 1101 included in the information exchange screen 1100 are not limited to four types, and may be three or fewer types or five or more types. The display processor 274 of the terminal device 2 may display the candidate information 1101 in a scrollable manner when a portion of the multiple types of the candidate information 1101 cannot be included in the display area of the information exchange screen 1100. In this case, the candidate information 1101 that is not currently included in the display area of the information exchange screen 1100 can be scrolled and displayed within the display area of the information exchange screen 1100 in response to a swipe operation by the user (for example, an operation in which the finger moves from right to left while in contact with the screen).

Figure 18:
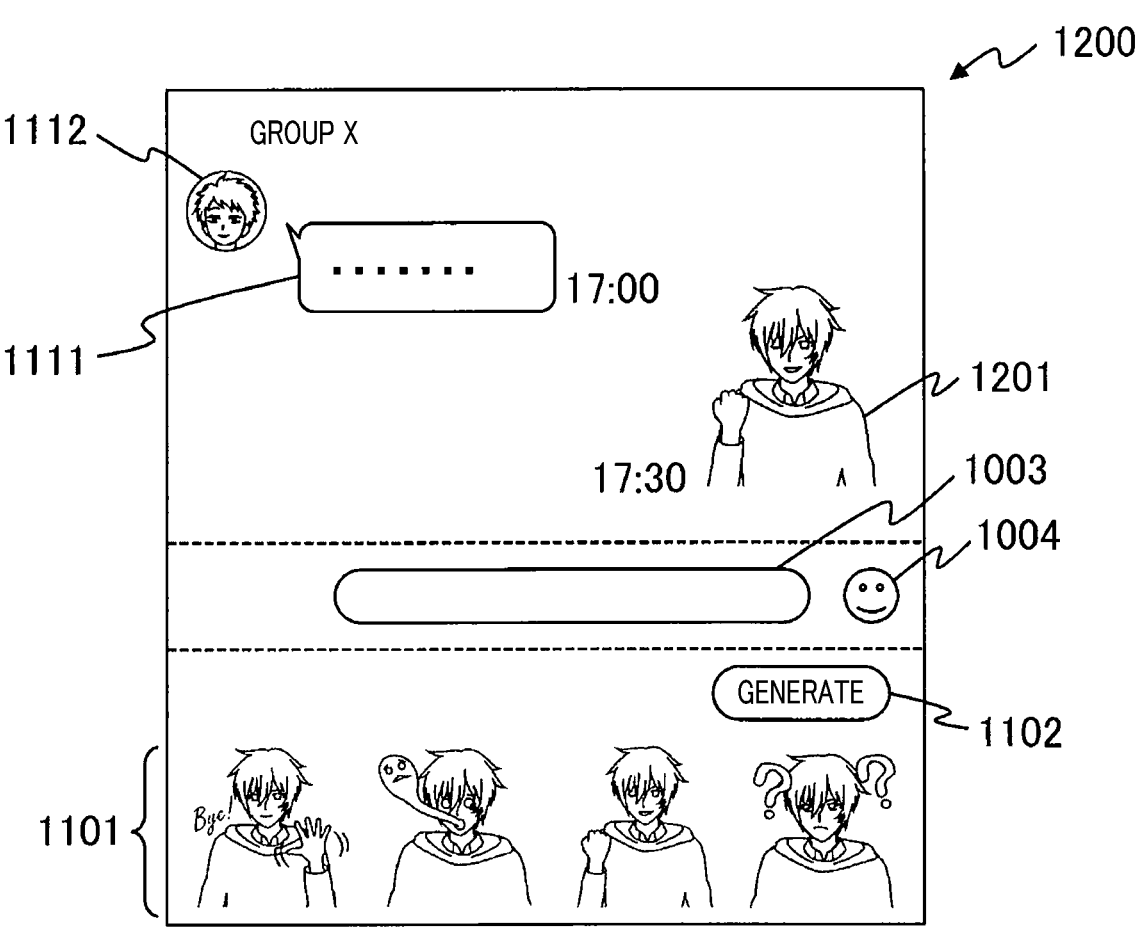
FIG. 18 is a diagram showing one example of a screen displayed on a terminal device.

When one of the four types of candidate information 1101 is selected in accordance with an operation of the input device 24 by the user (section (b) of FIG. 17), the input device 24 transmits the related image ID associated with the selected candidate information to the terminal processor 27. Next, the display processor 274 extracts from the terminal memory device 22 the character-related image identified by the related image ID received from the input device 24, and displays the extracted character-related image as the user input information 1201 in the user display area on the information exchange screen 1200 (FIG. 18). The character-related image displayed as user input information 1201 is a two-dimensional still image, or a three-dimensional still image in which a three-dimensional virtual space including a character object is drawn. When the character-related image displayed as the user input information 1201 is generated based on a plurality of items of continuous motion data, the character-related image may be a two-dimensional video that includes a character object that moves for a predetermined period of time (for example, 3 seconds). In this case, the character-related image may be a three-dimensional video image in which a three-dimensional virtual space including a character object that moves for a predetermined period of time (for example, 3 seconds) is drawn. As shown in FIG. 18, the display size of the character-related image displayed as the user input information 1201 on the display screen of the display device 23 is smaller than the display size of the distribution image 602 on the display screen of the display device 23. In this way, the drawing process load for drawing the character-related image on the display screen of the display device 23 is smaller than the drawing process load for drawing the distribution image 602 on the display screen of the display device 23. Furthermore, since character video data including motion data for displaying the distribution image 602 is continuously transmitted, the amount of transmission when transmitting the character video data is larger than the amount of data transmitted when transmitting the related image ID for displaying the character-related image. In this manner, by using the character-related data in various services, it becomes possible to display the character object of the user on the terminal device 2 of another user while reducing the processing load on the terminal device 2 and/or the server device 3, as well as the transmission load between the terminal device 2 and the server device 3, compared to the case where distribution images are used.

Returning to section (a) of FIG. 17, when the additional generation button 1102 is selected in response to an operation by the user on the input device 24, the display processor 274 and the generator 271 of the terminal device 2 of the user execute an additional generation process. The additional generation process is a process of generating a new character-related image based on reference information regarding a character object representing the user. The reference information is information acquired by a reference information acquisition process, and includes, for example, information indicating a displayed distribution image. The additional generation process is a process that includes, for example, generating a new character-related image that includes character objects representing other users who are exchanging information with the user, and/or character objects representing other users who have exchanged information with the user, using an information exchange service. The other users with whom the user is exchanging information include, for example, other users of terminal devices 2 displaying an information exchange screen for exchanging information related to the information exchange screen currently displayed on the terminal device 2 of the user. Alternatively, the other users exchanging information with the user may be other users of terminal devices 2 executing a control program for displaying an information exchange screen for exchanging information related to the information exchange screen currently displayed on the terminal device 2 of the user.

Figure 19:
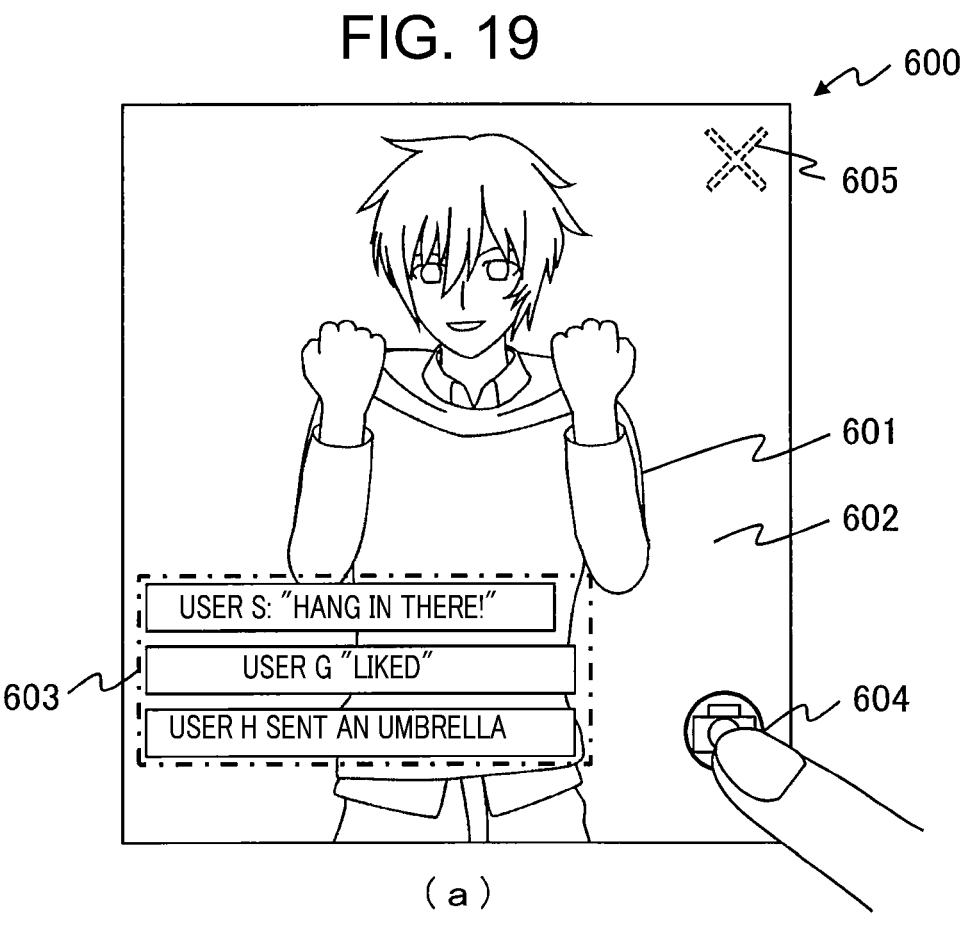
FIG. 19, section (a), is a diagram showing one example of a screen displayed on a terminal device, and FIG. 19, section (b), is a diagram showing one example of the data structure of a reference information table.

An example of the reference information acquisition process executed by the terminal device 2 of the distributing user will be described with reference to section (a) of FIG. 19. Hereinafter, the terminal device 2 of the distributing user may be referred to as a distributing terminal device 2a, and the terminal device 2 of a viewing user may be referred to as a viewing terminal device 2b. Section (a) of FIG. 19 is a diagram showing one example of a distribution screen 600 displayed on the display device 23 of the distributing terminal device 2a. The distribution screen 600 shown in section (a) of FIG. 19 has display elements similar to the distribution screen 600 shown in FIG. 7A.

As shown in section (a) of FIG. 19, when the acquisition button 604 is selected in response to operation of the input device 24 of the distributing terminal device 2a by the distributing user, the input device 24 inputs an instruction to acquire the reference information to the terminal processor 27.

The reference information includes image information about at least a portion of the distribution image 602. For example, the display processor 274 of the distributing terminal device 2a acquires image information of at least a portion of the distribution image 602 as reference information in response to an instruction to acquire reference information. The image information acquired as the reference information is image information corresponding to captured image information (screenshot) obtained by capturing the distribution screen 600 by the display processor 274 at the time of the reference information acquisition instruction, or to a partial image area of the screenshot. The image information acquired as the reference information may be a plurality of screenshots (or portions thereof) within an acquisition period (for example, a period from the time when the reference information acquisition instruction is acquired until 2 seconds later) acquired in chronological order by the display processor 274. The acquisition period may be a continuous period during which the acquisition button 604 is touched in response to operation of the input device 24 of the distributing terminal device 2a by the distributing user. For example, the input device 24 of the distributing terminal device 2a may output as the acquisition period the period from the time when the finger of the distributing user touches the acquisition button 604 to the time when the finger of the distributing user leaves the acquisition button 604. Hereinafter, image information acquired as reference information may be referred to as reference image information. Then, the display processor 274 stores the reference image information in the terminal memory device 22, and the reference information acquisition process ends. Image information about at least a portion of the distribution image 602 is an example of information indicating the distribution image.

The reference information may include motion data of the character object 601 of the distribution image 602. In the example shown in section (a) of FIG. 19, the display processor 274 may acquire motion data of the character object 601 of the distribution image 602 as the reference information in response to an instruction to acquire the reference information. For example, every time the generator 271 generates motion data, motion data from the current time to a predetermined prior time (for example, if the current time is 8:05:30, the motion data from 8:05:00 to 8:05:30) is temporarily stored in the terminal memory device 22. Then, the display processor 274 acquires, as the reference information, the motion data of the character object 601 of the distribution image 602 displayed at the time of the reference information acquisition instruction.

The display processor 274 may acquire the motion data of the character object 601 of the distribution image 602 displayed within an acquisition period from the time when the reference information acquisition instruction is acquired (for example, the period from 2 seconds ago) as the reference information. Hereinafter, the motion data acquired as reference information may be referred to as the reference motion data. Then, the display processor 274 stores the reference motion data in the terminal memory device 22, and the reference information acquisition process ends. The motion data of the character object 601 of the distribution image 602 is an example of information indicating the distribution image.

The reference information acquisition process related to the reference image information and the reference motion data is not limited to being executed in response to selection of the acquisition button 604 by the distributing user. For example, the reference information acquisition process related to the reference image information and the reference motion data may be automatically executed in response to an instruction from a viewing user. In this case, the distribution screen 610 displayed by the viewing terminal device 2b of the viewing user who is viewing the distribution image 612 of the distributing user includes an acquisition button (not shown). When the acquisition button is selected in accordance with operation of the input device 24 of the viewing terminal device 2b by the viewing user, the input device 24 inputs a reference information acquisition instruction to the terminal processor 27 together with acquisition date and time information indicating the date and time when the acquisition button was selected. Upon acquiring the reference information acquisition instruction and the acquisition date and time information, the transmitter 272 of the viewing terminal device 2b transmits the information indicating the reference information acquisition instruction and the acquisition date and time information to the server device 3 via the terminal communication I/F 21. The viewing user ID of the viewing user stored in the terminal memory device 22 may be transmitted together with the information indicating the reference information acquisition instruction and the acquisition date and time information. Next, the server receiver 331 of the server device 3 receives the information indicating the reference information acquisition instruction and the acquisition date and time information via the server communication I/F 31. The server transmitter 332 of the server device 3 transmits the received information indicating the reference information acquisition instruction and acquisition date and time information to the distributing terminal device 2a via the server communication I/F 31. The receiver 273 of the distributing terminal device 2a receives the information indicating the reference information acquisition instruction and the acquisition date and time information via the terminal communication I/F 21. The receiver 273 executes the reference information acquisition process related to the reference image information and the reference motion data at the date and time indicated by the acquisition date and time information, based on the information indicating the reference information acquisition instruction and the acquisition date and time information. Then, the receiver 273 acquires the reference image information and/or the reference motion data at the date and time indicated by the acquisition date and time information, and stores the reference image information and/or the reference motion data in the terminal memory device 22, and the reference information acquisition process ends.

Further, the reference information acquisition process related to the reference image information and the reference motion data may be automatically executed when a predetermined acquisition condition is met. The predetermined acquisition condition is a condition regarding response information included in the response information display area 603 within the distribution screen 600. For example, the display processor 274 of the distributing terminal device 2a acquires the reference image information and/or the reference motion data corresponding to a period with the largest number of items of response information.

Hereinafter, an example of the reference information acquisition process related to the reference image information and the reference motion data corresponding to a period with the largest number of items of response information will be described. First, the display processor 274 sets a plurality of periods for each predetermined unit time, and stores the number of items of response information displayed within each period in the terminal memory device 22. The predetermined unit time is, for example, 10 seconds. The predetermined unit time may be 5 seconds, 30 seconds, or the like. When the predetermined unit time is 10 seconds, as an example the number of items of response information is stored for each period of time, such as the period from 8:05:00 to 8:05:10, the period from 8:05:10 to 8:05:20, the period from 8:05:20 to 8:05:30, and so forth. Overlapping periods in each period (the period from 8:05:00 to 8:05:10, the period from 8:05:05 to 8:05:15, the period from 8:05:10 to 8:05:20, and so forth) may exist. The display processor 274 acquires the reference image information and/or the reference motion data at a specific date and time within each period up to the top place Ma with the largest number of items of response information displayed in the past Na days. Na days means 1 day, 2 days, 5 days, 10 days or the like. When Ma is "1," the reference image information and/or the reference motion data at a specific date and time within the one period with the largest number of items of displayed response information is acquired. When Ma is "5," five items of the reference image information and/or the reference motion data at specific dates and times within each period of the first to fifth places with the most items of displayed response information are acquired. The specific date and time within the period is the start date and time of the period, the end date and time of the period, or any date and time within the period. Then, the display processor 274 stores the acquired reference image information and/or reference motion data in the terminal memory device 22, and the reference information acquisition process ends.

The display processor 274 may store in the terminal memory device 22 the number of items of response information of a predetermined type among the items of response information displayed within each period. For example, the display processor 274 may store the number of items of comment information, or the display processor 274 may store the number of items of evaluation information. The display processor 274 may also store the total number of items of multiple types of response information.

The predetermined acquisition condition may be a condition regarding a viewing user who is viewing the distribution screen 610 or a viewing user who has viewed the distribution screen 610. For example, the display processor 274 of the distributing terminal device 2a acquires reference image information and/or reference motion data corresponding to a timing at which many viewing users are simultaneously viewing the distribution image of the distributing user.

Hereinafter, an example of the reference information acquisition process related to the reference image information and the reference motion data corresponding to a timing at which many viewing users are simultaneously viewing the distribution image of the distributing user will be described. First, the server transmitter 332 of the server device 3 counts the number of user IDs (viewing user IDs) of viewing users who are viewing the distribution image of the distributing user as the number of simultaneous viewings, at predetermined time intervals. Every time the number of simultaneous viewings is counted, the server transmitter 332 transmits simultaneous viewing number information indicating the number of simultaneous viewings to the distributing terminal device 2a via the server communication I/F 31. The display processor 274 refers to the simultaneous viewing number information received at the predetermined time intervals, and acquires the reference image information and/or reference motion data at the timing up to the top place Ma with the highest number of simultaneous viewings in the past Na days. Na days means 1 day, 2 days, 5 days, 10 days or the like. When Ma is "1," the reference image information and/or the reference motion data at the one time with the largest number of simultaneous viewings is acquired. When Ma is "5," five items of the reference image information and/or the reference motion data are acquired at each period of the first to fifth places with the highest number of simultaneous viewings. Then, the display processor 274 stores the acquired reference image information and/or reference motion data in the terminal memory device 22, and the reference information acquisition process ends.

The predetermined acquisition condition may be a condition regarding the additional objects displayed on the distribution screen 600. For example, the display processor 274 of the distributing terminal device 2a acquires the reference image information and/or the reference motion data corresponding to a period in which the number of displayed additional objects is the largest.

Hereinafter, an example of the reference information acquisition process related to the reference image information and the reference motion data corresponding to a period in which the number of displayed additional objects is the largest will be described. First, the display processor 274 sets a plurality of periods for each predetermined unit time (5 seconds, 10 seconds, 30 seconds, or the like), and stores the number of additional objects displayed in each period in the terminal memory device 22. Overlapping periods may exist in each period. The display processor 274 acquires the reference image information and/or the reference motion data at a specific date and time within each period up to the top place Ma having the largest number of additional objects displayed in the past Na days (Na days means 1 day, 2 days, 5 days, 10 days or the like). The specific date and time within the period is the start date and time of the period, the end date and time of the period, or any date and time within the period. Then, the display processor 274 stores the acquired reference image information and/or reference motion data in the terminal memory device 22, and the reference information acquisition process ends.

The display processor 274 may store in the terminal memory device 22 the number of additional objects of a predetermined type among the additional objects displayed within each period. For example, the display processor 274 may store the number of "bear" gift objects, or the display processor 274 may store the number of "accessories" gift objects. The display processor 274 may also store the total number of a plurality of types of additional objects. Furthermore, the display processor 274 of the distributing terminal device 2a may acquire the reference image information and/or the reference motion data corresponding to a period in which the total value of the displayed additional objects is the highest. In this case, the additional objects can be transmitted to the distributing terminal device 2a by the viewing user paying a consideration (such as a "coin" of virtual monetary value held by the viewing user). For example, the display processor 274 stores in the terminal memory device 22 the total amount of consideration for the displayed additional objects displayed within each period. The display processor 274 acquires the reference image information and/or the reference motion data at specific dates and times within each period up to the top place Ma with the highest total of displayed consideration among the past Na days (Na days means 1 day, 2 days, 5 days, 10 days, or the like). In addition, when the reference motion data is acquired, the object IDs of the additional objects displayed in the distribution image may be acquired at the acquisition timing. Then, by using the reference motion data and the object ID of the additional object, a character-related image can be generated that is the same as the distribution image at the acquisition timing. In the video distribution service in this embodiment, the higher the consideration, the more luxurious the appearance, the more difficult to obtain, and/or the more popular are the additional objects that are provided. This allows the distributing user to use character-related images that have a high total price for additional objects, have a luxurious appearance, are difficult to obtain, and/or are popular.

The reference information may include the response information included in the response information display area 603 within the distribution screen 600. For example, each time comment information is displayed in the response information display area 603, the display processor 274 stores the displayed comment information in the terminal memory device 22 as reference information. In this case, date and time information such as display date and time information or reception date and time information of the comment information may be stored in the terminal memory device 22 together with the comment information. Furthermore, each time evaluation information is displayed in the response information display area 603, the display processor 274 may store the displayed evaluation information in the terminal memory device 22 as reference information. In this case, date and time information such as display date and time information or reception date and time information of the evaluation information may be stored in the terminal memory device 22 together with the evaluation information.

The comment information stored as reference information is not limited to that included in the response information display area 603, and for example may be comment information input by a distributing user and/or a viewing user in a specific game that may be executed during a video distribution service. The specific game is, for example, a word game (quiz, association game, word-chain game, word collection game, riddle, answer matching game, or the like). The specific game is a network game in which distributing users who operate a plurality of terminal devices 2 each connected to a network can participate. The specific game may be a network game in which viewing users who operate a plurality of terminal devices 2 each connected to a network can participate. Further, the specific game may be a network game in which distributing users and viewing users who operate a plurality of terminal devices 2 each connected to a network can participate. The specific game is not limited to a word game, and may be a competitive game, a sports simulation game, a shooting game, or the like.

For example, comment information input into each terminal device 2 by a plurality of users (distributing users and/or viewing users) participating in a word game is transmitted to the server device 3. The server device 3 transmits the received comment information to the terminal devices 2 of the plurality of users participating in the word game. When the word game ends, the server device 3 may transmit the comment information received during the word game to the terminal devices 2 of the plurality of users who participated in the word game. The receiver 273 of each terminal device 2 stores the received comment information in the terminal memory device 22 as reference information every time comment information is received. In this case, the date and time information such as reception date and time information of the comment information may be stored in the terminal memory device 22 together with the comment information.

The comment information stored as reference information may be limited to information that satisfies a predetermined selection condition. The predetermined selection condition includes, for example, comment information that has received high evaluations from other users, comment information that is in the top place Mb in the number of high evaluations received from other users, or the like.

The reference information may include information regarding an additional object selected by the viewing user. For example, in response to an operation on the selection screen 700 of the viewing terminal device 2b by a viewing user who is viewing a distribution image 612 of a distributing user, the object ID of an additional object transmitted together with information indicating an addition instruction may be stored in the terminal memory device 22 as reference information. For example, each time the receiver 273 of the distributing terminal device 2a receives, via the server device 3, information indicating an addition instruction, the user ID of the viewing user, and the object ID transmitted from the viewing terminal device 2b, the received object ID is stored in the terminal memory device 22 as reference information. In this case, date and time information such as the display date and time information of the additional object or reception date and time information of the object ID of the additional object may be stored in the terminal memory device 22 together with the object ID of the additional object. In this way, information regarding the additional object displayed within the distribution screen 600 is stored in the terminal memory device 22 as reference information.

The object ID of the additional object stored as reference information may be the object ID of an additional object that is not displayed on the distribution screen 600. In this case, a selection screen (not shown) for selecting an additional object, similar to the selection screen 700, is displayed on the viewing terminal device 2b of the viewing user who is viewing the distribution image 612 of the distributing user. In the selection screen, when an additional object is selected in response to operation of the input device 24 of the viewing terminal device 2b by the viewing user, the input device 24 inputs the reference information acquisition instruction and the object ID of the selected additional object to the terminal processor 27. Upon acquiring the reference information acquisition instruction and the object ID of the additional object, the transmitter 272 of the viewing terminal device 2b transmits the information indicating the reference information acquisition instruction and the object ID of the additional object to the server 3 via the terminal communication I/F 21. The viewing user ID of the viewing user stored in the terminal memory device 22 may be transmitted together with the information indicating the reference information acquisition instruction and the object ID of the additional object. Next, the server receiver 331 of the server device 3 receives information indicating the reference infor-mation acquisition instruction and the object ID of the additional object via the server communication I/F 31. The server transmitter 332 of the server device 3 transmits the received information indicating the reference information acquisition instruction and the object ID of the additional object to the distributing terminal device 2a via the server communication I/F 31. The receiver 273 of the distributing terminal device 2a receives the information indicating the received reference information acquisition instruction and the object ID of the additional object via the terminal communication I/F 21. The receiver 273 executes the ref-erence information acquisition process to store the received object ID of the additional object in the terminal memory device 22 as reference information, based on the information indicating the reference information acquisition instruction and the object ID of the additional object. As the reference information, the object ID of the received additional object may be stored, as well as the date and time of receipt of the information indicating the reference information acquisition instruction.

The reference information may include information regarding owned objects stored in association with the distributing user. For example, the object ID of an owned object stored in association with the user ID of the distrib-uting user may be stored in the terminal memory device as reference information.

The reference information may include a profile image of the character object of the distributing user. For example, the profile image is a type of profile information, and includes an image of the character object of the distributing user. The profile image need not include an image of the character object of the distributing user, and for example, the profile image may include an image showing the distributing user. In addition to the profile image, the profile information may include the name of the distributing user, various informa-tion input by the distributing user (distribution category, distribution time slot, favorite additional objects, and the like). The distributing user profile information is stored in the terminal memory device 22 of the distributing terminal device 2a of the distributing user. Further, the server device may store the profile information transmitted from the distributing terminal device 2a in the server memory device 32. When the profile information is changed by the distrib-uting user operating the input device 24 of the distributing terminal device 2a, the reference information may also be automatically changed in accordance with the changed pro-file information. In this case, the user may change the reference information (profile image) by operating the input device 24 of the distributing terminal device 2a.

The reference information may include image informa-tion indicating the inside of the virtual space where the character object exists. For example, the character object of the distributing user can freely move within a world of a metaverse (Internet space) described later in accordance with the operation by the distributing user. In this case, image information indicating the inside of the world may be acquired as reference information in response to the opera-tion by the distributing user, or automatically.

The reference information may include image informa-tion indicating the inside of a game space in which the character object appears. For example, the character object of the distributing user can freely move within a two-dimensional or three-dimensional game space played by the distributing user according to the operation by the distrib-uting user. In this case, image information indicating the inside of the game space may be acquired as reference information in response to the operation by the distributing user, or automatically.

The reference information is not limited to the above-mentioned examples, and may include any information as long as such is information related to a distributing user or information related to a character object indicating a dis-tributing user.

(Reference Information Table T4)

Section (b) of FIG. 19 is an example of the data structure of the reference information table T4 that manages reference information. The reference information table T4 is provided individually for each user, and the reference information table T4 shown in section (b) of FIG. 19 is the reference information table T4 of a user who operates a terminal device 2 that stores the reference information table T4.

In the reference information table T4, a reference infor-mation ID, reference information, date and time informa-tion, and the like, are stored in association with each other. The reference information ID is an example of identification data for uniquely identifying each item of reference infor-mation. Every time the reference information acquisition process is executed, a new reference information ID is assigned to the acquired reference information, and the new reference information ID and the acquired reference infor-mation are stored in the reference information table T4 in association with each other. Further, the date and time information is date and time information acquired together with the reference information in the reference information acquisition process, and is stored in the reference informa-tion table T4 in association with the new reference infor-mation ID together with the acquired reference information. If date and time information is not acquired together with the reference information in the reference information acquisi-tion process, date and time information associated with the new reference information ID and the acquired reference information is not stored.

(Reference Information Selection Screen)

Figure 20:
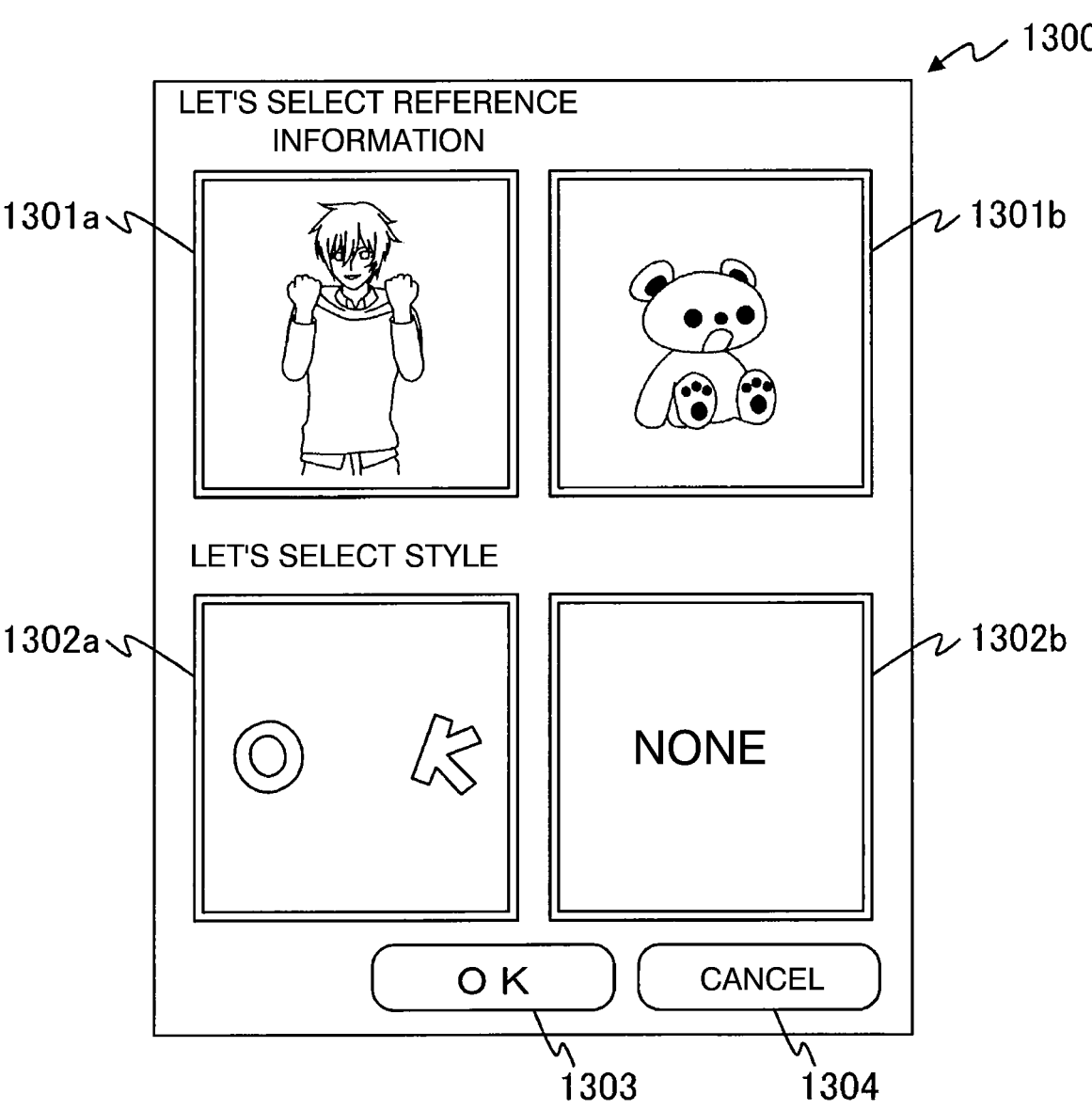
FIG. 20 is a diagram showing one example of a screen displayed on a terminal device.

FIG. 20 is a diagram showing one example of a reference information selection screen 1300 displayed on the display device 23 of the terminal device 2 of a user. The reference information selection screen 1300 is a screen that is dis-played when the additional generation process is started in response to user selection of the additional generation button 1102 included in the information exchange screen 1100. For example, the display processor 274 of the terminal device displays the reference information selection screen 1300 in response to the selection of the additional generation button 1102 by user operation of the input device 24. If no reference information is stored in the reference information table T4, the reference information selection screen 1300 is not dis-played.

The reference information selection screen 1300 includes candidate reference information 1301a and 1301b indicating reference information, object data 1302a and 1302b for character-related images, an additional generation instruc-tion button 1303, and an end button 1304.

The candidate reference information 1301a and 1301b indicating reference information is image information or text information indicating reference information stored in the reference information table T4, and each is displayed so as to be selectable by the user. The candidate reference infor-mation 1301a shown in FIG. 20 is an example of candidate reference information displayed when the reference infor-mation is reference image information or reference motion data. For example, when the reference information is refer-ence image information, the candidate reference information 1301*a* is reference image information. Further, when the reference information is reference image information, the candidate reference information 1301*a* may be an image generated based on the reference image information (for example, an image in which the number of pixels of the reference image information is reduced). When the reference information is reference motion data, the candidate reference information 1301*a* is an image indicating a character object generated based on the reference motion data and the model data of the character object. The candidate reference information 1301*b* shown in FIG. 20 is an example of an image displayed when the reference information is an additional object. For example, when the reference information is an additional object, the candidate reference information 1301*b* is an image showing the additional object. Further, when the reference information is comment information, the candidate reference information is image information or text information indicating the comment information.

The number of items of candidate reference information indicating reference information included in the reference information selection screen 1300 is not limited to two, and may be one, three or more. The display processor 274 of the terminal device 2 may display the candidate reference information in a scrollable manner when some of the plurality of candidate reference information cannot be included in the display area of the reference information selection screen 1300. In this case, candidate reference information that is not currently included in the display area of the reference information selection screen 1300 may be scrolled and displayed in the display area of the reference information selection screen 1300 in response to a swipe operation by the user.

The candidate reference information included in the reference information selection screen 1300 may be information indicating only a specific type of reference information. For example, the candidate reference information included in the reference information selection screen 1300 may be only image information indicating reference image information. Further, the candidate reference information included in the reference information selection screen 1300 may be only image information indicating reference motion data. Further, the candidate reference information included in the reference information selection screen 1300 may be only image information or text information indicating comment information. Further, the candidate reference information included in the reference information selection screen 1300 may be only image information or text information indicating a wearable object. The candidate reference information included in the reference information selection screen 1300 may be only image information or text information indicating a wearable object transmitted as an additional object. The candidate reference information included in the reference information selection screen 1300 may be only image information or text information indicating a gift object transmitted as an additional object. Further, the candidate reference information included in the reference information selection screen 1300 may be only image information or text information indicating an owned object. Further, the candidate reference information included in the reference information selection screen 1300 may be only image information indicating a profile image. Further, the candidate reference information included in the reference information selection screen 1300 may be only image information indicating the inside of the virtual space. In addition, the reference information selection screen 1300 may include two or more types of candidate reference information.

The candidate reference information included in the reference information selection screen 1300 may be part of the candidate reference information of a specific type of reference information. For example, the candidate reference information included in the reference information selection screen 1300 may be an image showing comment information extracted by a predetermined extraction method from the comment information stored as reference information in the reference information table T4.

In this case, the predetermined extraction method may be to extract identical comment information from the comment information stored as reference information, total up the number of pieces of comment information, and extract comment information up to the top place Mc with the highest total pieces of information. For example, if the Mc place is "2," and 5 pieces of comment information indicating "cool," 3 pieces of comment information indicating "cute," and 2 pieces of comment information indicating "hang in there," are stored in the reference information table T4, the two types of comment information indicating "cool" and "cute," are extracted. In addition, for the predetermined extraction method, a method of extracting comment information may also be used that is based on comment information stored as reference information that is associated with date and time information for a predetermined period regarding the time at which a specific additional object was displayed (such as 5 seconds before and after the time). For example, if the candidate reference information includes information indicating a specific additional object and comment information associated with date and time information for a predetermined period regarding the time at which the specific additional object was displayed, the user can select the specific additional object and comment information that matches that specific additional object. Through this, the information processing system 1 can provide a character-related image including a specific additional object and comment information desired by the user.

In addition, the candidate reference information included in the reference information selection screen 1300 may be an image indicating an additional object (wearable object) extracted by a predetermined extraction method from the additional objects (wearable objects) stored as reference information in the reference information table T4. In this case, the predetermined extraction method is a method to extract an additional object (wearable object) at a placement position whose display position does not overlap with object data for character-related images (object data indicating backgrounds, letters, and the like) used for a character-related image.

The candidate reference information 1301*a* and 1301*b* need not be displayed on the reference information selection screen 1300. If the candidate reference information 1301*a* and 1301*b* are not displayed on the reference information selection screen 1300, the reference information selected in accordance with a predetermined selection method is determined from the reference information stored in the reference information table T4, and a character-related image is generated that is based on the determined reference information. The predetermined selection method is a method of randomly selecting a predetermined number of items of reference information from the reference information, a method of selecting a predetermined number of items of reference information from the reference information in accordance with an order associated with each item of reference information in advance, or the like. The predetermined number is "1" or any natural number greater than or equal to "2." In addition, the reference information may be selected from a specific type of reference information stored in the reference information table T4 in accordance with the predetermined selection method. For example, a predetermined number of items of comment information may be selected from the comment information stored as reference information in accordance with the predetermined selection method. The predetermined selection method is a method of randomly selecting a predetermined number of items of comment information from the comment information stored as reference information. In addition, the predetermined selection method may be a method in which identical comment information is extracted from the comment information stored as reference information, the number of items of that comment information is totaled, and the comment information with the highest total number is selected. For example, if the reference information table T4 stores five items of the comment information "cool," three items of the comment information "cute," and two items of the comment information "hang in there," the comment information "cool" is selected (determined).

The object data 1302a and 1302b for character-related images are image information indicating object data for character-related images stored in the terminal memory device 22, and each is displayed so as to be selectable by the user. The object data for character-related images included in the reference information selection screen 1300 is not limited to two types, and may be one type or three or more types. When some of the object data for multiple types of character-related images cannot be included in the display area of the reference information selection screen 1300, the display processor 274 of the terminal device 2 may scroll and display the object data for character-related images. In this case, the object data for character-related images that is not currently included in the display are of the reference information selection screen 1300 may be scrolled and displayed in the display area of the reference information selection screen 1300 in response to a swipe operation by the user.

The object data 1302a and 1302b for character-related images need not be displayed in the reference information selection screen 1300. If the object data 1302a and 1302b for character-related images are not displayed in the reference information selection screen 1300, a character-related image is generated in which object data for a character-related image is not used. Alternatively, if the object data 1302a and 1302b for character-related images are not displayed, a character-related image using predetermined object data for a character-related image may be generated.

The additional generation instruction button 1303 is an example of an operation object for inputting an additional generation instruction to generate a new character-related image. For example, when the additional generation instruction button 1303 is selected in response to operation of the input device 24 by the user, the input device 24 inputs an additional generation instruction to the generator 271.

Upon receiving the additional generation instruction from the input device 24, the generator 271 determines reference information to be used in the process of generating a new character-related image. If either of the candidate reference information 1301a or 1301b has already been selected when the additional generation instruction button 1303 is selected, the generator 271 determines the reference information corresponding to the selected image. If neither candidate reference information 1301a nor 1301b has already been selected when the additional generation instruction button 1303 is selected, the generator 271 determines the selected reference information in accordance with a predetermined selection method from the reference information stored in the reference information table T4.

Next, the generator 271 executes a generation process to generate a new character-related image based on the determined reference information. An example of a generation process that generates a new character-related image when the determined reference information is reference image information will be described below.

When the determined reference information is reference image information, the generator 271 sets the reference information (reference image information) as the new character-related image, and stores a related image ID for uniquely identifying the new character-related image in the terminal memory device 22 in association with the new character-related image. Further, the generator 271 may cut out an image within a predetermined image area from the reference information (reference image information), and store the image as the new character-related image in the terminal memory device 22 in association with the related image ID for uniquely identifying the new character-related image. Then, the generator 271 generates candidate information indicating the generated new character-related image and stores the generated candidate information in the terminal memory device 22 in association with the related image ID for identifying the new character-related image, and then the generation process ends. Through this, the information processing system 1 can provide a new character-related image including a character object in the same pose (posture) as the character object in the distribution image at the reference information acquisition timing.

An example of a generation process for generating a new character-related image when the determined reference information is reference motion data will be described below. First, the generator 271 extracts the model ID of the character object associated with the user ID stored in the terminal memory device 22 and the object ID of the used object from the user table T1. Next, the generator 271 reads from the terminal memory device 22 the model data associated with the extracted model ID, and the image information and placement location associated with the extracted object ID of the used object. Next, the generator 271 reads the determined reference information (reference motion data) and the object data for the character-related image from the terminal memory device 22. Next, the generator 271 generates a new character-related image including a character object with a predetermined movement and facial expression and object data such as a background, letters and the like, based on the model data read, the image information and the placement location of the used object, and the object data for the reference information (reference motion data) and the character-related image. In addition, if either of the object data 1302a or 1302b for character-related images has already been selected when the additional generation instruction button 1303 is selected, the generator 271 generates a new character using the selected object data. Through this, the information processing system 1 can provide a new character-related image including a character object in the same pose (posture) as the character object in the distribution image at the reference information acquisition timing.

An example of the generation process for generating a new character-related image when the reference information is response information will be described. First, the generator 271 extracts the model ID of the character object associated with the user ID stored in the terminal memory device 22 and the object ID of the used object from the user table T1. Next, the generator 271 reads from the terminal memory device 22 the model data associated with the extracted model ID, and the image information and placement location associated with the extracted object ID of the used object. Next, the generator 271 reads the motion data for the character-related image and the object data for the character-related image from the terminal memory device 22. Next, the generator 271 generates a character object with a predetermined movement and facial expression, object data such as a background, letters and the like, and a new character-related image including the object data corresponding to the reference information, based on the model data, the image information and placement location of the used object, the motion data for the character-related image and the object data for the character-related image, and the reference information that have been read. In addition, if either of the object data 1302a or 1302b for character-related images has already been selected when the additional generation instruction button 1303 is selected, the generator 271 generates a new character-related image using the selected object data. Through this, the information processing system 1 can provide a character-related image using information regarding the character object within the distribution screen.

When the reference information is comment information, the object data corresponding to the reference information is an object on which the comment information is written (for example, a character plate object on which the text "cool" is displayed). In this case, the generated new character-related image includes an object on which comment information is written.

An example of the generation process for generating a new character-related image when the reference information is information regarding an additional object will be described. First, the generator 271 extracts the model ID of the character object associated with the user ID stored in the terminal memory device 22 and the object ID of the used object from the user table T1. Next, the generator 271 reads from the terminal memory device 22 the model data associated with the extracted model ID, and the image information and placement location associated with the extracted object ID of the used object. Next, the generator 271 reads the motion data for the character-related image and the object data for the character-related image from the terminal memory device 22. Next, the generator 271 generates a new character-related image including a character object with a predetermined movement and facial expression, object data such as a background, letters, and the like, and an additional object corresponding to the reference information, based on the model data that was read, the image information and placement location of the used object, the motion data for the character-related image and the object data for the character-related image, and the reference information. If either of the object data 1302a or 1302b for the character-related image has already been selected when the additional generation instruction button 1303 is selected, the generator 271 generates a new character using the selected object data.

When the reference information is information regarding a wearable object among the additional objects, the additional object corresponding to the reference information is a wearable object applied to the character object. For example, when the additional object corresponding to the reference information is the wearable object "headband," the generated new character-related image includes a character object wearing a headband. In this case, if the extracted used object (wearable object that has already been applied to the character object) is of the same type as the wearable object corresponding to the reference information, the wearable object corresponding to the reference information may be applied to the character object in place of the extracted used object. Through this, the information processing system 1 can provide a character-related image using information regarding the character object within the distribution screen.

When the reference information is information regarding a gift object among the additional objects, the additional object corresponding to the reference information is a gift object held by the character object. For example, if the additional object corresponding to the reference information is a gift object "bear," the generated new character-related image includes a character object holding a "bear." In this case, motion data for the character-related image may be applied to the character object such that the pose corresponds to the attributes of the character object and/or the type of gift object. Through this, the information processing system 1 can provide a character-related image using information from the viewing user regarding the character object within the distribution screen.

In this case, a plurality of types of motion data for character-related images may be stored in the terminal memory device 22, and any item of motion data may be automatically applied. For example, various types of motion data that differ for each parameter of a character object may be stored as the motion data for the character-related image. The parameters include gender (female, male, and so forth), size (height is at least a predetermined value, below a predetermined value, and so forth), personality (calm, lively, and so forth), age (at least 30 years old, under 30 years old, and so forth), and the like. For example, if the character object is female, motion data MF for a character-related image may be automatically applied, and if the character object is male, motion data MM for a character-related image may be automatically applied. If the height of the character object is at least a predetermined value, motion data MT for a character-related image may be automatically applied, and if the height of the character object is less than the predetermined value, motion data ML for a character-related image may be automatically applied. Additionally, if the additional object corresponding to the reference information is the gift object "bear," motion data MG for a character-related image may be automatically applied, and if the additional object corresponding to the reference information is the gift object "glow stick," motion data MP for a character-related image may be automatically applied. Furthermore, if the character object is female and the additional object corresponding to the reference information is the gift object "bear," motion data MF1 for a character-related image may be automatically applied, and if the character object is male and the additional object corresponding to the reference information is the gift object "bear," motion data MF2 for a character-related image may be automatically applied, and if the character object is female and the additional object corresponding to the reference information is the gift object "glow stick," motion data MP1 for a character-related image may be automatically applied, and if the character object is male and the additional object corresponding to the reference information is the gift object "glow stick," then motion data MP2 for a character-related image may be automatically applied.

In addition, when the reference information is information regarding a gift object among the additional objects, the motion data for a character-related image is not limited to being automatically applied to the character object. For example, motion data selected by the user from the motion data for multiple types of character-related images may be applied to the character object.

An example of a generation process for generating a new character-related image when the reference information is information regarding an owned object will be described. First, the generator 271 extracts the model ID of the character object associated with the user ID stored in the terminal memory device 22 and the object ID of the used object from the user table T1. Next, the generator 271 reads from the terminal memory device 22 the model data associated with the extracted model ID, and the image information and placement location associated with the extracted object ID of the used object. Next, the generator 271 reads motion data for character-related images and object data for character-related images from the terminal memory device 22. Next, the generator 271 generates a new character-related image that includes a character object with a predetermined movement and facial expression, object data such as a background, letters, and the like, and the owned object corresponding to the reference information, based on the model data, the image information and placement location of the object to be used, the motion data for the character-related image and the object data for the character-related image, and the reference information that were read. If either of the object data 1302a or 1302b for character-related images has already been selected when the additional generation instruction button 1303 is selected, the generator 271 generates a new character using the selected object data. Through this, the information processing system 1 can provide a character-related image using information regarding the user related to the character object.

In this case, the generated new character-related image includes a character object holding an owned object. In this case, as in the case where the reference information is information regarding a gift object among the additional objects, motion data for the character-related image so as to achieve attributes of the character object and/or a pose corresponding to the type of gift object may be applied to the character object.

If the determined reference information is a profile image, the generator 271 sets the profile image as the new character-related image. Further, when the determined reference information is image information indicating the inside of a virtual space, the generator 271 sets the image information indicating the inside of the virtual space as the new character-related image. Further, when the determined reference information is image information indicating the inside of a game space, the generator 271 sets the image information indicating the inside of the game space as the new character-related image. Through this, the information processing system 1 can provide a character-related image using various information related to a character object.

Then, the generator 271 associates the generated new character-related image with a related image ID for uniquely identifying the new character-related image and stores such in the terminal memory device 22. The generator 271 also generates candidate information indicating the generated new character-related image, associates the related image ID for identifying the new character-related image with the generated candidate information, and stores such in the terminal memory device 22, and the new character-related image generation process ends.

If an additional object (wearable object) stored as reference information in the reference information table T4 is a specific wearable object, the generator 271 may automatically apply the specific wearable object in the generation process of all character-related images. The automatic application process for the specific wearable object may be executed only within an application period from the time when the specific wearable object is stored as reference information. The automatic application process for the specific wearable object may be one that is executed only when the number of times of using a character-related image generated by applying the specific wearable object is no greater than a predetermined upper limit number of times. For example, if a distributing user uses a character-related image generated by applying the specific wearable object 10 times (an example of the upper limit number of times), from then on the process of automatically applying the specific wearable object will not be executed and the generator 271 will execute a generation process that does not automatically apply the specific wearable object to all character-related images.

When a specific wearable object is stored as reference information, the generation process of applying the specific wearable object to an already generated character-related image may be automatically re-executed. Further, the character-related image to which the specific wearable object is applied may be usable in the information exchange service only for a predetermined period of use. For example, after the predetermined period of use has elapsed, a generation process that does not apply the specific wearable object to already generated character-related images may be automatically re-executed. Alternatively, when the predetermined period of use has elapsed, the candidate information for a character-related image to which a specific wearable object has been applied may be deleted from candidate information 1403, which will be described later, and through this, the character-related image to which the specific wearable object has been applied may be rendered unusable.

If an additional object (wearable object) stored as reference information is a specific wearable object, the generator 271 need not automatically apply the specific wearable object in the generation process of some character-related images. For example, the specific wearable object need not be applied to a character-related image if the display position of the specific wearable object overlaps with the display position of object data for a character-related image (object data indicating background, text, and the like) used for the character-related image. In addition, the specific wearable object need not be applied to a character-related image if, as a result of the specific wearable object being applied, the display position of the specific wearable object overlaps with the display position of another wearable object that has already been worn.

The end button 1304 is an operation object for ending the display of the reference information selection screen 1300. When the end button 1304 is selected by a user operation on the input device 24, the display processor 274 of the terminal device 2 ends the display of the reference information selection screen 1300.

Figure 21:
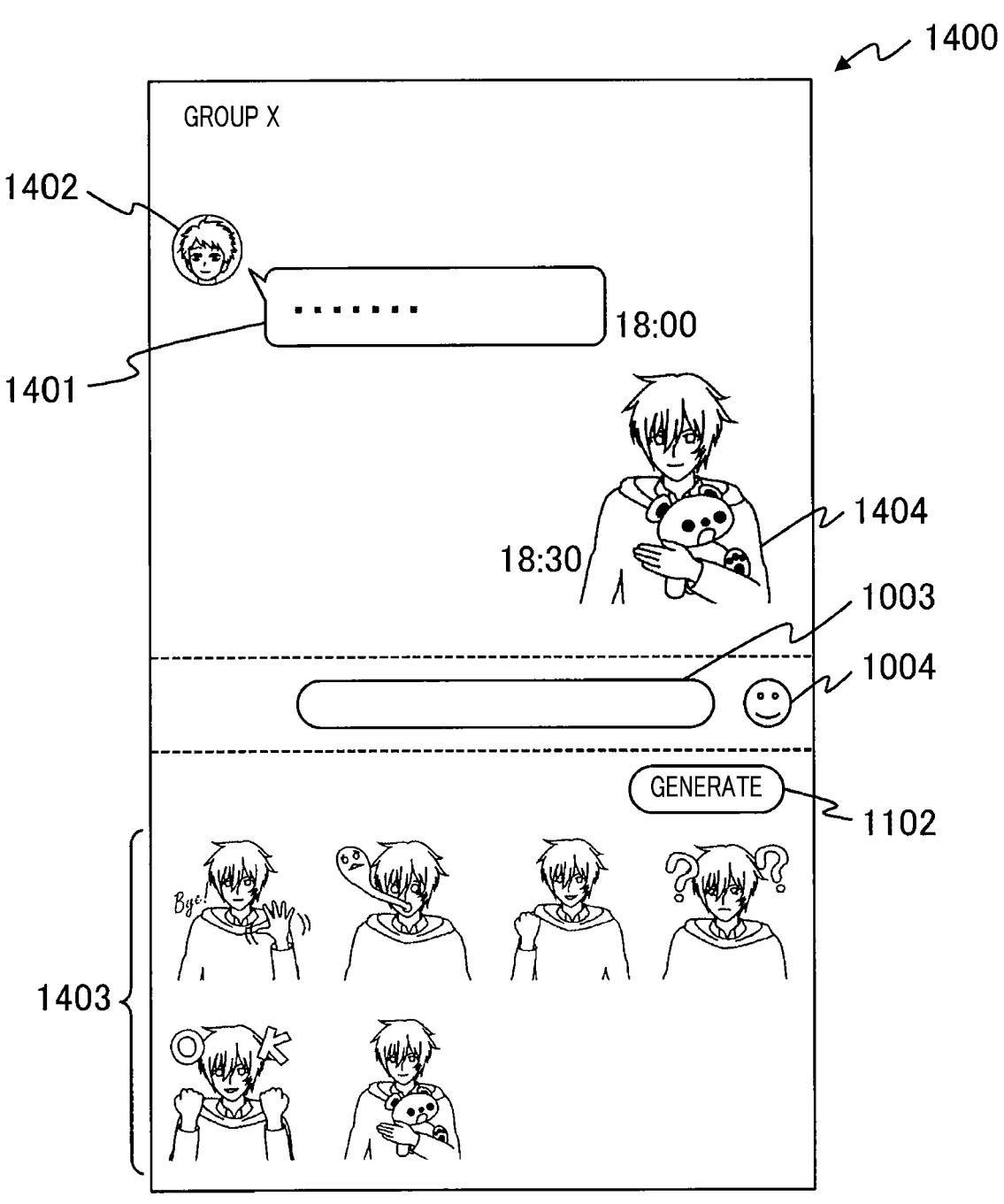
FIG. 21 is a diagram showing one example of a screen displayed on a terminal device.

FIG. 21 is a diagram showing one example of an information exchange screen 1400 displayed on the display device 23 of the terminal device 2 of a user. The information exchange screen 1400 is displayed when a new character-related image is generated by the additional generation process.

Similar to the information exchange screen 1100, the information exchange screen 1400 includes other user input information 1401, other user information 1402, the text input object 1003, the candidate display button 1004, user input information 1404, and the additional generation button 1102. The candidate information 1403 on the information exchange screen 1400 includes four types of candidate information 1101 on the information exchange screen 1100 and two types of candidate information corresponding to new character-related images. In addition, when the candidate information 1403 includes candidate information corresponding to two types of new character-related images, one or more types of candidate information among the four types of candidate information 1101 that were previously included may be deleted from the candidate information 1403. For example, by deleting three or more types of candidate information, the number of candidate information options is reduced, making it easier for the user to select information.

When one of the six types of candidate information 1403 is selected in accordance with operation of the input device 24 by the user, the input device 24 transmits the related image ID associated with the selected candidate information to the terminal processor 27. Next, the display processor 274 extracts from the terminal memory device 22 the character-related image identified by the related-image ID received from the input device 24, and displays the extracted character-related image as the user input information 1404 in the user display area of the information exchange screen 1400 (FIG. 21).

Along with the display of the user input information 1404 by the display processor 274, the transmitter 272 transmits the related image ID received from the input device 24 and the user ID stored in the terminal memory device 22 to the server device 3 via the terminal communication I/F 21. The server transmitter 332 of the server device 3 extracts from the server memory device 32 the user IDs of other users associated with the same information exchange group as the user ID received by the server receiver 331. Further, the server transmitter 332 transmits the related image ID and the users ID received by the server receiver 331 to the terminal devices 2 of the other users identified by the extracted user IDs, via the server communication I/F 31.

(Operation Sequence of the Information Processing System 1)

Figure 22:
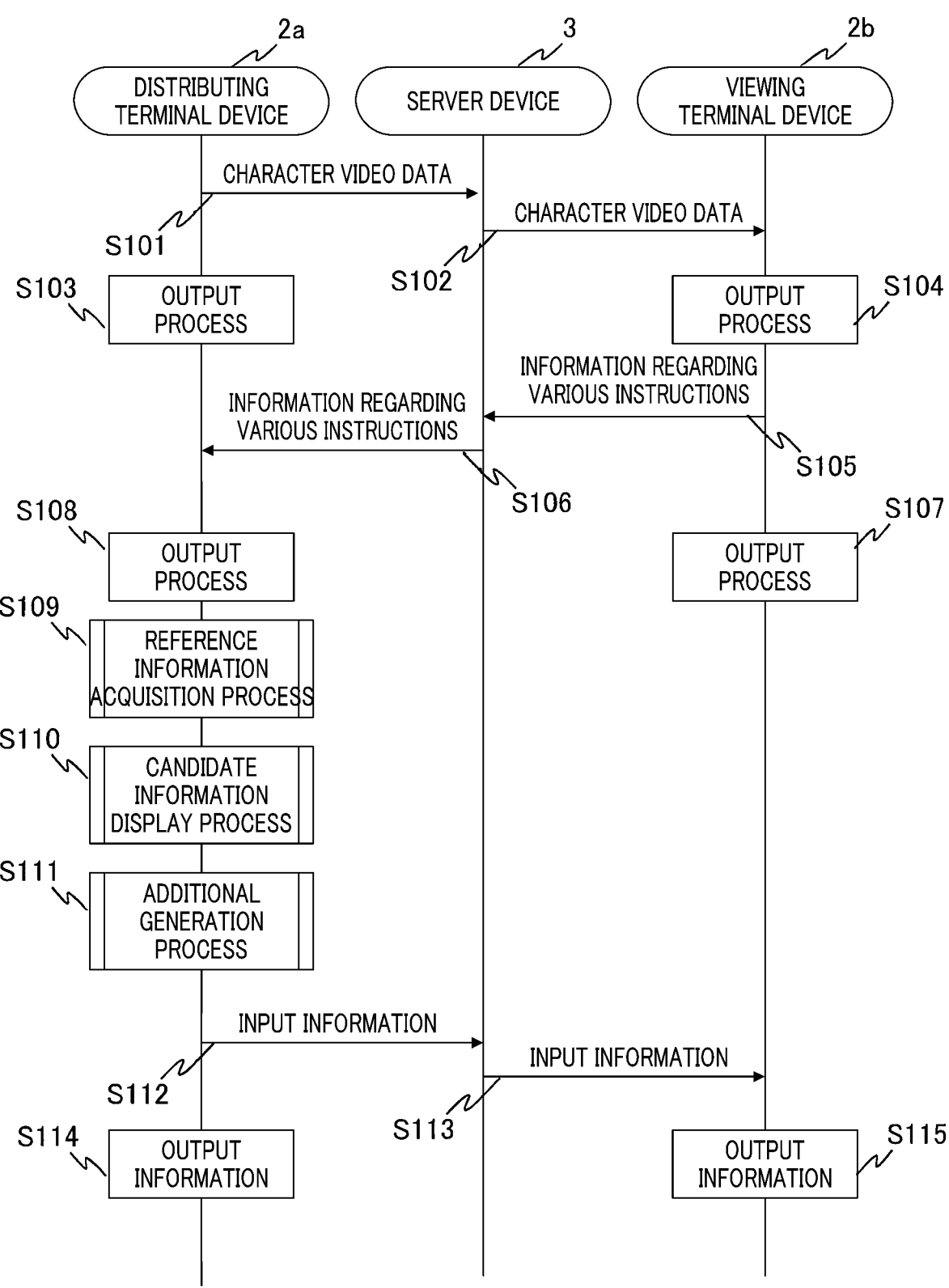
FIG. 22 is a diagram showing one example of an operation sequence of an information processing system.

FIG. 22 is a diagram showing one example of an operation sequence of the information processing system 1. This operation sequence is executed primarily by the terminal processor 27 and the server processor 33 in cooperation with each element of the terminal device 2 and the server device 3, based on control programs respectively stored in advance in the terminal memory device 22 and the server memory device 32. Hereinafter, of the two terminal devices 2, a distributing terminal device 2a is taken to be the terminal device 2 operated by the distributing user, and a viewing terminal device 2b is taken to be the terminal device 2 operated by the viewing user.

Next, the display processor 274 of the distributing terminal device 2a executes a reference information acquisition process (step S109). Details of the reference information acquisition process will be described later. The reference information acquisition process may be executed by the receiver 273 of the distributing terminal device 2a when acquiring the reference information transmitted from the viewing terminal device 2b. The reference information acquisition process is not limited to a process that can be executed only by the distributing terminal device 2a. For example, the display processor unit 274 or the receiver 273 of the viewing terminal device 2b, which can use a character object representing the user, may execute the candidate information display process.

Next, the display processor 274 of the distributing terminal device 2a executes a candidate information display process (step S110). Details of the candidate information display process will be described later. The candidate information display process is not limited to a process that can be executed only by the distributing terminal device 2a. For example, the display processor 274 of the viewing terminal device 2b, which can use a character object representing the user, may execute the candidate information display process.

Next, the generator 271 and the display processor 274 of the distributing terminal device 2a execute the additional generation process (step S111). Details of the additional generation process will be described later. The additional generation process is not limited to a process that can be executed only by the distributing terminal device 2a. For example, the generator 271 and the display processor 274 of the viewing terminal device 2b, which can use a character object representing the user, may execute the candidate information display process.

Next, the transmitter 272 of the distributing terminal device 2a transmits input information input in accordance with operation of the input device 24 by the distributing user to the server device 3 via the terminal communication I/F 21 (step S110). Next, the server transmitter 332 of the server device 3 distributes the received input information to the viewing terminal device 2b via the server communication I/F 31 each time the server reception unit 331 receives the input information (step S113). The display processor 274 of the distributing terminal device 2a generates drawing data for displaying the input information input in accordance with operation of the input device 24 by the distributing user, and displays the information exchange screen on the display device 23 based on the generated drawing data (step S114). The display processor 274 of the viewing terminal device 2b generates drawing data for displaying the input information received by the receiver 273, and displays the information exchange screen on the display device 23 based on the generated drawing data (step S115).

Section (a) of FIG. 23 is a diagram illustrating one example of an operation flow of the reference information acquisition process. The candidate information display process shown in section (a) of FIG. 23 is executed in step S109 of FIG. 22.

First, the display processor 274 or the receiver 273 determines whether a reference information acquisition instruction has been acquired (step S201). If the reference information acquisition instruction has not been acquired (step S201—No), the display processor 274 or the receiver 273 ends the reference information acquisition process. When the reference information acquisition instruction has been acquired (step S201—Yes), the display processor 274 or the receiver 273 acquires the reference information (step S202), stores the acquired reference information in the terminal memory device 22 (step S203), and ends the reference information acquisition process.

Section (b) of FIG. 23 is a diagram illustrating one example of an operation flow of a candidate information display process. The candidate information display process shown in Section (b) of FIG. 23 is executed in step S110 of FIG. 22.

First, the display processor 274 determines whether or not a candidate information display instruction has been acquired (step S301). If the candidate information display instruction has not been acquired (step S301—No), the process returns to step S301 (waits until the candidate information display instruction is acquired).

When a candidate information display instruction is acquired (step S301—Yes), the display processor 274 determines whether or not a character-related image has been generated in the past and stored in the terminal memory device 22 (step S302). If a character-related image is not stored (step S302—No), the generator 271 generates a character-related image (step S303), and the process advances to step S304.

If the display processor 274 has generated a character-related image in the past and stored such in the terminal memory device 22 (step S302—Yes), the generator 271 generates candidate information associated with the character-related image, and the display processor 274 displays the generated candidate information (step S304) and ends the candidate information display process.

Figure 24:
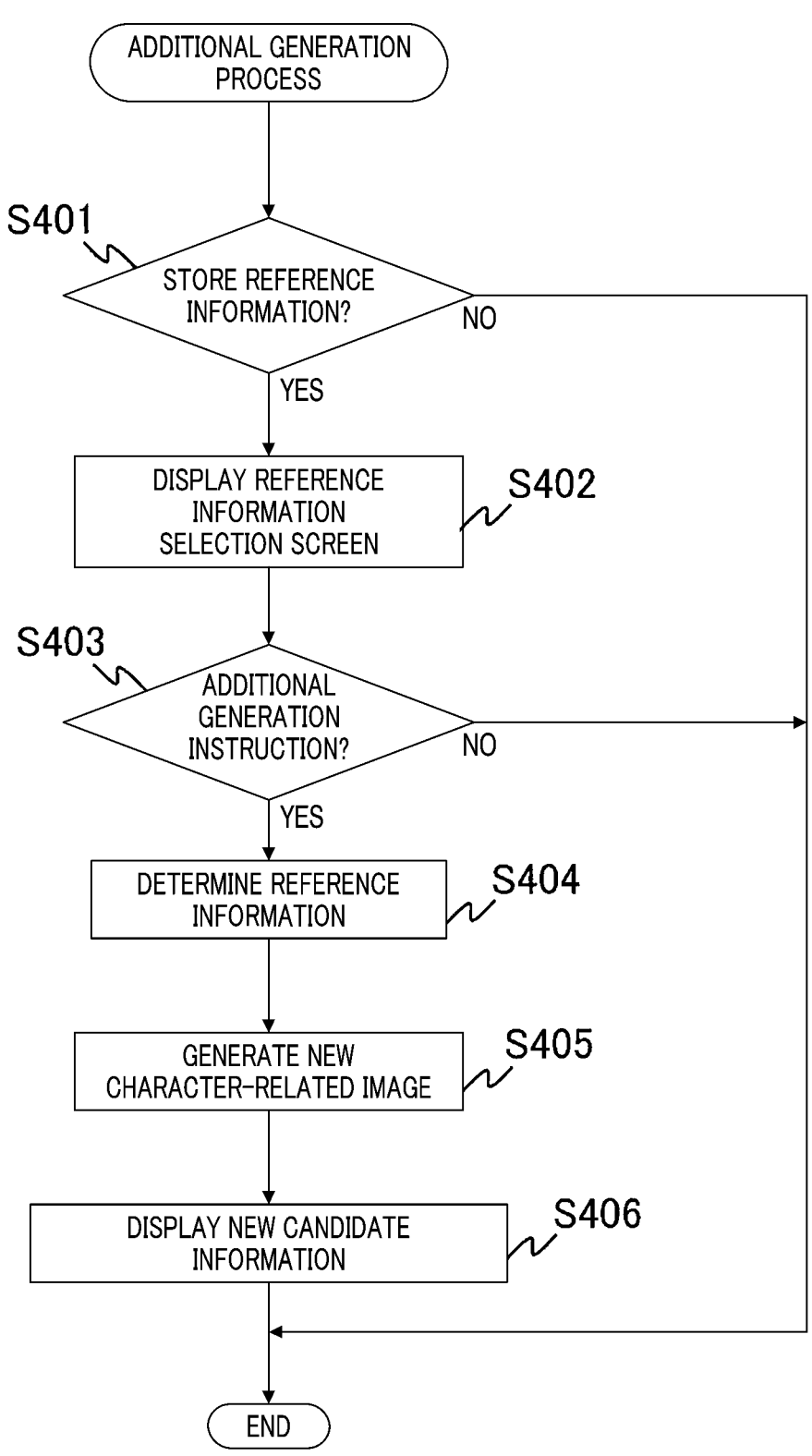
FIG. 24 is a diagram showing one example of an operation flow of an additional generation process.

FIG. 24 is a diagram showing one example of an operation flow of an additional generation process. The additional generation process shown in FIG. 24 is executed in step S111 of FIG. 22.

First, the display processor 274 determines whether reference information is stored in the reference information table T4 (step S401). If reference information is not stored (step S401—No), the display processor 274 ends the additional generation process. If the reference information is stored (step S401—Yes), the display processor 274 displays a reference information selection screen 1300 (step S402).

Next, the display processor 274 determines whether an additional generation instruction has been input via the input device 24 (step S403). If an additional generation instruction has not been input (step S403—No), the display processor 274 ends the additional generation process. If an additional generation instruction has been input (step S403—Yes), the generator 271 determines the reference information (step S404).

Next, the generator 271 generates a new character-related image based on the reference information determined (step S405). Then, the display processor 274 displays the generated new character-related image (step S406), and the additional generation process ends.

As described in detail above, in the information processing system 1 of the present embodiment, it is possible to increase the types of character-related images that can be used, based on information regarding the distributing user or information regarding a character object representing the distributing user. In this way, the information processing system 1 of the present embodiment can improve the user interface for determining information to be provided to other users without requiring the user to perform complicated operations. Further, in the information processing system 1 of the present embodiment, the types of character-related images can be changed based on the information regarding the distributing user or the information regarding the character object representing the distributing user. In this way, the information processing system 1 of the present embodiment enables the user to change the information provided to other users without requiring the user to perform complicated operations, thereby preventing the user from getting bored with the selection.

FIG. 25 shows one example of information exchange screens 1500 and 1510 including stamp images generated as character-related images. The information exchange screens 1500 and 1510 include type selection buttons 1501 for selecting the type of stamp image. When the candidate information corresponding to one of the type selection buttons 1501 is selected in response to operation of the input device 24 by the user, the stamp image of the type corresponding to the selected type selection button 1501 is displayed in a display area below the type selection buttons 1501. In FIG. 25, a button is illustrated as the widget for selecting the type of stamp image, but the widget for selecting the type of stamp image may be a tab. In this manner, on the information exchange screens 1500 and 1510, each of a plurality of stamp images is switched and displayed for each type.

Section (a) of FIG. 25 is a diagram showing one example of an information exchange screen 1500 when the type selection button 1501 corresponding to a stamp image generated as a character-related image is selected. The information exchange screen 1500 displays candidate information 1101 corresponding to the stamp image generated as a character-related image. When the type selection button 1501 corresponding to the stamp image for conveying "OK" is selected, the information exchange screen 1500 displays candidate information corresponding to the stamp image for conveying "OK."

Section (b) of FIG. 25 is a diagram showing one example of an information exchange screen 1510 when the type selection button 1501 corresponding to a stamp image generated as a new character-related image is selected. On the information exchange screen 1510, a type selection button 1501 corresponding to a stamp image generated as a new character-related image is selected, and in accordance with this selection, candidate information 1511 corresponding to the stamp image generated as a new character-related image is displayed. In the example shown in section (b) of FIG. 25, the type selection button 1501 corresponding to the stamp image generated as the new character-related image is a button object labeled "Add."

In this way, the information exchange screen is configured so that the stamp images are classified according to type and displayed, thereby making it possible to improve the user interface. With such an information exchange screen, even if the size of the display screen of the terminal device 2 is limited, it is possible to improve the listability of a plurality of stamp images. Moreover, the information exchange screens 1500 and 1510 enable the user to intuitively and/or easily find the stamp image that the user desires to use. Moreover, the information exchange screens 1500 and 1510 enable the user to grasp at a glance whether or not there is a stamp image generated as a new character-related image.

Figure 26:
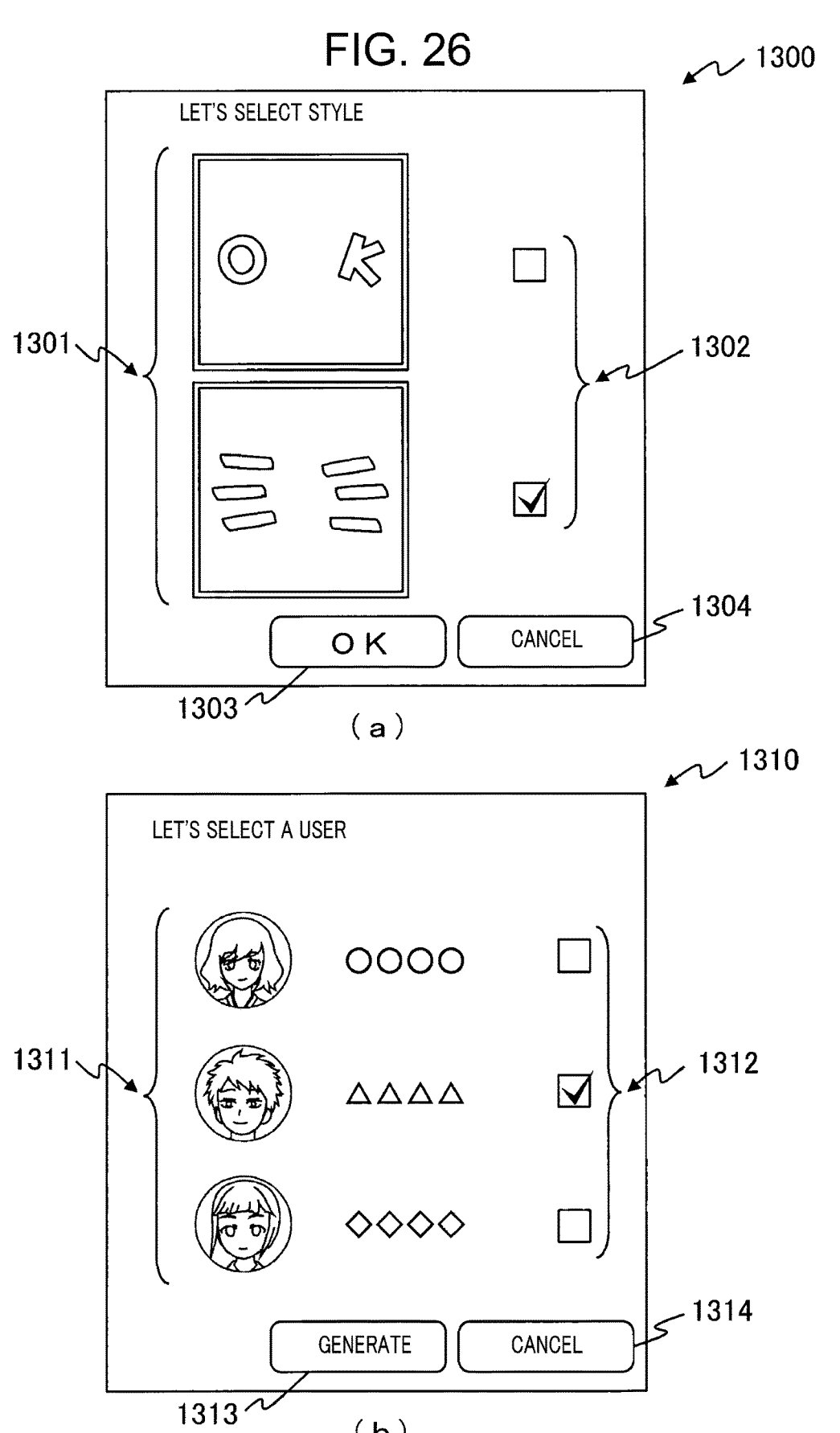
FIG. 26 is a diagram showing one example of various screens displayed on a terminal device.

Section (a) of FIG. 26 is a diagram showing one example of another object selection screen 1300 displayed on the display device 23 of the terminal device 2 of the user. The other object selection screen 1300 is a screen for selecting object data included in a new character-related image generated by the additional generation process.

The object data included in the character-related image includes, for example, object data indicating a background and object data indicating text. Furthermore, the object data included in the character-related image may include object data indicating a design. For example, object data indicating a design is object data indicating a pattern such as a frame. Furthermore, the object data included in the character-related image may include object data indicating an effect. For example, the object data indicating an effect is object data indicating a decoration (glitter, or the like), object data in the shape of a "star" placed around a character object, object data in the shape of "drops" indicating tears or sweat, or the like.

The other object selection screen 1300 is a screen that is displayed when the additional generation process is started in response to the user selecting the additional generation button 1102 included in the information exchange screen 1100. For example, the display processor 274 of the terminal device displays the other object selection screen 1300 in response to selection of the additional generation button 1102 by the user operating the input device 24.

The other object selection screen 1300 includes a candidate display area 1301, selection objects 1302, a user selection instruction button 1303, and an end button 1304.

Candidate information indicating object data for the character-related images stored in the terminal memory device 22 is displayed in the candidate display area 1301. The candidate information is object data for character-related images. In the example shown in section (a) of FIG. 26, object data indicating the text "OK" is displayed in the candidate display area 1301 as the candidate information. In the example shown in section (a) of FIG. 26, object data indicating "Manpu" (a mark, symbol, code, or the like, used in manga), which is a type of effect, is displayed in the candidate display area 1301 as the candidate information. In addition, text information or the like that describes object data for a character-related image may be displayed in the candidate display area 1301 as the candidate information. For example, if the object data is object data in the shape of a "star," the text "star" may be displayed in the candidate display area 1301.

The candidate information displayed in the candidate display area 1301 is not limited to two types, and may be one type or three or more types. If a portion of the plurality of types of candidate information cannot be included in the display area of the candidate display area 1301, the display processor 274 of the terminal device 2 may display the plurality of types of candidate information in a scrollable manner. In this case, candidate information that is not currently included in the display area of the candidate display area 1301 of the other object selection screen 1300 may be scrolled and displayed within the display area of candidate display area 1301 in response to a swipe operation by the user.

Each selection object 1302 is an operation object for selecting one item of candidate information from among the candidate information displayed in the candidate display area 1301. In the example shown in section (a) of FIG. 26, the display processor 274 of the terminal device 2 of the user displays a checkbox object corresponding to each item of candidate information as the selection objects 1302. The selection objects 1302 are respectively associated with object IDs of object data for each corresponding character-related image.

For example, when a selection object 1302 is selected by operation of the input device 24 by the user, the selected selection object 1302 is displayed including a "check" mark. In this case, the object data for the character-related image corresponding to the selection object 1302 displayed including the "check" mark is in a selected state. Further, when a selection object 1302 displayed including a "check" mark is selected by an operation of the input device 24 by the user, the selected selection object 1302 is displayed without a "check" mark. In this case, the object data for the character-related image corresponding to the selected object 1302 that is displayed without a "check" mark is in a non-selected state. In this way, the user can select object data for one or more character-related images by performing a selection operation on one or more of the selection objects 1302.

The user selection instruction button 1303 is a button object or the like for setting the object data corresponding to the selected selection object 1302 as object data included in the new character-related image, and instructing the display of the user selection screen 1310. In response to selection of the user selection instruction button 1303 by operation of the input device 24 by the user, the input device 24 inputs a user selection instruction to the terminal processor 27. When a user selection instruction is input, the display processor 274 of the terminal device 2 temporarily stores object data corresponding to the selected selection object 1302 in the terminal memory device 22 as object data included in the new character-related image. The display processor 274 of the terminal device 2 ends display of the other object selection screen 1300 and displays the user selection screen 1310 on the display device 23.

The end button 1304 is an operation object for ending the display of the other object selection screen 1300. When the end button 1304 is selected by an operation on the input device 24 by the user, the display processor 274 of the terminal device 2 ends the display of the other object selection screen 1300 and displays the information exchange screen 1100 on the display device 23.

The other object selection screen 1300 need not be displayed in response to the user selecting the additional generation button 1102 included in the information exchange screen 1100. For example, in response to selection of the additional generation button 1102 by the user, the user selection screen 1310 (described later) may be displayed (without the other object selection screen 1300 being displayed). Further, for example, in response to selection of the additional generation button 1102 by the user, the additional generation process described later may be executed (without displaying either the other object selection screen 1300 or the user selection screen 1310). If the other object selection screen 1300 is not displayed, a character-related image that does not use object data for a character-related image is generated in the additional generation process described later. Alternatively, if the other object selection screen 1300 is not displayed, a character-related image may be generated that uses predetermined object data for the character-related image. Additionally, if the user selection screen 1310 is not displayed, another user who meets a selection condition may be automatically selected in the additional generation process described later, and a character-related image may be generated using the character object of the other user who meets the selection condition. Details of the selection condition will be described later.

Section (b) of FIG. 26 is a diagram showing one example of a user selection screen 1310 displayed on the display device 23 of the terminal device 2 of the user. The user selection screen 1310 is a screen for selecting another user indicated by a character object included in the new character-related image generated by the additional generation process. The user selection screen 1310 includes a candidate display area 1311, selection objects 1312, an additional generation instruction button 1313, and an end button 1314.

In the candidate display area 1311, information indicating other users of terminal devices 2 currently displaying the information exchange screen 1000 among other users belonging to the information exchange group to which the user belongs is displayed. The candidate display area 1311 may display information indicating all other users belonging to the information exchange group to which the user belongs. The information exchange group to which the user belongs is the information exchange group related to the information exchange screen 1100 selected by the user in order to start the additional generation process. In this way, when the additional generation button 1102 is selected by one user on the information exchange screen 1100 related to the one information exchange group displayed on the terminal device 2 of the one user belonging to the one information exchange group, the terminal device 2 of the one user can generate a new character-related image including character objects representing other users belonging to the one information exchange group. In the example shown in section (b) of FIG. 26, the display processor 274 of the terminal device 2 of the user displays thumbnail images and names of character objects of other users in the candidate display area 1311 as information indicating the other users.

The selection objects 1312 is are operation objects for selecting information indicating one or more other users from among the information indicating other users displayed in the candidate display area 1311. In the example shown in section (b) of FIG. 26, the display processor 274 of the terminal device 2 of the user displays as the selection objects 1312 a checkbox object corresponding to the information indicating each other user. The selection objects 1312 are respectively associated with corresponding user IDs of each other user.

For example, when a selection object 1312 is selected by operation of the input device 24 by the user, the selected selection object 1312 is displayed including a "check" mark. In this case, the other user corresponding to the selection object 1312 displayed including the "check" mark is in a selected state. Further, when a selection object 1312 displayed including a "check" mark is selected by an operation of the input device 24 by the user, the selected selection object 1312 is displayed without a "check" mark. In this case, the other user corresponding to the selection object 1312 that does not include a "check" mark is in a non-selected state. In this way, the user can select one or more other users by performing a selection operation on one or more of the selection objects 1312.

The additional generation instruction button 1313 is an example of an operation object for inputting an additional generation instruction to generate a new character-related image. For example, when the additional generation instruction button 1313 is selected in response to operation of the input device 24 by the user, the input device 24 inputs an additional generation instruction to the generator 271, and the display processor 274 ends the display of the user selection screen 1310.

Upon acquiring the additional generation instruction from the input device 24, the generator 271 acquires the temporarily stored object data from the terminal memory device 22 in response to the user selecting the user selection instruction button 1303 on the other object selection screen 1300. Next, the generator 271 obtains the user ID of the other user corresponding to the selection object 1312 selected by the user on the user selection screen 1310.

Next, the generator 271 executes the additional generation process to generate a new character-related image based on the acquired object data (for a character-related image) and the user ID of the other user. An example of the additional generation process for generating a new character-related image will be described below.

First, the generator 271 extracts the model ID of the character object of the user and the object ID of the used object, which are associated with the user ID stored in the terminal memory device 22, from the user table T1. Next, the generator 271 reads the model data of the character object of the user associated with the extracted model ID, and the image information and placement location associated with the extracted object ID of the used object (of the character object of the user), from the terminal memory device 22. Next, the generator 271 extracts the model ID of the character object of the other user and the object ID of the used object, which are associated with the acquired user ID of the other user, from the user table T1. Next, the generator 271 reads the model data of the character object of the other user associated with the extracted model ID, and the image information and placement location associated with the extracted object ID of the used object (of the character object of the other user), from the terminal memory device 22.

Next, the generator 271 reads image definition information from the terminal memory device 22. The image definition information includes the motion data of the character object included in the new character-related image, the position of the character object, the position of object data for the character-related image, and/or the viewpoint position, or the like. The terminal memory device 22 stores a plurality of items of image definition information for each number of character objects included in the new character-related image.

First, an example of image definition information when the number of character objects included in the new character-related image is "2" (the character object of the user and one character object of another user) will be described. This image definition information includes motion data of the character object of the user and motion data of the one character object of the other user. The motion data may be chronological motion data for causing the character object to perform a predetermined action during a predetermined action period (for example, 3 seconds). In addition, the image definition information also stores information indicating the position and front direction of the character object of the user, and the position and front direction of the character object of the other user, along with the viewpoint position and the line of sight direction. The position of the character object and the viewpoint position are represented by three-dimensional coordinates in a virtual three-dimensional space. Further, the orientation and line-of-sight direction of the character object are represented by a unit vector or the like in the virtual three-dimensional space. For example, image definition information is stored that is defined such that when viewing in the line-of-sight direction from the viewpoint position, the front of the character object of the user in a first pose (a pose based on the stored motion data) is displayed on the left side, and the front of the character object of the other user in a second pose (a pose based on the stored motion data) is visible on the right side. When the same image definition information is used, a character object in the same second pose is included in the character-related image, regardless of which character object of the other user is selected as the character object included in the character-related image.

Furthermore, an example of the image definition information when the number of character objects included in the new character-related image is "3" (the character object of the user and two character objects of other users) will be described. This image definition information includes motion data of the character object of the user and motion data of the two character objects of other users. In addition, the image definition information stores information indicating the position and front direction of the character object of the user, and the respective positions and front directions of the two character objects of the other users, along with the viewpoint position and the line of sight direction. For example, image definition information is stored that is defined such that, when viewing in the line-of-sight direction from the viewpoint position, the front of the character object of the first other user in a third pose (a pose based on the stored motion data) is displayed on the left side, the front of the character object of the user in a fourth pose (a pose based on the stored motion data) is displayed in the middle, and the front of the character object of the second other user in a fifth pose (a pose based on the stored motion data) is visible on the right side. When the same image definition information is used, the character object in the same third pose is included in the character-related image, regardless of which character object of the other users is selected as the first character object positioned on the left side. Similarly, the character object in the same fifth pose is included in the character-related image regardless of which character object of the other users is selected as the second character object positioned on the right side. In addition, the number of character objects included in the new character-related image is not limited to "2" or "3," but the number may be "4" or more.

In the description of the above embodiment, the "poses" are referred to as "first" pose, "second" pose, "third" pose, "fourth" pose, and "fifth" pose, but these "first," "second," "third," "fourth," and "fifth" do not indicate the order, nor do they specify that the poses are different from each other. That is, the "first" pose, "second" pose, "third" pose, "fourth" pose, and "fifth" pose may be different poses from each other, or at least some of them may be the same pose. Furthermore, in the claims, the above-mentioned "first" pose may be referred to by other names (for example, any of "second" pose to "fifth" pose), and similarly, the "second" pose, the "third" pose, the "fourth" pose, and the "fifth" pose may also be referred to by other names. In other words, the term "first" pose described in the claims should not be interpreted to be limited to "the pose of the character object of the first user in a character-related image that includes two character objects," and should be understood by rationally interpreting the claims. Similarly, the terms "second" pose, "third" pose, "fourth" pose, and "fifth" pose should not be interpreted as being limited to those in the above-described embodiments, and should be understood by rationally interpreting the claims.

A plurality of types of image definition information for the character object of the user and/or image definition information for the character object of another user may be stored in the terminal memory device 22. The image definition information for the character object of the user and the image definition information for the character object of the other user may be collectively referred to as image definition information for character objects. For example, different types of motion data may be stored for each parameter of a character object as motion data for a character-related image. Parameters include gender (female, male, or the like), size (height is at least a predetermined value, below a predetermined value, or the like), personality (calm, lively, or the like), age (at least 30 years old, under 30 years old, or the like), or the like. For example, as the image definition information for the character object of the user, motion data MF for is stored a character-related image that is applied when the character object is female, and motion data MM is stored for a character-related image that is applied when the character object is male. Furthermore, for example, motion data MT is stored for a character-related image that is applied when the character object has a height of at least a predetermined value, and motion data MS is stored for a character-related image that is applied when the character object has a height shorter than the predetermined value. Further, for example, as the image definition information for the character object of the user, motion data MFS for a character-related image may be stored that is applied when the character object is female and has a height less than the predetermined value, and motion data MMT may be stored for a character-related image that is applied when the character object is male and has a height of at least the predetermined value.

Next, the generator 271 generates a new character-related image including the character object of the user with a predetermined movement and facial expression and the object data such as the background, text or the like, on the basis of each item of extracted model data, the image information and placement location of each used object, the image definition information, and the acquired object data (for a character-related image). Next, the generator 271 associates the generated new character-related image with a related image ID for uniquely identifying the character-related image, and stores this in the terminal memory device 22. The generator 271 also generates candidate information indicating the generated new character-related image, associates the generated candidate information with the related image ID for identifying the character-related image, and stores this in the terminal memory device 22. Then, the generator 271 associates the object ID of the used object at the time of generating the new character-related image with the related image ID and stores this in the terminal memory device 22, and the additional generation process for the new character-related images ends. In addition, all or a portion of the generated new character-related images may be set so as to be unusable in the information exchange service. In this case, a usable group comprising character-related images that can be used in the information exchange service may be set. Then, when a new character-related image that can be used in the information exchange service is generated, the new character-related image is set so as to be included in the usable group.

Upon completion of the new additional generation process, the transmitter 272 of the terminal device 2 that has executed the additional generation process executes a process of transmitting the new character-related image. As a result, the new character-related image is transmitted via the server device 3 to the terminal devices 2 of other users who belong to the information exchange group to which the user of the terminal device 2 that executed the additional generation process belongs. Further, in response to the completion of the new additional generation process, the display processor 274 of the terminal device 2 that has executed the additional generation process executes the display process of the information exchange screen 1400.

The end button 1314 is an operation object for ending the display of the user selection screen 1310. When the end button 1314 is selected by operation of the input device 24 by the user, the display processor 274 of the terminal device 2 ends the display of the user selection screen 1310.

The user selection screen 1310 need not be displayed in response to the user selecting the user selection instruction button 1303 included in the other object selection screen 1300. For example, the additional generation process may be executed (without displaying the user selection screen 1310) in response to the user selecting the user selection instruction button 1303. If the user selection screen 1310 is not displayed, another user who satisfies a selection condition may be automatically selected in the additional generation process, and a character-related image using the character object of the other user who satisfies the selection condition may be generated. Hereinafter, the information exchange group related to the information exchange screen 1100 selected by the user in order to start the additional generation process may be simply referred to as the "information exchange group," and users other than the user (the user who selected the information exchange screen 1100) may be simply referred to as "other users."

The selection condition is a condition regarding the usage status of the information exchange service by other users. Hereinafter, an example of a process for determining another user who satisfies a selection condition regarding the usage status of the information exchange service by the other user will be described. First, the terminal device 2 of the other user transmits the input information and user ID of the other user to the terminal device 2 of the user along with the transmission date and time, via the server device 3. The terminal device 2 of the user stores the received input information and user ID of the other user in the terminal memory device 22 along with the transmission date and time. The generator 271 arranges the input information that each other user belonging to the information exchange group has most recently transmitted during information exchange within the information exchange group in order of the transmission date and time closest to the current time, and identifies one or more items of input information whose transmission date and time are closest to the current time. The generator 271 then determines the other users who have transmitted each of the determined one or more items of input information as other users who satisfy the selection condition. For example, if there are four other users (referred to as other user U1, other user U2, other user U3, and other user U4, respectively), and the transmission dates and times of the input information sent most recently by the other user U1, the other user U2, the other user U3, and the other user U4 are respectively Mar. 24, 2022 10:55, Mar. 23, 2022 23:03, Mar. 24, 2022 11:21, and Mar. 24, 2022 07:13, the generator 271 determines the two other users U3 and U1 whose input information transmission dates and times are closest to the current time as the other users who satisfy the selection condition. Thereby, the generator 271 can automatically generate character-related image including the character objects of the other users who recently sent input information (text information, stamp image, or the like) in the information exchange related to the information exchange group. The input information sent by other users may include a commonly known "reaction stamp." The number of other users who satisfy the selection condition as determined by the generator 271 is not limited to "2." The number of other users satisfying the selection condition may be "1" or may be "3" or more. Further, the number of other users satisfying the selection condition may be another user setting number UA, which will be described later. In addition, in the above-described embodiment, the reception date and time at which the terminal device 2 of the user received the input information and user ID of another user may be used instead of the transmission date and time.

Hereinafter, another example of the process of determining other users who satisfy a selection condition regarding the usage status of the information exchange service by another user will be described. First, each time the terminal device 2 of another user starts displaying an information exchange screen in order to start information exchange within an information exchange group, the display start time of the information exchange screen is transmitted to the terminal device 2 of the user via the server device 3. The terminal device 2 of the user stores in the terminal memory device 22 the received display start time of the information exchange screen of the other user. The generator 271 determines the one or more other users who have operated the terminal devices 2 with display start times of the information exchange screen most recently displayed by the terminal device of each other user belonging to the information exchange group in order to start an information exchange within the information exchange group. The generator 271 then determines the determined one or more other users as other users who satisfy the selection condition. For example, if there are four other users (referred to as other user U1, other user U2, other user U3, and other user U4, respectively), and the display dates and times when the other user U1, the other user U2, the other user U3 and the other user U4, respectively, most recently displayed the information exchange screen related to the information exchange group are Mar. 23, 2022 21:10, Mar. 23, 2022 23:00, Mar. 23, 2022 22:17 and Mar. 23, 2022 05:55, the generator 271 determines the other user U2 and the other user U3 whose information exchange screen display start times are closest to the current time as the other users who satisfy the selection condition. Thereby, the generator 271 can automatically generate character-related images including character objects of other users who recently started exchanging information related to the information exchange group. The number of other users who satisfy the selection condition is not limited to "2". The number of other users who satisfy the selection condition may be "1" or may be "3" or more. Further, the number of other users who satisfy the selection condition may be another user setting number UA, which will be described later.

Hereinafter, another example of the process of determining other users who satisfy a selection condition regarding the usage status of the information exchange service by another user will be described. First, each time the terminal device 2 of another user logs into the information exchange service to start information exchange within the information exchange group, the terminal device 2 of the other user transmits the login date and time of the information exchange service to the terminal device 2 of the user via the server device 3. The terminal device 2 of the user stores the received login date and time of the information exchange service of the other user in the terminal memory device 22. The generator 271 determines the one or more other users who operate terminal devices whose login date and time is closest to the current time when each user belonging to the information exchange group most recently logged into the information exchange service in order to start an information exchange within the information exchange group. The generator 271 then determines the determined one or more other users as other users who satisfy the selection condition. For example, if there are four other users (referred to as other user U1, other user U2, other user U3, and other user U4, respectively), and the dates and times when the other user U1, the other user U2, the other user U3, and the other user U4 each most recently logged into the information exchange service are respectively Mar. 23, 2022 21:10, Mar. 23, 2022 23:00, Mar. 23, 2022 22:17 and Mar. 23, 2022 05:55, the generator 271 determines the other user U2 and the other user U3 closest to the current time as the other users who satisfy the selection condition. Thereby, the generator 271 can automatically generate character-related images including character objects of other users who recently started exchanging information related to the information exchange group. The number of other users who satisfy the selection condition is not limited to "2." The number of other users who satisfy the selection conditions may be "1" or may be "3" or more. Further, the number of other users who satisfy the selection condition may be another user setting number UA, which will be described later.

The another user setting number UA indicating the number of other users included in the character-related images may be set in advance or may be set automatically. For example, in the process of determining other users who satisfy the selection condition, another user setting number UA stored in the terminal memory device 22 may be used. Further, in the process of determining other users who satisfy the selection condition, another user setting number UA randomly set by the terminal processor 27 may be used.

In addition, if the other user setting number UA is stored in association with the object data for character-related images, another user setting number UA associated with the object data (for character-related images) acquired in response to an operation by the user on the other object selection screen 1300 may be automatically used in the process of determining other users who satisfy the selection condition.

The selection condition may be a condition regarding a relationship between the user and the other users. Hereinafter, one example of a process for determining the other users who satisfy a selection condition regarding the relationship between the user and the other users will be described. First, the generator 271 determines whether or not an information exchange group to which only the user and one other user belong is stored in the group table T3. If an information exchange group to which only the user and one other user belong is stored in the group table T3, the generator 271 extracts the other user who belongs to the information group to which only the user and one other user belong. Then, if the extracted other user belongs to an information exchange group (an information exchange group related to the information exchange screen 1100 selected by the user in order to start the additional generation process), the generator 271 determines the extracted other user to be another user who satisfies the selection condition. Through this, the generator 271 can automatically generate a character-related image that includes a character object of another user with whom the user has had a one-to-one information exchange. In addition, the other user who has had a one-to-one information exchange with the user may be another user who had a one-to-one information exchange with the user in a chat function or the like in an SNS service other than the information exchange service.

Hereinafter, another example of the process of determining another user who satisfies a selection condition regarding a relationship between the user and other user will be described. First, the transmitter 272 of the terminal device 2 of the user sends information indicating a transmission request for a distribution end user ID indicating another user who has viewed a distribution image distributed by the user as the distributing user, together with the user ID of the user, to the server device 3 via the communication interface (I/F) 21. Upon receiving the information indicating the transmission request and the user ID of the user via the server communication interface (I/F) 31, the server receiver 331 of the server device 3 extracts the distribution end user ID associated with the received user ID of the user from the server memory device 32. Then, the server transmitter 332 of the server device 3 transmits the extracted distribution end user ID to the terminal device 2 of the user via the server communication interface (I/F) 31. The receiver 273 of the terminal device 2 of the user stores the received distribution end user ID in the terminal memory device 22. Then, if the other user indicated by the stored distribution end user ID is a user belonging to the information exchange group, the generator 271 determines the other user indicated by the distribution end user ID as another user who satisfies the selection condition. Thereby, the generator 271 can automatically generate a character-related image that includes a character object of another user who has viewed distribution images distributed by the user as the distributing user.

Hereinafter, another example of the process of determining another user who satisfies a selection condition regarding a relationship between the user and other users will be described. First, the transmitter 272 of the terminal device 2 of the user transmits information indicating a request to transmit the participation status of other users in a predetermined event in which the user has participated in the past or is currently participating, together with the user ID of the user, to the server device 3 via the communication interface (I/F) 21. The server device 3 can provide a predetermined event to a plurality of users, and each user who wants to participate in the predetermined event connects to the server device 3 by performing a predetermined operation on the terminal device 2 and can participate in the predetermined event. The server device 3 stores the user ID of each user who participated in the predetermined event in the server memory device 32 in association with information related to the predetermined event (event ID, or the like). Upon receiving the information indicating the transmission request and the user ID of the user via the server communication interface (I/F) 31, the server receiver 331 of the server device 3 extracts the user ID of the other users associated with the event ID associated with the received user ID of the user, from the server memory device 32. The user ID of another user associated with the extracted event ID may be the user ID of another user whose participation period at least partially overlaps with that of the user. In addition, the user ID of the other user associated with the extracted event ID may be another user ID whose participation period at least partially overlaps with that of the user, and who belongs to the same group as the user that was set in the predetermined event. Then, the server transmitter 332 of the server device 3 transmits the extracted user IDs to the terminal device 2 of the user via the server communication interface (I/F) 31. The receiver 273 of the terminal device 2 of the user stores the received user IDs in the terminal memory device 22. Then, when another user indicated by the stored user ID is a user belonging to the information exchange group, the generator 271 determines the other user indicated by the stored user ID as another user who satisfies the selection condition. As a result, the generator 271 can automatically generate a character-related image that includes a character object of another user who has participated in the same event as the user in the past and/or another user who is currently participating in the same event as the user.

Hereinafter, another example of the process of determining another user who satisfies a selection condition regarding the relationship between the user and other users will be described. First, the transmitter 272 of the terminal device 2 of the user transmits information indicating a transmission request regarding another user who played a so-called online game that the user has played in the past, together with the user ID of the user, to the server device 3 via the terminal communication interface (I/F) 21.

As a premise of this case, the server device 3 has a function of providing one or more online games to a plurality of users, and each user who wants to play the online game can connect to the server device 3 and play the online game by performing a predetermined operation on the terminal device 2. The server device 3 stores the user ID of each user who played the online game in the server memory device 32 in association with information regarding the online game (game ID, or the like).

Upon receiving the information indicating the transmission request and the user ID of the user via the server communication interface (I/F) 31, the server receiver 331 of the server device 3 extracts the user ID of another user associated with the game ID associated with the received user ID of the user from the server memory device 32. A user ID of another user associated with the extracted event ID may be the user ID of another user whose participation period at least partially overlaps with that of the user. Then, the server transmitter 332 of the server device 3 transmits the extracted user ID to the terminal device 2 of the user via the server communication interface (I/F) 31. The receiver 273 of the terminal device 2 of the user stores the received user ID in the terminal memory device 22. Then, when the other user indicated by the stored user ID is a user belonging to the information exchange group, the generator 271 determines the other user indicated by the stored user ID as another user who satisfies the selection condition. As a result, the generator 271 can automatically generate a character-related image that includes a character object of another user who has played the same game as the user in the past and/or another user who is currently playing the same game as the user.

Other users who meet the selection conditions regarding the relationship between the user and the other users are not limited to the above examples, and for example, the other users who meet the selection conditions regarding the relationship between the user and the other users may include other users followed by the user, other users who are following the user, other users who are mutual followers of the user, other users who mutually follow a specific user who mutually follows the user, other users who are friends with the user, other users whose specific information (phone number, email address, predetermined ID (identification), or the like) is stored in the terminal device 2 of the user, or the like.

When the selection condition is a condition regarding the relationship between the user and other users, character objects of another user setting number UB among the other users who satisfy the selection condition may be used in the additional generation process. For example, if the other user setting number UB is "3," even if there are ten other users who satisfy the selection condition regarding the relationship between the user and other users, the character objects of three of the ten other users are used for the additional generation process.

The other user setting number UB may be set in advance or automatically set. For example, in the process of determining other users who satisfy the selection condition, another user setting number UB stored in the terminal memory device 22 may be used. Further, in the process of determining other users who satisfy the selection condition, another user setting number UB set randomly by the terminal processor 27 may be used. In addition, if the other user setting number UB is stored in association with the object data for character-related images, the other user setting number UB associated with the object data (for character-related images) acquired in response to an operation by the user on the other object selection screen 1300 may be automatically used in the process of determining other users who satisfy the selection condition.

When the selection condition is a condition regarding the relationship between the user and other users and the other user setting number UB is used, if the number of other users satisfying the selection condition is less than the other user setting number UB, the additional generation process need not be executed. Alternatively, if the number of other users who satisfy the selection condition is less than the other user setting number UB, other users may be selected from among other users who do not satisfy the selection condition, so that the number of character objects of other users used in the additional generation process reaches the other user setting number UB. This selection of other users may be performed by selecting other users from among the other users through a manual operation by the user, or by randomly selecting other users from among the other users. Furthermore, if the number of other users satisfying the selection conditions exceeds the other user setting number UB, the other user setting number UB of other users may be randomly selected from the other users who satisfy the selection condition, or the other user setting number UB of other users may be selected through a manual operation by the user.

If the selection condition is a condition regarding the relationship between the user and other users, and the other user setting number UB is used, a plurality of selection conditions (conditions regarding the relationship between the user and other users) may be used in the additional generation process. In this case, a priority order is set for each condition regarding the relationship between the user and other users.

Hereinafter, a case in which the selection condition of first priority is "has had a one-on-one information exchange with the user," and the selection condition of second priority is "belongs to the same group as the user, which was set in a predetermined event" will be described as an example. For example, the generator 271 extracts other users who have "had a one-one-one information exchange with the user" from among the users who belong to the information exchange group. Next, the generator 271 determines the extracted other users who have "had a one-on-one information exchange with the user" as other users who satisfy the selection condition of first priority. Next, if the number of other users who meet the selection condition of first priority is less than the other user setting number UB, other users who "belong to the same group as the user, which was set in the predetermined event" are extracted from among the users belonging to the information exchange group who do not satisfy the selection condition of first priority. Next, the generator 271 determines the extracted other users who "belong to the same group as the user, which was set in the predetermined event" as other users who satisfy the selection condition of second priority. Next, the generator 271 sets the other users who satisfy the selection condition of first priority and the other users who satisfy the selection condition of second priority as other users who satisfy the selection conditions. Then, the generator 271 calculates the total number of other users who satisfy the selection conditions.

When the calculated total is the other user setting number UB, the generator 271 uses the other users who satisfy the selection conditions. In addition, if the calculated total exceeds the other user setting number UB, the generator 271 sets, as the other users who satisfy the selection condition of second priority, other users reselected from among the other users who satisfy the selection condition of second priority, so that the number of other users who satisfy the selection conditions becomes the other user setting number UB. The reselection may be a manual selection by the user or an automatic random selection by the generator 271. In addition, if the calculated total is less than the other user setting number UB, the generator 271 sets, randomly or through a manual operation by the user, other users who satisfy the selection conditions from among the users who belong to the information exchange group and do not satisfy the selection condition of second priority, so that the number of other users who satisfy the selection conditions becomes the other user setting number UB.

When the selection condition is a condition regarding the relationship between the user and other users, a plurality of types of other user setting numbers UB may be used. For example, four types of numerical values such as "1," "2," "3," and "4" may be set as the other user setting number UB. The other user setting number UB may be two types of numerical values, three types of numerical values, or five or more types of numerical values. For example, if the number of other users who satisfy the selection condition is "1," a character-related image for the case where there is one other user is generated in the additional generation process. Further, when the number of other users satisfying the selection condition is "2," character-related images for the case where there are two other users are generated in the additional generation process.

Figure 27:
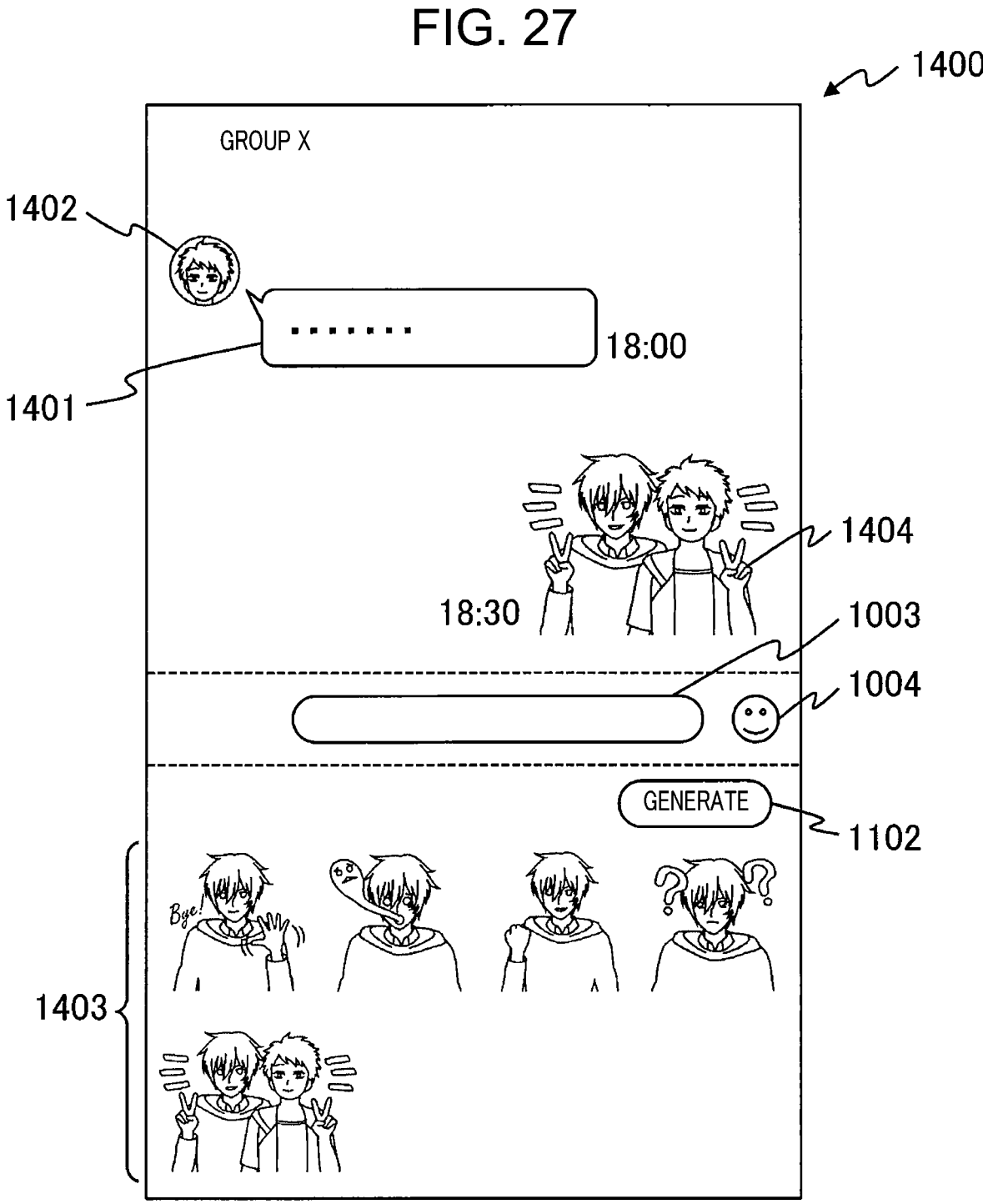
FIG. 27 is a diagram showing one example of a screen displayed on a terminal device.

FIG. 27 is a diagram showing one example of an information exchange screen 1400 displayed on the display device 23 of the terminal device 2 of the user. The information exchange screen 1400 is displayed when a new character-related image is generated by the additional generation process.

Similar to the information exchange screen 1100, the information exchange screen 1400 includes other user input information 1401, other user information 1402, the text input object 1003, the candidate display button 1004, user input information 1404, and the additional generation button 1102. The candidate information 1403 on the information exchange screen 1400 includes four types of candidate information 1101 on the information exchange screen 1100 and one type of candidate information corresponding to a new character-related image. In addition, when the candidate information 1403 includes candidate information corresponding to a new character-related image, one or more types of candidate information among the four types of candidate information 1101 that were previously included may be deleted from the candidate information 1403. For example, by deleting two or more types of candidate information, the number of candidate information options is reduced, making it easier for the user to select information.

When one of the six types of candidate information 1403 is selected in accordance with operation of the input device 24 by the user, the input device 24 transmits the related image ID associated with the selected candidate information to the terminal processor 27. Next, the display processor 274 extracts from the terminal memory device 22 the character-related image identified by the related-image ID received from the input device 24, and displays the extracted character-related image as the user input information 1404 in the user display area of the information exchange screen 1400 (FIG. 27).

Along with the display of the user input information 1404 by the display processor 274, the transmitter 272 transmits the related image ID received from the input device 24 and the user ID stored in the terminal memory device 22 to the server device 3 via the terminal communication interface (I/F) 21. The server transmitter 332 of the server device 3 extracts from the server memory device 32 the user IDs of other users associated with the same information exchange group as the user ID received by the server receiver 331. Further, the server transmitter 332 transmits the related image ID and the user ID received by the server receiver 331 to the terminal devices 2 of the other users identified by the extracted user IDs, via the server communication interface (I/F) 31.

Then, the receiver 273 of the terminal devices 2 of the other user receives the related image ID and the user ID transmitted from the server device 3 via the terminal communication interface (I/F) 21. Next, the display processor 274 of the terminal devices 2 of the other users extracts the character-related image identified by the related image ID received by the receiver 273 from the terminal memory device 22, and displays the extracted character-related image in the other user display area of the distribution screen as other user input information. In this way, the same image as the character-related image used by the user is also displayed on the terminal devices 2 of other users associated with the information exchange group to which the user belongs.

In addition, when the character-related image identified by the received related image ID is not stored in the terminal memory device 22, the display processor 274 of the terminal devices 2 of the other users is such that the transmitter 272 of the terminal devices 2 of the other users transmits an image transmission request to the server device 3. The image transmission request is transmitted together with the received related image ID and/or user ID, along with the user IDs of the other users. When the image transmission request is received by the server receiver 331, the server transmitter 332 of the server device 3 extracts, from the server memory device 32, the character-related image associated with the related image ID received together with the image transmission request. Next, the server transmitter 332 transmits the extracted character-related image to the terminal devices 2 of the other users together with the received related-image ID and user ID. The receiver 273 of the terminal devices 2 of the other user receives the related image ID, the character-related image and the user ID transmitted from the server device 3 via the terminal communication interface (I/F) 21, and stores these in the terminal memory device 22 in association with each other. Then, the display processor 274 of the terminal devices 2 of the other users displays the stored character-related image in the other user display area of the distribution screen as other user input information.

In addition, the new character-related image can be used even for information exchanges related to another information exchange groups other than the information exchange group related to the information exchange screen 1100 selected by the user to start the additional generation process. For example, candidate information corresponding to a new character-related image is displayed on the information exchange screen related to the other information exchange group, and in response to selection of the candidate information by the user, a character-related image corresponding to the selected candidate information is displayed, and a character-related image corresponding to the selected candidate information is also displayed on the terminal device 2 of another user belonging to the other information exchange group.

Further, the new character-related image may also be controlled so as to not be useable in information exchanges related to information exchange groups that do not include other users indicated by the character objects included in the new character-related image. For example, the display processor 274 of the terminal device 2 of the user displays candidate information for character-related images including only the character object of the user and the character objects of one or more other users that are not included in the information exchange group related to the currently displayed information exchange screen. As a result, within an information exchange group that does not include other users indicated by character objects included in the character-related image, it is possible to restrict the use of character-related images and to prevent the unintended spread of the character objects.

(Operation Sequence of the Information Processing System 1)

Figure 28:
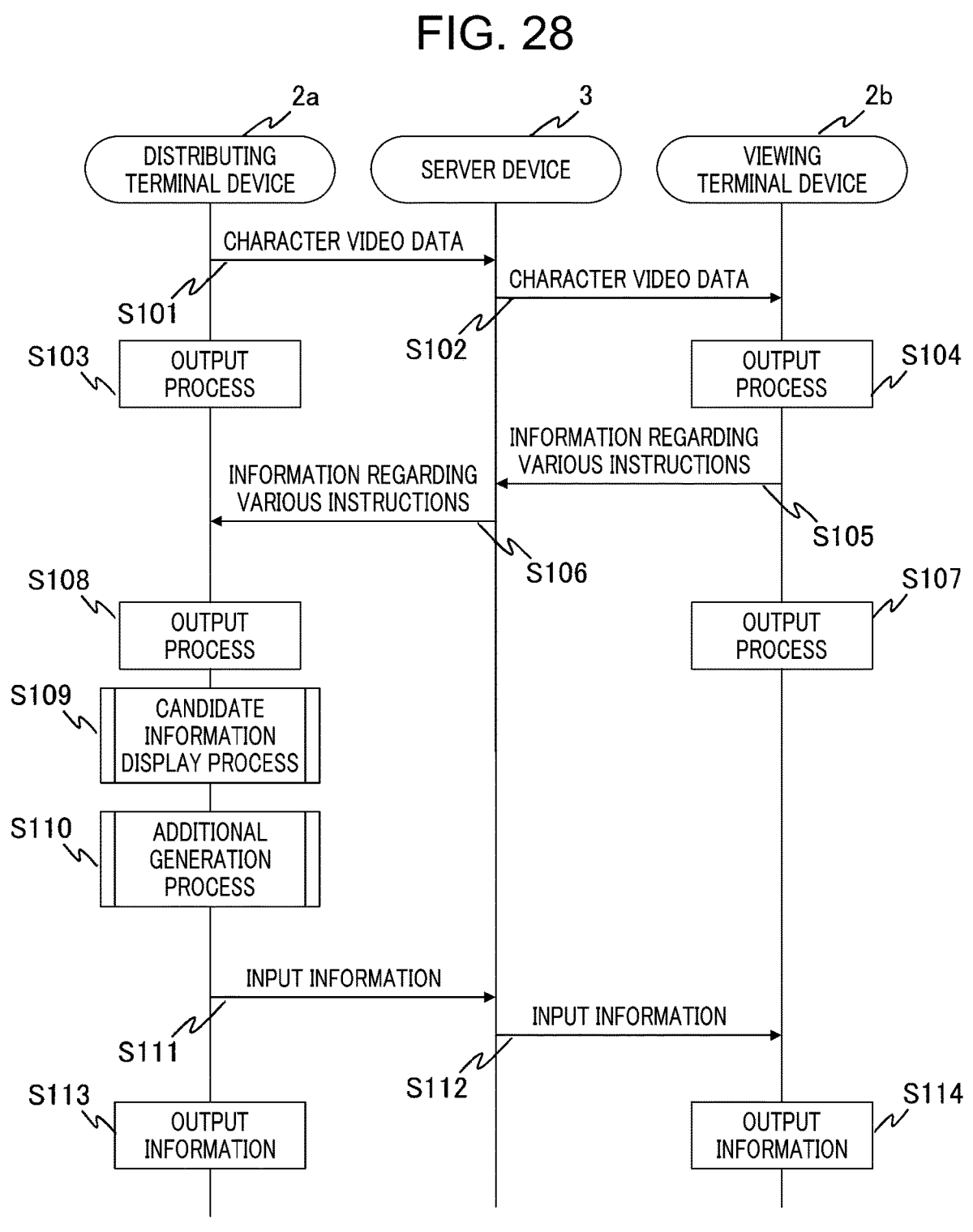

FIG. 28 is a diagram showing one example of an operation sequence of the information processing system 1. This operation sequence is executed primarily by the terminal processor 27 and the server processor 33 in cooperation with each element of the terminal device 2 and the server device 3, based on control programs respectively stored in advance in the terminal memory device 22 and the server memory device 32. Hereinafter, of the two terminal devices 2, a distributing terminal device 2a is taken to be the terminal device 2 operated by the distributing user, and a viewing terminal device 2b is taken to be the terminal device 2 operated by the viewing user.

Next, the display processor 274 of the distributing terminal device 2a executes a candidate information display process (step S109). Details of the candidate information display process will be described later. In addition, the candidate information display process is not limited to a process that can be executed only by the distributing terminal device 2a. For example, the display processor 274 of a viewing terminal device 2b that can use the character object representing the user may execute the candidate information display process.

Next, the generator 271 and the display processor 274 of the distributing terminal device 2a execute the additional generation process (step S110). Details of the additional generation process will be described later. In addition, the additional generation process is not limited to a process that can be executed only by the distributing terminal device 2a. For example, the generator 271 and the display processor 274 of a viewing terminal device 2b that can use the character object representing the user may execute the candidate information display process.

Next, the transmitter 272 of the distributing terminal device 2a transmits the input information input in response to operation of the input device 24 by the distributing user to the server device 3 via the terminal communication interface (I/F) 21 (step S111). Next, each time input information is received by the server receiver 331, the server transmitter 332 of the server device 3 distributes the received input information to the viewing terminal device 2b via the server communication interface (I/F) 31 (step S112). The display processor 274 of the distributing terminal device 2a generates drawing data for displaying input information input in response to operation of the input device 24 by the distributing user, and displays the information exchange screen on the display device 23 based on the generated drawing data (step S113). The display processor 274 of the viewing terminal device 2b generates drawing data for displaying the input information received by the receiver 273, and displays an information exchange screen on the display device 23 based on the generated drawing data (step S114).

Figure 29:
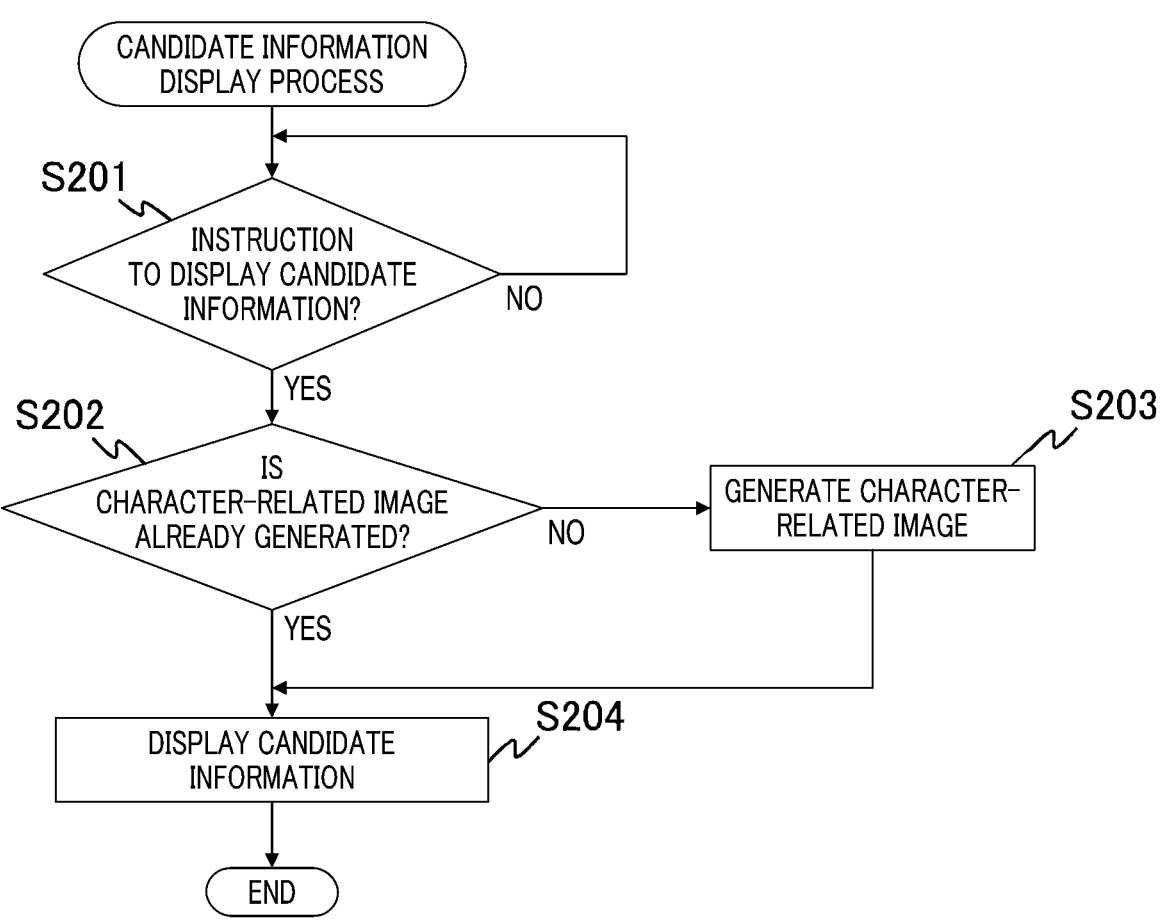
FIG. 29 is a diagram showing one example of an operation flow of a candidate information display process.

FIG. 29 is a diagram illustrating one example of an operation flow of a candidate information display process. The candidate information display process shown in FIG. 29 is executed in step S110 of FIG. 29.

When a candidate information display instruction is acquired (step S201—Yes), the display processor 274 determines whether or not a character-related image has been generated in the past and stored in the terminal memory device 22 (step S202). If the character-related image is not stored (step S202—No), the generator 271 generates a character-related image (step S303), and the process advances to step S204.

When the display processor 274 has generated a character-related image in the past and stored such the terminal memory device 22 (step S202—Yes), the generator 271 generates candidate information corresponding to the character-related image, and the display processor 274 displays the generated candidate information (step S204) and ends the candidate information display process.

Figure 30:
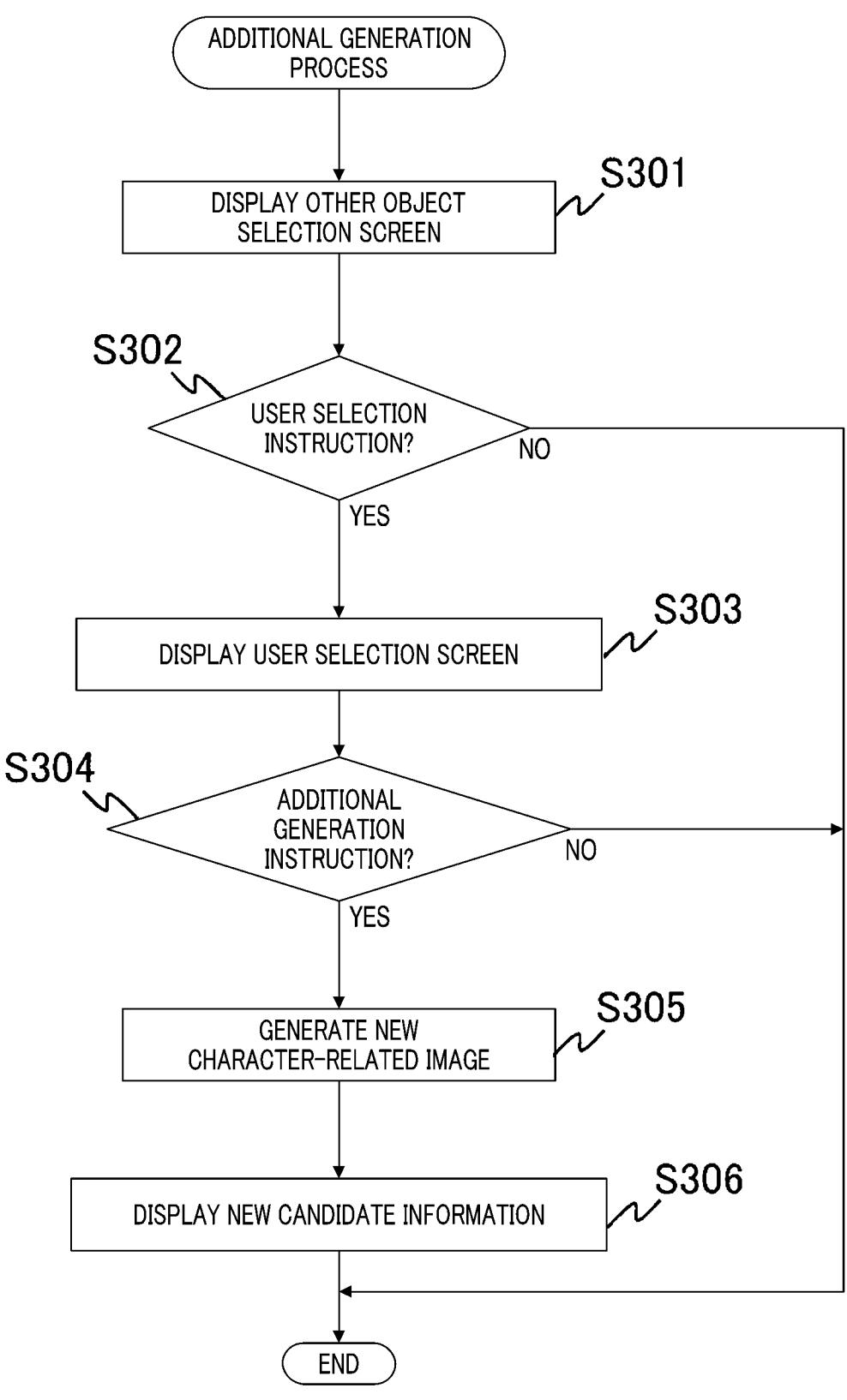
FIG. 30 is a diagram showing one example of an operation flow of an additional generation process.

FIG. 30 is a diagram showing one example of the operational flow of the additional generation process. The additional generation process shown in FIG. 30 is executed in step S110 of FIG. 28.

First, when the additional generation process is started in response to a selection, by the user with the additional generation button 1102 included in the information exchange screen 1100, the display processor 274 displays the other object selection screen 1300 on the display device 23 (step S301). Next, the display processor 274 determines whether or not a user selection instruction has been input in response to a selection by the user with the user selection instruction button 1303 included in the other object selection screen 1300 (step S302).

When it is determined that a user selection instruction has not been input (step S302—No), the display processor 274 ends the additional generation process. When it is determined that a user selection instruction has been input (step S302—Yes), the display processor 274 displays the user selection screen 1310 on the display device 23 (step S303).

Next, the display processor 274 determines whether or not an additional generation instruction has been input in response to a selection by the user with the additional generation instruction button 1313 included in the user selection screen 1310 (step S304). When it is determined that an additional generation instruction has not been input (step S304—No), the display processor 274 ends the additional generation process. When it is determined that an additional generation instruction has been input (step S304—Yes), the generator 271 generates a new character-related image (step S305). Then, the display processor 274 displays the newly generated character-related image (step S306), and the additional generation process ends.

As described in detail above, in the information processing system 1 of the present embodiment, it is possible to increase the types of character-related images that can be used, based on the information regarding a character object representing a other user other than the user who instructed generation or addition of the character-related image. In this way, the information processing system 1 of the present embodiment can improve the user interface for determining information to be provided to other users without requiring the user to perform complicated operations. Further, in the information processing system 1 of the present embodiment, the types of character-related images can be changed based on the information regarding the character object representing the other user other than the user who instructed generation or addition of the character-related image. In this way, the information processing system 1 of the present embodiment enables the user to change the information provided to other users without requiring the user to perform complicated operations, thereby preventing the user from getting bored with the selection.

As discussed above, FIG. 25 is a diagram showing one example of information exchange screens 1500 and 1510 including stamp images generated as character-related images. The information exchange screens 1500 and 1510 include type selection buttons 1501 for selecting the type of stamp image. When the candidate information corresponding to one of the type selection buttons 1501 is selected in response to operation of the input device 24 by the user, the stamp image of the type corresponding to the selected type selection button 1501 is displayed in a display area below the type selection buttons 1501. In FIG. 25, buttons are illustrated as the widget for selecting the type of stamp image, but the widget for selecting the type of stamp image may be a tab. In this manner, on the information exchange screens 1500 and 1510, each of the plurality of stamp images is switched and displayed for each type.

Section (a) of FIG. 25 is a diagram showing one example of an information exchange screen 1500 when the type selection button 1501 corresponding to a stamp image generated as a character-related image is selected. The information exchange screen 1500 displays candidate information 1101 corresponding to the stamp image generated as a character-related image. When the type selection button 1501 corresponding to the stamp image for conveying "OK" is selected, the information exchange screen 1500 displays candidate information corresponding to the stamp image for conveying "OK."

Section (b) of FIG. 25 is a diagram showing one example of an information exchange screen 1510 when the type selection button 1501 corresponding to a stamp image generated as a new character-related image is selected. On the information exchange screen 1510, a type selection button 1501 corresponding to a stamp image generated as a new character-related image is selected, and in accordance with this selection, candidate information 1511 corresponding to the stamp image generated as a new character-related image is displayed. In the example shown in section (b) of FIG. 25, the type selection button 1501 corresponding to the stamp image generated as the new character-related image is a button object labeled "Add."

In this way, the information exchange screen is configured so that the stamp images are classified according to type and displayed, thereby making it possible to improve the user interface. With such an information exchange screen, even if the size of the display screen of the terminal device 2 is limited, it is possible to improve the listability of a plurality of stamp images. Moreover, the information exchange screens 1500 and 1510 enable the user to intuitively and/or easily find the stamp image that the user desires to use. Moreover, the information exchange screens 1500 and 1510 enable the user to grasp at a glance whether or not there is a stamp image generated as a new character-related image.

The relationship between the character object of a distributing user and the character object of a viewing user that exist in the metaverse may be used in the process of determining other users who satisfy a selection condition regarding the relationship between the user and other users. For example, the server device 3 stores position information indicating the position of the character object of the distributing user in the metaverse and position information indicating the position of the character object of the viewing user in the metaverse in the server memory device 32 at predetermined time intervals (for example, every second).

When the user space of the distributing user is set in the metaverse, the server device 3 stores, in the server memory device, the user ID indicating the viewing user each time the character object of the viewing user enters the user space of the distributing user. The entering user ID is stored in association with the user ID (distributing user ID) indicating the distributing user. For example, the user space is a space set in the metaverse as a private room of the character object of the distributing user. Further, the user space may be a space set in the metaverse as a studio in which the character object of the distributing user performs video distribution. The user space may be a space set in the metaverse as a gathering place for groups to which viewing users belong, in predetermined events.

In this case, first, the transmitter 272 of the terminal device 2 of the user transmits information indicating a request for transmission of the entering user ID of another user who has entered the user space of the user, together with the user ID of the user, to the server device 3 via the terminal communication interface (I/F) 21. Upon receiving the information indicating the transmission request and the user ID of the user via the server communication interface (I/F) 31, the server receiver 331 of the server device 3 extracts the entering user ID associated with the received user ID of the user from the server memory device 32. Then, the server transmitter 332 of the server device 3 transmits the extracted entering user ID to the terminal device 2 of the user via the server communication interface (I/F) 31.

The receiver 273 of the terminal device 2 of the user stores the received entering user ID in the terminal memory device 22. Then, when the other user indicated by the stored entering user ID is a user belonging to the information exchange group, the generator 271 determines the other user indicated by the entering user ID as another user who satisfies the selection condition. Thus, the generator 271 can automatically generate a character-related image including the character object of another user who has entered the user space of the user set in the metaverse.

As described in detail above, in the information processing system 1 of the present embodiment, it is possible to increase the types of character-related images that can be used in accordance with the candidate change conditions. In this way, the information processing system 1 of the present embodiment can improve the user interface for determining information to be provided to other users without requiring the user to perform complicated operations. Further, in the information processing system 1 of the present embodiment, it is possible to reduce the types of character-related images that can be used in accordance with the candidate change conditions. In this way, the information processing system 1 of the present embodiment enables a user to easily select information to be provided to other users, without requiring the user to perform complicated operations. Further, in the information processing system 1 of the present embodiment, it is possible to change the types of character-related images that can be used in accordance with the candidate change conditions. In this way, the information processing system 1 of the present embodiment enables the user to change the information provided to other users without requiring the user to perform complicated operations, thereby preventing the user from getting bored with the selection.

(Variation 1)

The present disclosure is not limited to this embodiment. For example, on the information exchange screen, stamp images may be classified by type and displayed. For example, the stamp images include a stamp image for conveying "OK," a stamp image for conveying "NO," a stamp image having a "smiling" expression, and the like. The stamp images may also include a stamp image generated as a character-related image, a stamp image generated as a new character-related image, and the like.

Figure 16:
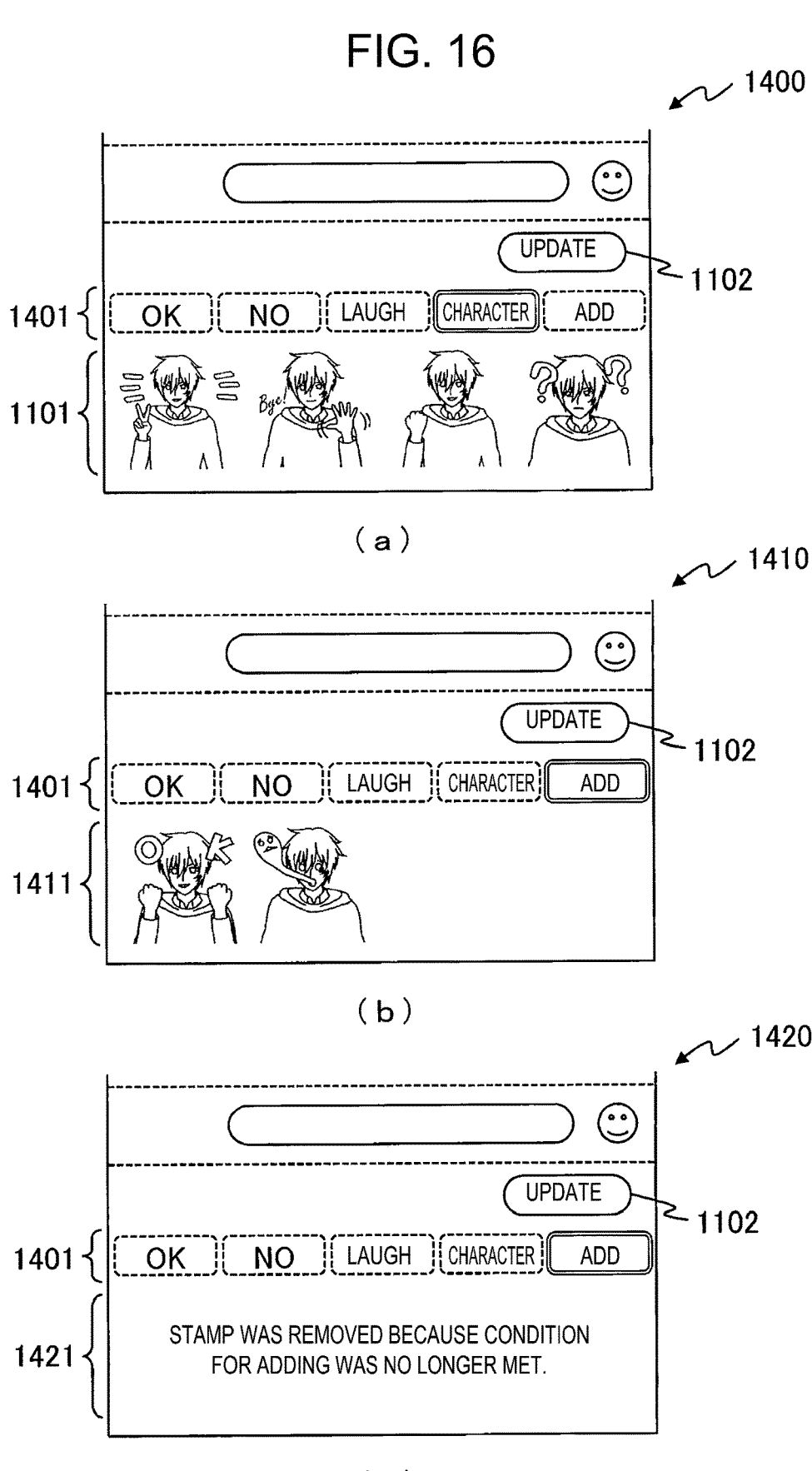
FIG. 16 is a diagram showing one example of various screens displayed on a terminal device.

FIG. 16 shows one example of information exchange screens 1400, 1410, and 1420 including stamp images generated as character-related images. The information exchange screens 1400, 1410, and 1420 include type selection buttons 1401 for selecting the type of stamp image. When one of the type selection buttons 1401 is selected in response to operation of the input device 24 by the user, candidate information corresponding to the stamp image of the type corresponding to the selected type selection button 1401 is displayed in a display area below the type selection button 1401. In FIG. 16, a button is illustrated as the widget for selecting the type of stamp image, but the widget for selecting the type of stamp image may be a tab. In this manner, on the information exchange screens 1400, 1410, and 1420, each of the plurality of stamp images is switched and displayed for each type.

Section (a) of FIG. 16 is a diagram showing one example of an information exchange screen 1400 when the type selection button 1401 corresponding to a stamp image generated as a character-related image is selected. The information exchange screen 1400 displays candidate information 1101 corresponding to the stamp image generated as a character-related image. When the type selection button 1401 corresponding to the stamp image for conveying "OK" is selected, the information exchange screen 1400 displays candidate information corresponding to the stamp image for conveying "OK."

Section (b) of FIG. 16 is a diagram showing one example of an information exchange screen 1410 when the type selection button 1401 corresponding to a stamp image generated as a new character-related image is selected. On the information exchange screen 1410, a type selection button 1401 corresponding to a stamp image generated as a new character-related image is selected, and in accordance with this selection, candidate information 1411 corresponding to the stamp image generated as a new character-related image is displayed. In the example shown in section (b) of FIG. 16, the type selection button 1401 corresponding to the stamp image generated as the new character-related image is a button object labeled "Add."

Section (c) of FIG. 16 is a diagram showing one example of the information exchange screen 1410 when there is no stamp image corresponding to the selected type selection button 1401. On the information exchange screen 1420, the user has selected the type selection button 1401 corresponding to the stamp image generated as a new character-related image, but information 1421 indicating that there is no stamp image generated as a new character-related image is displayed. The information indicating that there is no stamp image generated as a new character-related image is displayed in a display area below the type selection button 1401.

In this way, the information exchange screen is configured so that the stamp images are classified according to type and displayed, thereby making it possible to improve the user interface. With such an information exchange screen, even if the size of the display screen of the terminal device 2 is limited, it is possible to improve the listability of a plurality of stamp images. Moreover, the information exchange screens 1400, 1410, and 1420 enable the user to intuitively and/or easily find the stamp image that the user desires to use. Moreover, the information exchange screens 1400, 1410, and 1420 enable the user to grasp at a glance whether or not there is a stamp image generated as a new character-related image.

(Variation 2)

At least part of the functions realized by the terminal processor 27 of the terminal device 2 may be realized by a processor other than the terminal processor 27 of the terminal device 2. At least part of the functions realized by the terminal processor 27 may be realized by the server processor 33 of the server device 3, for example. Specifically, part of the functions of the generator 271 and the display processor 274 may be executed in the server device 3. For example, the terminal device 2 transmits the continuously acquired imaging data and audio data to the server device 3 together with the user ID of the user who operates the terminal device 2. Then, the server device 3, using the functions of the generator 271 and the display processor 274, generates character video data and generates display information for displaying on the display device 23 a communication screen including distribution images of all users. The server device 3 then transmits the display information together with the audio information (audio data) to each of the terminal devices 2 of all users. Each terminal device 2 outputs each item of information received from the server device 3 (so-called "server rendering").

(Variation 3)

The terminal device 2 has a function that displays communication screens and the like by executing various commands included in the control program stored in the terminal device 2, but in order to realize an information exchange service and/or a video distribution service, a browser function embedded in a web application may be called, and using this browser function, a web page (written in a markup language such as HTML (Hyper Text Markup Language)) may be received from the server device, and a control program embedded in this web page may be executed (so-called "browser rendering"). For example, by using HTML 5 as the markup language, the terminal device 2 can easily execute new information processing. By adopting such a web application to realize the information exchange service and/or the video distribution service in the terminal device 2, the creator of the program can provide new information processing to the client side (terminal device side) by simply embedding the new program into the web page transmitted by the server device, and workload for creating a new program can be greatly reduced. In addition, on the client side, a new service can be received simply by receiving a web page without downloading a new control program, so compared to downloading a new control program, it becomes possible to reduce the load on the communication network, communications costs and/or communication time, and simplification of the user interface can be realized.

(Variation 4)

The generator 271 of the terminal device 2 of user A may generate output information including face motion data without using imaging data. For example, the terminal memory device 22 of the terminal device 2 may store face motion data corresponding to the audio data, and the generator 271 may extract the face motion data corresponding to the received audio data of user A, and generate output information including the extracted face motion data, audio data, and user ID of user A. Further, the generator 271 of the terminal device 2 of user A may generate output information including the audio data of user A output from the microphone 26 and the user ID stored in the terminal memory device 22 without including the face motion data. In this case, the display processor 274 of the terminal device 2 of user B may extract the face motion data corresponding to the audio data of user A included in the output information of user A received via the server device 3, and generate an animation of the character object of user A. The process of generating face motion data corresponding to the audio data of the user may be a process using a commonly known lip-sync algorithm.

For example, in a case where the terminal device 2 of user A uses an HMD as the display device 23, it is possible to communicate with user B via the character object without acquiring the imaging data of user A.

(Variation 5)

The distribution images 602, 612, 812 displayed on each terminal device 2 are not limited to videos or still images containing animation of a three-dimensional or two-dimensional character object generated based on movement of the distributing user. The distribution images 602, 612, and 812 may include animation of character objects generated in accordance with an operation by the distributing user, or may include videos or still images of the distributing user. In addition, during the video distribution service, each terminal device 2 need not display the animation of these character objects or the video or still image of the distributing user. In this case, each terminal device 2 may output only the audio of the distributing user from the speaker.

As described above, the "distributing user" disclosed in the present embodiment is not limited to a user who uses at least the terminal device function of transmitting character video data to the server device, but may also be a user who transmits information for displaying various distribution images and/or the audio data. The information for displaying various distribution images is, for example, character video data, video image data obtained by photographing the distributing user, or the like.

(Variation 6)

In addition, the "distributing user" disclosed in this embodiment is not limited to a user who sponsors or organizes a single video distribution service. The "distributing user" may be a user who hosts or organizes a collaborative distribution service in which a plurality of people can participate, or a video chat service or a voice chat service in which a plurality of people can participate and/or view. Alternatively, the "distributing user" may be a user who sponsors or organizes an event (party, or the like) service in a virtual space in which a plurality of people can participate and/or view. In this manner, the "distributing user" may be a user who mainly executes these services, or may be called a host user, an organizing user, or a sponsoring user.

The "viewing user" disclosed in the present embodiment is not limited to a user who uses at least the function of the terminal device to receive the character video data from the distributing terminal device and display the distribution image of the distributing user. A "viewing user" may be a user who receives information and/or audio data for displaying various distribution images.

The "viewing user" may be not only a user who receives information and/or audio data for displaying various distribution images, but also a user who can react. For example, a "viewing user" may be a user viewing a video distribution service or a collaborative distribution service, or a user participating in a video chat service, a voice chat service, or an event service, and/or viewing such a service. Therefore, the "viewing user" in the present disclosure may also be called a guest user, a participating user, a listener, a viewing user, a supporting user, or the like.

(Variation 7)

In addition, the information processing system 1 according to the embodiment of the present disclosure may provide the next Internet space (metaverse) where social activities can be conducted across the gap between reality and virtuality in a digital world in which a plurality of people can simultaneously participate and, through character objects (for examples, avatars or the like), can freely engage in activities such as interacting, working, and/or playing at a level close to the real world. In such a space, avatars of users can freely walk around the world and communicate with each other.

The information processing system 1 may distribute a distribution image including one avatar (character object) among a plurality of avatars in the space as the character object of the distributing user. That is, one-to-many video distribution may be performed in a many-to-many metaverse space. In such a space, distributing users and viewing users can become indistinguishable from each other.

Although the present embodiment and its variations have been described in detail above, the present disclosure is not limited to specific examples. In addition, various changes, substitutions, and variations can be made to the disclosed features without departing from the scope of the disclosure. For example, the following examples are within the scope of this disclosure.

An information processing system comprising one or more computer processors, wherein the one or more computer processors:

transmit information related to a display of a first image including a first object indicating a first user to a second terminal device of a second user;

transmit to the second terminal device information related to a display of a second image selected by the first user from a group of a plurality of the second images that each include an image related to the first object;

determine whether or not a predetermined condition related to the first user is satisfied; and when it is determined that the predetermined condition is satisfied, add to the group a new second image including an image related to the first object.

The information processing system as above, wherein:

the one or more computer processors transmit to the second terminal device information related to a display of first input information, when the first input information is input by the first user; and display the first input information input by the first user in order of transmission; and the second image that was selected is one item of the first input information displayed in the order of transmission.

The information processing system as above, wherein when information related to a display of second input information input by the second user is received, the one or more computer processors display the first input information input by the first user and the second input information that was received in order of transmission.

The information processing system as above, wherein the one or more computer processors change at least a portion of the first object included in the first image when a change instruction for the first object is input by the first user; and change at least a portion of each of the first objects of the plurality of the second images belonging to the group when the at least a portion of the first object is changed.

The information processing system as above, wherein an addition to the group of the second images and/or the change to the at least a portion of the first objects is executed by a predetermined operation being performed by the first user.

The information processing system as above, wherein the predetermined condition is that the number of items of the first input information displayed in the order of transmission exceeds a first predetermined number.

The information processing system as above, wherein when information related to a display of an object transmitted from the second terminal device is received while the first image is being displayed, the one or more computer processors display the object; and the predetermined condition is a condition related to the object.

The information processing system as above, wherein when information related to a display of a specific object transmitted from the second terminal device is received while the first image is being displayed, the one or more computer processors display the specific object;

the predetermined condition is a condition related to the specific object; and the new second image added when the condition related to the specific object is satisfied includes information related to the specific object.

The information processing system as above, wherein the predetermined condition is that a number of the second users having a predetermined relationship with the first user is at least a second predetermined number.

The information processing system as above, wherein the predetermined condition is that a number of days on which information related to the display of the first image is transmitted is at least a predetermined number of days.

The information processing system as above, wherein the predetermined condition is a condition related to a day on which the first object was generated.

The information processing system as above, wherein the new second image is an image corresponding to an event in which the first user participates.

The information processing system as above, wherein
the new second image is an image usable only during a predetermined period of time; and
the predetermined period of time is a period of time corresponding to a consideration paid by the first user.

A control method for an information processing system provided with one or more computer processors, wherein the one or more computer processors:
transmit information related to a display of a first image including a first object indicating a first user to a second terminal device of a second user;
transmit, to the second terminal device, information related to a display of a second image selected by the first user from a group of a plurality of the second images that each include an image related to the first object;
determine whether or not a predetermined condition related to the first user is satisfied; and
when it is determined that the predetermined condition is satisfied, add to the group a new second image including an image related to the first object.

A server device that communicates with a first terminal device of a first user and a second terminal device of a second user, wherein
the server device comprises a processor that
receives information related to a display of a first image including a first object indicating the first user, transmitted from the first terminal device,
receives information related to a display of a second image selected by the first user from a group of a plurality of second images that each include an image related to the first object, transmitted from the first terminal device, and
transmits, to the second terminal device, the information related to the display of the first image and the information related to the display of the second image received from the first terminal device; and
when it is determined that a predetermined condition related to the first user has been satisfied, a new second image including an image related to the first object is added to the group.

An information processing system comprising one or more computer processors, wherein the one or more computer processors:
transmit information regarding display of a video including a first object representing a first user to a second terminal device of a second user;

transmit information regarding display of a related image selected by the first user from a group including a plurality of the related images regarding the first object, to the second terminal device;
acquire reference information regarding the first object; and
include, in the group, an image including the first object and generated based on the reference information as the related image.

The information processing system as above, wherein
the one or more computer processors include, in the group, an image that includes the first object and is generated without being based on the reference information as the related image.

The information processing system as above, wherein in acquiring the reference information, the one or more computer processors acquire information regarding the displayed video as the reference information.

The information processing system as above, wherein the information regarding the video acquired as the reference information includes motion data for displaying the related image including the first object in a same pose as a pose, at a predetermined timing, of the first object included in the displayed video.

The information processing system as above, wherein the information regarding the video acquired as the reference information includes captured image information of the displayed video.

The information processing system as above, wherein
the one or more computer processors include in the video text information input by the second user, and
the information regarding the video acquired as the reference information includes the text information.

The information processing system as above, wherein the information regarding the video acquired as the reference information includes information regarding a second object selected by the first user from the second objects that can be selected to be displayed together with the first object in the video.

The information processing system as above, wherein
the one or more computer processors include in the video an image representing a third object selected by the second user, and
in acquiring the reference information, the one or more computer processors acquire, as the reference information, information of an image representing the third object.

The information processing system as above, wherein
the one or more computer processors store information of an image representing an owned object owned by the first user, and
in acquiring the reference information, the one or more computer processors acquire, as the reference information, the information of the image representing the owned object.

The information processing system as above, wherein
the one or more computer processors store an image representing a profile of the first object, and
in acquiring the reference information, the one or more computer processors acquire, as the reference information, information of the image representing the profile.

The information processing system as above, wherein
the one or more computer processors display the first object existing within a virtual space, and in acquiring the reference information, the one or more computer processors acquire, as the reference information, predetermined image information representing the virtual space.

The information processing system as above, wherein a drawing processing load when the video is drawn on a display screen is larger than a drawing display load when the related image is drawn on the display screen.

The information processing system as above, wherein the video is a three-dimensional video image in which a three-dimensional virtual space including the first object is drawn, and the related image is a two-dimensional image.

The information processing system as above, wherein a display size of the video on a display screen is larger than a display size of the related information on the display screen.

The information processing system as above, wherein a transmission amount when transmitting display information for displaying the video is larger than a transmission amount when transmitting information regarding display of the related image.

A control method for an information processing system comprising one or more computer processors, wherein the one or more computer processors:

transmit information regarding display of a video including a first object representing a first user to a second terminal device of a second user;

transmit information regarding display of a related image selected by the first user from a group including a plurality of the related images regarding the first object, to the second terminal device;

acquire reference information regarding the first object; and include, in the group, an image including the first object and generated based on the reference information as the related image.

A server device that communicates with a first terminal device of a first user and a second terminal device of a second user, the server device comprising a processor that:

receives information regarding display of a video including a first object representing the first user, transmitted from the first terminal device;

receives information regarding display of a related image selected by the first user from a group including a plurality of the related images regarding the first object, transmitted from the first terminal device; and transmits the information regarding display of the video and the information regarding display of the related image received from the first terminal device to the second terminal device, wherein an image including the first object and generated based on reference information regarding the first object is included in the group as the related image.

EXPLANATION OF SYMBOLS

1 Information processing system
2 Terminal device
21 Terminal communication OF
22 Terminal memory device
23 Display device
24 Input device
25 Imaging device
26 Microphone
27 Terminal processor
271 Generator
272 Transmitter
273 Receiver 274 Display processor
275 Audio output portion
3 Server device
31 Server communication OF
32 Server memory device
33 Server processor
331 Server receiver
332 Server transmitter
4 Base station
5 Mobile communication network
6 Gateway
7 Internet

The invention claimed is:

1. An information processing system comprising:
one or more processors programmed to:
transmit information regarding display of a video including a first object representing a first user to a terminal device of a second user different from the first user;
set a user group including the first user and at least one other user including the second user; and
transmit information regarding display of a related image selected by the first user from an image group including a plurality of related images relating to the first object, to the terminal device of each other user included in the user group, wherein
the one or more processors include in the image group a new related image including the first object representing the first user and a second object representing at least one of the other users, in response to an instruction from the first user,
the first and second objects included in the new related image are controlled to automatically perform a predetermined action in the new related image,
the instruction from the first user includes a selection by the first user of the at least one of the other users from a selection target group displayed on a terminal device of the first user, and
the one or more processors generate the new related image in response to the selection by the first user of the at least one of the other users.

2. The information processing system according to claim 1, wherein
in setting the user group, the one or more processors set a plurality of user groups, and
in transmitting the information regarding display of the related image, the one or more processors transmit the new related image including the second object representing the at least one of the other users only to the user group including the at least one of the other users.

3. The information processing system according to claim 1, wherein the one or more processors:
in response to a number of the other users in the user group participating in a chat reaching a predetermined number, select the predetermined number of other users; and
generate the new related image including the second object indicating the selected predetermined number of other users.

4. The information processing system according to claim 1, wherein the new related image includes a third object, different from the first object and the second object, relating to a design of a character-related image, and includes the first object and the second object in a pose corresponding to the third object.

5. A control method of an information processing system comprising one or more processors, the method comprising:

transmitting information regarding display of a video including a first object representing a first user to a terminal device of a second user different from the first user;

setting a user group including the first user and at least one other user including the second user; and transmitting information regarding display of a related image selected by the first user from an image group including a plurality of related images relating to the first object, to the terminal device of each other user included in the user group, wherein included in the image group is a new related image including the first object representing the first user and a second object representing at least one of the other users, in response to an instruction from the first user, the first and second objects included in the new related image are controlled to automatically perform a predetermined action in the new related image, the instruction from the first user includes a selection by the first user of the at least one of the other users from a selection target group displayed on a terminal device of the first user, and the new related image is generated in response to the selection by the first user of the at least one of the other users.

6. A server device comprising:

a processor programmed to:

receive, from a first terminal device of a first user, information regarding display of a video including a first object representing the first user;

transmit to a second terminal device of a second user different from the first user the information regarding display of the video received from the first terminal device;

set a user group including the first user and at least one other user including the second user; and receive information regarding display of a related image selected by the first user from an image group including a plurality of related images relating to the first object and transmitted from the first terminal device, wherein in response to an instruction from the first user, a new related image including the first object representing the first user and a second object representing at least one of the other users is included in the image group, the first and second objects included in the new related image are controlled to automatically perform a predetermined action in the new related image, the instruction from the first user includes a selection by the first user of the at least one of the other users from a selection target group displayed on a terminal device of the first user, and the new related image is generated in response to the selection by the first user of the at least one of the other users.

* * * * *